(12) United States Patent
Tashjian

(10) Patent No.: US 11,630,566 B2
(45) Date of Patent: Apr. 18, 2023

(54) TECHNOLOGIES FOR VIRTUALLY TRYING-ON ITEMS

(71) Applicant: Maria Tashjian, New York, NY (US)

(72) Inventor: Maria Tashjian, New York, NY (US)

( * ) Notice: Subject to any disclaimer, the term of this patent is extended or adjusted under 35 U.S.C. 154(b) by 0 days.

(21) Appl. No.: 17/693,004

(22) Filed: Mar. 11, 2022

(65) Prior Publication Data

US 2022/0197459 A1 Jun. 23, 2022

Related U.S. Application Data

(63) Continuation of application No. PCT/US2021/036008, filed on Jun. 4, 2021.

(60) Provisional application No. 63/035,346, filed on Jun. 5, 2020.

(51) Int. Cl.
*G06F 3/048* (2013.01)
*G06F 3/0486* (2013.01)

(52) U.S. Cl.
CPC .................. *G06F 3/0486* (2013.01)

(58) Field of Classification Search
CPC ............ G06Q 30/0643; G06Q 30/0601; G06F 3/0486; G06F 3/048
See application file for complete search history.

(56) References Cited

U.S. PATENT DOCUMENTS

| | | | |
|---|---|---|---|
| 9,836,883 B2 | 12/2017 | Tran et al. | |
| 10,052,026 B1 * | 8/2018 | Tran | A61B 5/165 |
| 11,068,971 B1 * | 7/2021 | Kantamneni | G06F 3/0486 |
| 2002/0071604 A1 * | 6/2002 | Orpaz | A45D 44/005 |
| | | | 382/284 |
| 2002/0184104 A1 | 12/2002 | Littman | 705/26 |
| 2013/0083065 A1 | 4/2013 | Schulze | 345/633 |
| 2013/0342527 A1 | 12/2013 | Molyneaux et al. | |
| 2014/0063056 A1 | 3/2014 | Zhong | 345/633 |
| 2015/0317811 A1 * | 11/2015 | Hayashi | G06T 1/0007 |
| | | | 345/634 |

FOREIGN PATENT DOCUMENTS

| | | | | |
|---|---|---|---|---|
| CN | 101231658 A | 7/2008 | ............. | G06F 17/30 |
| CN | 102156808 A | 8/2011 | ............. | G06T 17/00 |
| CN | 103324810 A | 9/2013 | ............. | G06F 17/50 |
| CN | 104820498 | 5/2018 | | |
| EP | 1939812 A2 | 7/2008 | ............. | G06T 17/00 |
| KR | 101085762 B1 | 11/2011 | ............. | H04N 13/00 |
| KR | 101555031 B1 | 9/2015 | ............. | G06Q 50/10 |
| WO | WO2015172229 A1 | 11/2015 | ............. | G06T 17/00 |

OTHER PUBLICATIONS

Facecake Dangle (httos://web.archive.org/web/20180117004722/ https://videos.facecake.com/FaceCake.Dangle/). attached as pdf (Year: 2018).*

International Search Report and Written Opinion dated Nov. 17, 2021 in corresponding application PCT/US21/36008 filed Jun. 4, 2021 (20 pages).

(Continued)

*Primary Examiner* — Aleksey Olshannikov
(74) *Attorney, Agent, or Firm* — Dentons US LLP

(57) ABSTRACT

This disclosure enables various technologies for virtually trying-on items (e.g., a jewelry item, an earring, a garment) in a manner that is more realistic than currently known techniques.

30 Claims, 90 Drawing Sheets

(56) References Cited

OTHER PUBLICATIONS

Anuradha Art Jewellery, Choose your perfect earring's after online trial—Try your jewellery online, 2015, downloaded from internet http://www.anuradhaartjewellery.com/blog/choose-your-perfect-earrings-after-online-trial-try-your-jewellery-online/ (5 pages).

Mishra, CaratLane pioneers a virtual jewellery try-on feature, 2016, downloaded from internet http://cio.economictimes.indiatimes.com/dobig/news/detail/998 (3 pages).

Studex Europa, Ear piercing with studex, 2016, downloaded from internet https://itunes.apple.com/us/app/ear-piercing-with-studex/id525252378?mt=8 (2 pages).

TryItOn Jewelry, 2017, downloaded from internet http://www.tryitonapps.com/jewelry/ (8 pages).

TryOnApps, Ffiitt app makes shopping for earrings easy, 2013, downloaded from internet https://tryonapps.com/index.php/about-cojoy/ffiitt (1 page).

\* cited by examiner

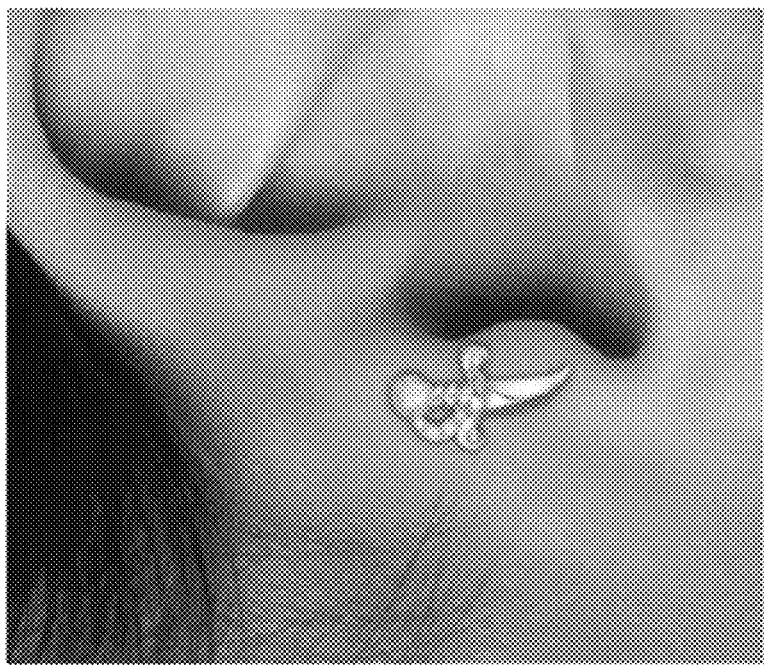
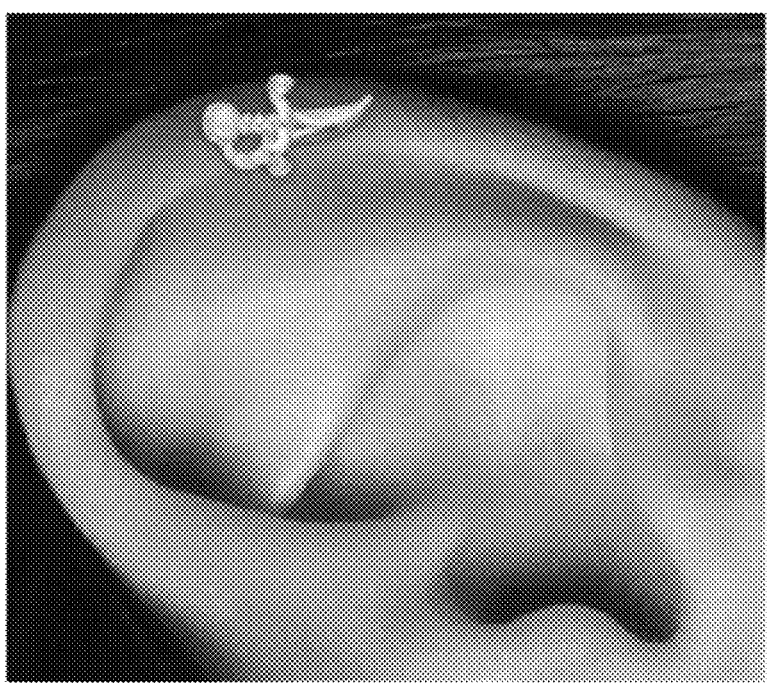
FIG. 13

FIG. 18

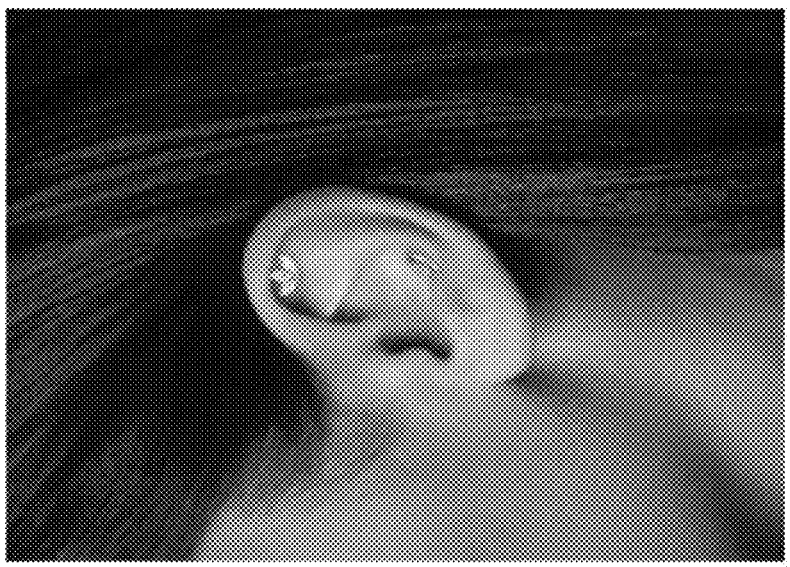
FIG. 25

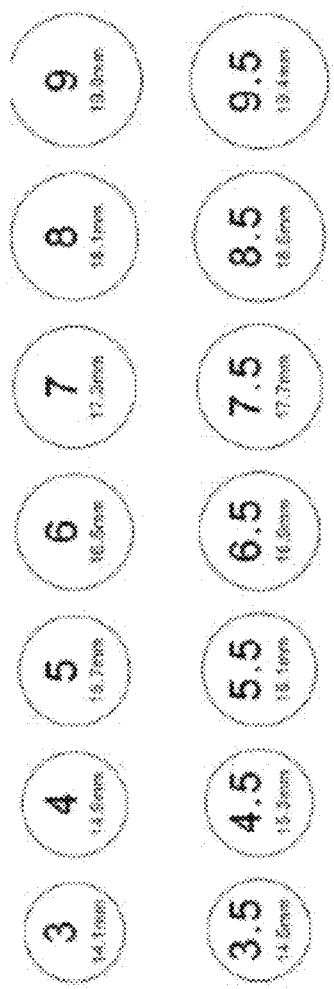
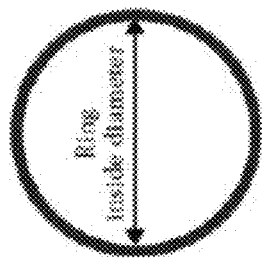
FIG. 72

EAR ANALYSIS

APPROACH TO FIND A DEVIATION OF EAR ANATOMY WITH BASE MODEL USING ML AND DEEP LEARNING MODELS

| EXPRESSIONLESS | COLLECTIBLE | NO AGE VARIANCE | PERMANENCE |
|---|---|---|---|
| Unlike human face or eyes, ear is an expressionless body part for analysis | Like any other biometric signature, ear is a collectible source of information | There is little to no variation of the ear with age | Ear is permanently available for recurring capture and verification |

Although it is not an objective of this document, but these properties make ear a biometric signature which can be used to identify the customers with little risk of security of data breach owing to its low penetration as identity signature

FIG. 81

EAR ANALYSIS
IMAGE CAPTURE

FIRST STEP IS TO CAPTURE THE IMAGES WITH THE FOLLOWING ATTRIBUTES

Captured ear image / images need to have clear face for processing. If more than one image is captured, an additional algorithm needs to be executed to find the most suitable / usable image from the stack. For processing image should have following characteristics.

∨ Know distance from the camera
It can be achieved by a static camera distance, a sensor or if captured on mobile a position to start acquiring the image. Depth sensor camera's could be potentially used in the future ∨ Completeness
Full exposure of the ear is required in such a way that outline of ear is clearly visible in the image ∨ Side Facing
Image needs to be captured from the side face with enough lighting to expose the visible area. Front facing or angled images are more error prone and less useful

FIG. 83

EAR ANALYSIS

IMAGE PRE-PROCESSING

First step in the image processing is to convert the image into grayscale.

Image contrast plays the important role in the second stage of image processing, so grayscale conversion needs to be done using luminosity algorithms.

Final stage of preprocessing is to identify the region of interest (ROI) in the image. Region of interest in our case is to isolate full ear in the image with least possible disturbance. Existing image segmentation algorithms can be used to isolate the region.

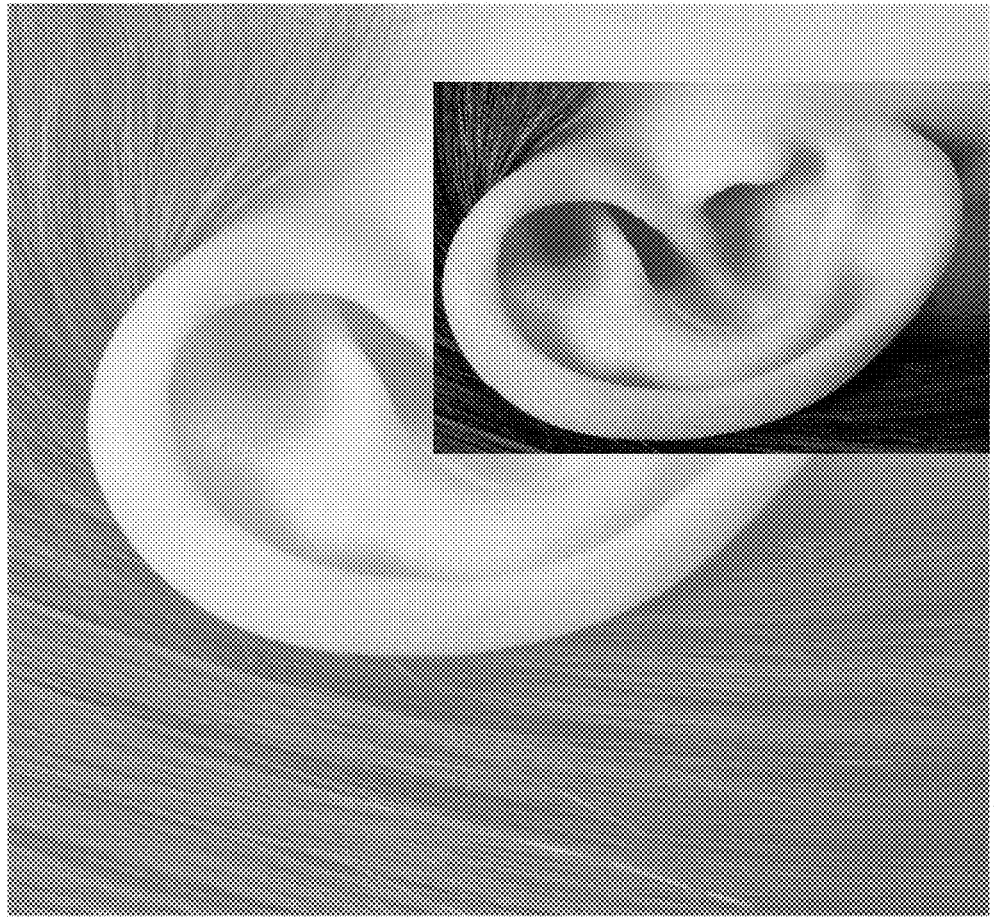

FIG. 84

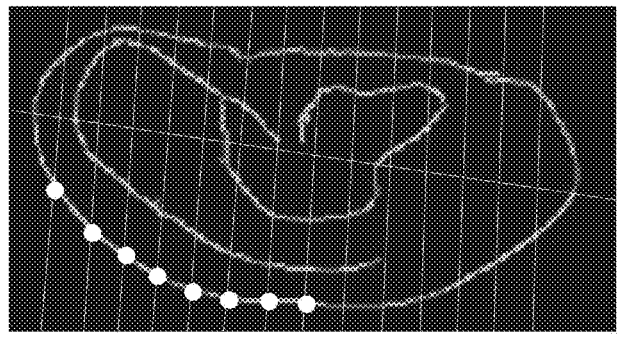
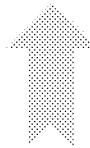
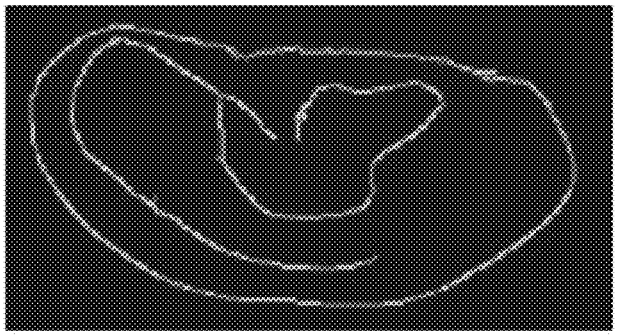
FIG. 86

EAR ANALYSIS

DEPTH EXTRACTION

| Feature (FL) | Distance (D) | Pixel Depth (PD) | Angle (θ) |
|---|---|---|---|
| FL1 | 20 | 1 | 2 |
| FL1 | 21 | 3 | 3 |
| FL1 | 20 | 1 | 2 |
| FL1 | 22 | 4 | 4 |
| FL2 | 10 | 8 | 8 |
| FL2 | 12 | 1 | 2 |

```
#Load Train and Test datasets
#Identify feature and response variable(s) and values must be numeric and numpy arrays
x_train <- input_variables_values_training_datasets
y_train <- target_variables_values_training_datasets
x_test <- input_variables_values_test_datasets
x <- cbind(x_train,y_train)
# Train the model using the training sets and check score
linear <- lm(y_train ~ ., data = x)
summary(linear)
#Predict Output
predicted= predict(linear,x_test)
```

Hypothetical depth machine learning training data. With the minimum code of the training data, ML model with simple linear regression algorithm would be able to accurately predict the depth and angle of the image that may be needed to be placed in a given zone.

FIG. 89

TECHNOLOGIES FOR VIRTUALLY TRYING-ON ITEMS

CROSS-REFERENCE TO RELATED PATENT APPLICATIONS

This patent application is a Continuation of International Patent Application PCT/US21/36008 filed 4 Jun. 2021; which claims a benefit of priority to U.S. Provisional Patent Application 63/035,346 filed 5 Jun. 2020; each of which is incorporated by reference herein for all purposes.

TECHNICAL FIELD

This disclosure relates to various technologies for virtually trying-on items.

BACKGROUND

A seller may allow a potential customer to virtually try-on an item (e.g., an earring) before the potential customer can purchase the item. However, various currently known approaches to providing such functionality are technologically problematic. This may be so at least because these approaches unrealistically present the item, which in-turn may (a) preclude the item from being purchased, (b) increase a likelihood of returning the item after the item is purchased, or (c) tarnish the seller or a manufacturer of the item.

SUMMARY

Broadly, this disclosure enables various technologies for virtually trying-on items (e.g., a jewelry item, an earring, a garment) in a manner that is more realistic than currently known approaches to providing such functionality. For example, some of such technologies include various user interfaces (UIs) that are programmed to enable various virtual try-ons based on (a) appearing to change various rotational angles of the items depending on where the items are virtually tried-on, various morphologies of objects on which the items are being virtually tried-on, the items themselves, or responsive to various user inputs, (b) what type of the items are being virtually-tried on, (c) dynamically hiding or dynamically unhiding various areas of the items depending on where the items are virtually tried-on, various morphologies of objects on which the items are being virtually tried-on, the items themselves, or responsive to various user inputs, (d) enabling various magnetic, reflective, or shadowing effects on the items, relative to the items, or where the items are being virtually tried-on depending on where the items are virtually tried-on, various morphologies of objects on which the items are being virtually tried-on, the items themselves, or responsive to various user inputs, or other functions. These modalities of virtual try-on can be (a) combined with each other or be dependent on each other, (b) be separate and distinct from each other or be independent from each other, or (c) can be embodied via or on various form factors (e.g., a server, a client, a smartphone, a tablet, a wearable, a smart mirror, an operating system, a software application, a browser, a mobile app). Note that these technologies can be applied to virtually trying-on various items (e.g., a jewelry item, an earring, a necklace, a garment, a hat, a ring, an anklet, a bracelet, a tattoo) on various objects (e.g., a human, a mannequin, a showcase model, a body part, a head, a nose, an ear, a neck, an arm, a forearm, an upper arm, a wrist, a torso, a navel, a toe, a finger, a garment, a shoe).

In an embodiment, there is a system comprising: a processor programmed to: cause a UI to be presented, wherein the UI is programmed to: frontally present a virtual ear (or another virtual object) within the UI; receive a first user selection while the virtual ear is frontally presented within the UI and a second user selection while the virtual ear is frontally presented within the UI, wherein the first user selection selects a virtual earring (or another virtual item) presented within the UI while the virtual ear is frontally presented within the UI, wherein the second user selection selects a virtual location on the virtual ear frontally presented within the UI; and virtually try-on the virtual earring at the virtual location within the UI responsive to the first user selection being received via the UI and the second user selection being received via the UI such that the virtual earring appears to change in rotational angle within the UI depending on where the virtual location is located on the virtual ear within the UI.

In an embodiment, there is a system comprising: a processor programmed to: cause a UI to be presented, wherein the UI is programmed to: frontally present a virtual ear (or another virtual object) within the UI; present a virtual earring (or another virtual item) within the UI while the virtual ear is frontally presented within the UI; and receive a drag-and-drop input within the UI while the virtual ear is frontally presented within the UI and the virtual earring is presented within the UI such that (a) the drag-and-drop input drags the virtual earring over the virtual ear and thereby enables the virtual earring to be virtually tried-on the virtual ear within the UI responsive to the drag-and-drop input, (b) the virtual earring appears to change in rotational angle within the UI depending on where the virtual earring is virtually tried-on the virtual ear within the UI responsive to the drag-and-drop input, and (c) the virtual earring appears to at least partially dynamically hide and at least partially dynamically unhide depending on where the virtual earring is virtually tried-on the virtual ear within the UI responsive to the drag-and-drop input.

In an embodiment, there is a system comprising: a processor programmed to: cause a UI to be presented, wherein the UI is programmed to: frontally present a virtual ear (or another virtual object) within the UI, wherein the virtual ear includes a set of virtual depth areas; receive a first user selection while the virtual ear is frontally presented within the UI and a second user selection while the virtual ear is frontally presented within the UI, wherein the first user selection selects a virtual earring (or another virtual item) presented within the UI while the virtual ear is frontally presented within the UI, wherein the virtual earring includes a set of virtual portions, wherein the second user selection selects a virtual location on the virtual ear frontally presented within the UI; and virtually try-on the virtual earring at the virtual location within the UI responsive to the first user selection being received via the UI and the second user selection being received via the UI such that at least one virtual portion selected from the set of virtual portions appears dynamically hidden under at least one virtual depth area selected from the set of virtual depth areas when the virtual location is the at least one virtual depth area selected from the set of virtual depth areas and dynamically unhidden when the virtual location is not the at least one virtual depth area selected from the set of virtual depth areas.

In an embodiment, there is a system comprising: a processor programmed to: cause a UI to be presented, wherein the UI is programmed to: frontally present a virtual ear (or another virtual object) within the UI, wherein the virtual ear includes a first virtual edge and a virtual skin; receive a first user selection while the virtual ear is frontally presented within the UI and a second user selection while the virtual ear is frontally presented within the UI, wherein the first user selection selects a virtual earring (or another virtual item) presented within the UI while the virtual ear is frontally presented within the UI, wherein the virtual earring includes a second virtual edge, wherein the second user selection selects a virtual location on the virtual ear frontally presented within the UI; and virtually try-on the virtual earring at the virtual location within the UI responsive to the first user selection being received via the UI and the second user selection being received via the UI such that the virtual earring appears to virtually gravitationally fall relative to the virtual ear until appearing to virtually contact the virtual skin within the UI depending on the virtual earring and based on a virtual space being available between the first virtual edge and the second virtual edge.

In an embodiment, there is a system comprising: a processor programmed to: cause a UI to be presented, wherein the UI is programmed to: frontally present a virtual ear (or another virtual object), wherein the virtual ear includes a virtual skin tone; receive a first user selection while the virtual ear is frontally presented within the UI and a second user selection while the virtual ear is frontally presented within the UI, wherein the first user selection selects a virtual earring (or another virtual item) presented within the UI while the virtual ear is frontally presented within the UI, wherein the second user selection selects a virtual location on the virtual ear frontally presented within the UI; and virtually try-on the virtual earring at the virtual location within the UI responsive to the first user selection being received via the UI and the second user selection being received via the UI such that at least one of: (a) there is an appearance of a virtual reflection of the virtual skin tone on the virtual earring within the UI, wherein the virtual reflection varies based on the virtual skin tone, or (b) there is an appearance of a virtual shadow of the virtual earring on the virtual ear within the UI, wherein the virtual shadow varies based on the virtual skin tone.

In an embodiment, there is a system comprising: a processor programmed to: cause a UI to be presented, wherein the UI is programmed to: present a user input element programmed to receive a user input within the UI; frontally present a virtual ear (or another virtual object) while the user input element is presented within the UI, wherein the virtual ear includes a virtual skin area; receive a first user selection while the virtual ear is frontally presented within the UI and a second user selection while the virtual ear is frontally presented within the UI, wherein the first user selection selects a virtual earring (or another virtual item) presented within the UI while the virtual ear is frontally presented within the UI, wherein the second user selection selects a virtual location on the virtual ear frontally presented within the UI, wherein the virtual location is spaced apart from the virtual skin area; and virtually try-on the virtual earring at the virtual location within the UI responsive to the first user selection being received via the UI and the second user selection being received via the UI such that (a) the virtual earring appears to spin responsive to the user input while virtually tried-on at the virtual location and (b) the virtual earring appears to be at least partially dynamically hidden and dynamically unhidden responsive to the user input while virtually tried-on at the virtual location based on the virtual earring respectively appearing to be virtually anatomically tucked and virtually anatomically untucked within the virtual ear.

In an embodiment, there is a system comprising: a processor programmed to: receive an image of an ear (or another virtual object) of a user, wherein the ear is frontally presented in the image; identify a set of virtual anatomical regions in the ear frontally presented in the image; segment each set selected from the set of virtual anatomical regions into a set of virtual regions; and enable a virtual earring (or another virtual item) to be virtually tried-on the ear frontally presented in the image to the user such that the virtual earring is dynamically varied in appearance depending on where the virtual earring is virtually tried-on the ear frontally presented in the image based on the set of virtual anatomic regions and the set of virtual regions.

In an embodiment, there is a system comprising: a processor programmed to: receive an image of an ear (or another virtual object) of a user, wherein the ear is frontally presented in the image; identify a virtual piercing in the ear that is frontally presented in the image; identify a scale of the ear that is frontally presented in the image; and present a visual content recommending a virtual earring (or another virtual item) to be virtually tried-on the ear frontally presented in the image to the user based on (a) where the virtual piercing is located on the ear frontally presented in the image and (b) the scale.

In an embodiment, there is a system comprising: a smart mirror including a housing, a processor, a camera, and a display, wherein the housing houses the processor, the camera, and the display, wherein the processor is in communication with the camera and the display, wherein the processor is programmed to: receive a left imagery and a right imagery from a camera, wherein the left imagery frontally presents a left ear of a user standing before the camera, wherein the right imagery frontally presents a right ear (or another virtual object) of the user standing before the camera; identify a virtual left ear (or another virtual object) from the left ear frontally presented in the left imagery and a virtual right ear from the right ear in the right imagery; set the virtual left ear to a left preset scale and the virtual right ear to a right preset scale; identify a set of left virtual anatomical regions in the virtual left ear as set in the left preset scale and a set of right virtual anatomical regions in the virtual right ear as set in the right preset scale; segment each set selected from the set of left virtual anatomical regions into a set of left virtual regions and each set selected from the set of right virtual anatomical regions into a set of right virtual regions; cause the virtual left ear, the right virtual ear, and a virtual earring (or another virtual item) scale to be simultaneously presented on the display; receive an input from the user while the virtual left ear, the virtual right ear, and the virtual earring are simultaneously presented on the display; and cause the virtual earring to be virtually tried-on the virtual left ear or the virtual right ear on the display responsive to the input.

In an embodiment, there is a system comprising: a processor programmed to: access a map of a virtual object, wherein the map segments the virtual object into a set of virtual regions and each virtual region selected from the set of virtual regions into a set of virtual zones that are polygonal and border each other within that respective virtual region; access a set of images depicting a virtual item from a set of rotational angles that are different from each other; receive a first user selection selecting the virtual item; receive a second user selection selecting a virtual zone selected from the set of virtual zones and positioned within a virtual region selected from the set of virtual regions; select an image selected from the set of images and corresponding to the virtual zone positioned within the virtual region based on the second user selection; and virtually try-on the virtual item on the virtual object responsive to the first user selection and the second user selection based on the image selected.

DESCRIPTION OF DRAWINGS

FIG. 13 shows an embodiment of a virtual earring with a set of rotational angles that are different from each other according to various principles of this disclosure.

FIG. 18 shows an embodiment of a virtual ear without a tucking effect and with a tucking effect during a virtual try-on according to various principles of this disclosure.

FIG. 25 shows an embodiment of a virtual ear being shows as a left ear and a right ear during a virtual try-on according to various principles of this disclosure.

FIG. 72 shows an embodiment of various ring sizes for virtually trying-on a virtual necklace according to various principles of this disclosure.

FIGS. 81-90 show an embodiment of an method for machine learning for creating a canvas or a map for an object according to this disclosure.

DETAILED DESCRIPTION

Broadly, this disclosure enables various technologies for virtually trying-on items (e.g., a jewelry item, an earring, a garment) in a manner that is more realistic than currently known approaches to providing such functionality. For example, some of such technologies include various UIs that are programmed to enable various virtual try-ons based on (a) appearing to change various rotational angles of the items depending on where the items are virtually tried-on, various morphologies of objects on which the items are being virtually tried-on, the items themselves, or responsive to various user inputs, (b) what type of the items are being virtually-tried on, (c) dynamically hiding or dynamically unhiding various areas of the items depending on where the items are virtually tried-on, various morphologies of objects on which the items are being virtually tried-on, the items themselves, or responsive to various user inputs, (d) enabling various magnetic, reflective, or shadowing effects on the items, relative to the items, or where the items are being virtually tried-on depending on where the items are virtually tried-on, various morphologies of objects on which the items are being virtually tried-on, the items themselves, or responsive to various user inputs, or other functions. These modalities of virtual try-on can be (a) combined with each other or be dependent on each other, (b) be separate and distinct from each other or be independent from each other, or (c) can be embodied via or on various form factors (e.g., a server, a client, a smartphone, a tablet, a wearable, a smart mirror, an operating system, a software application, a browser, a mobile app). Note that these technologies can be applied to virtually trying-on various items (e.g., a jewelry item, an earring, a necklace, a garment, a hat, a ring, an anklet, a bracelet, a tattoo) on various objects (e.g., a human, a mannequin, a showcase model, a body part, a head, a nose, an ear, a neck, an arm, a forearm, an upper arm, a wrist, a torso, a navel, a toe, a finger, a garment, a shoe).

Figure 1:
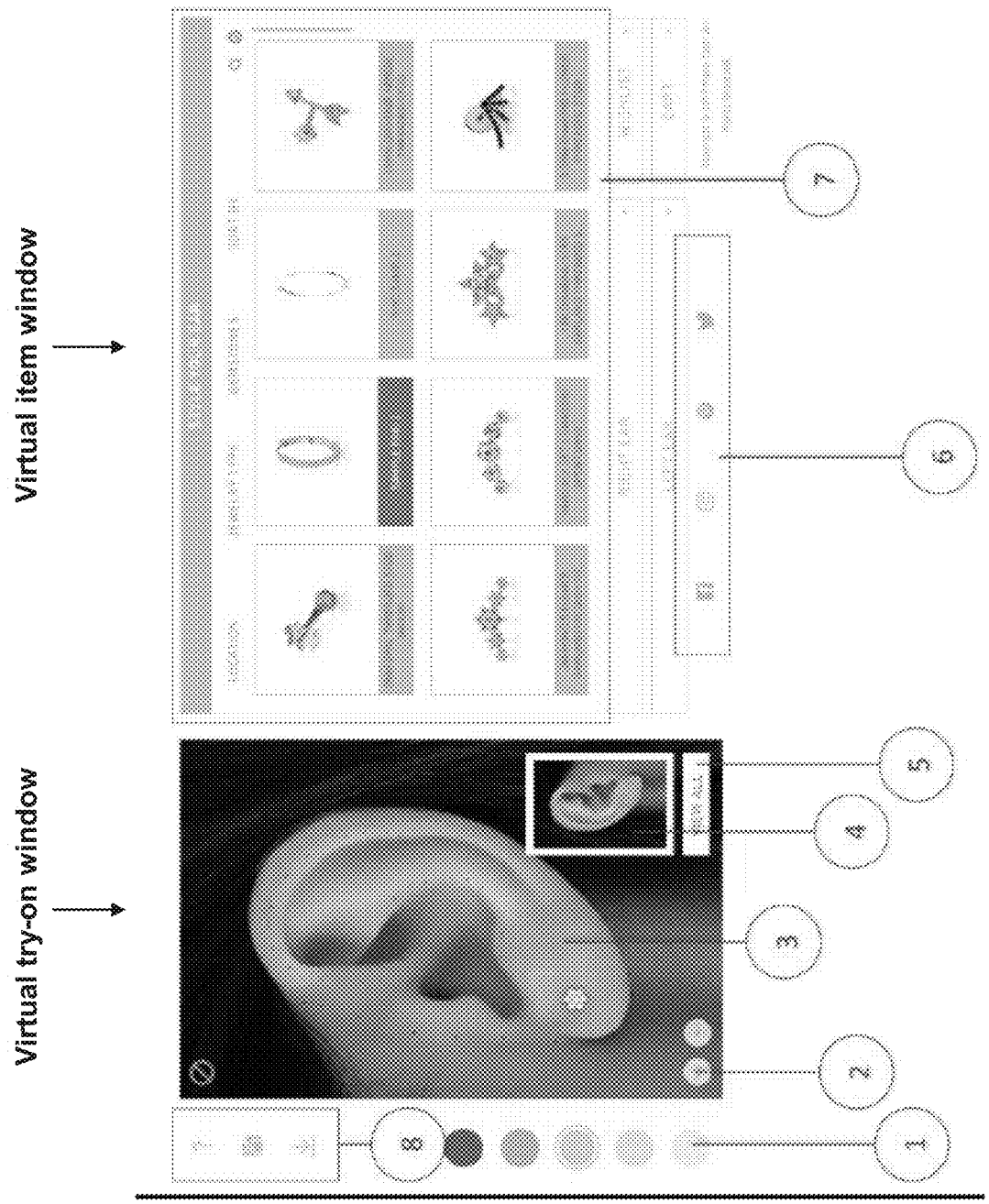
FIG. 1 shows an embodiment of a UI programmed for virtually trying-on a virtual earring according to various principles of this disclosure.
Figure 90:
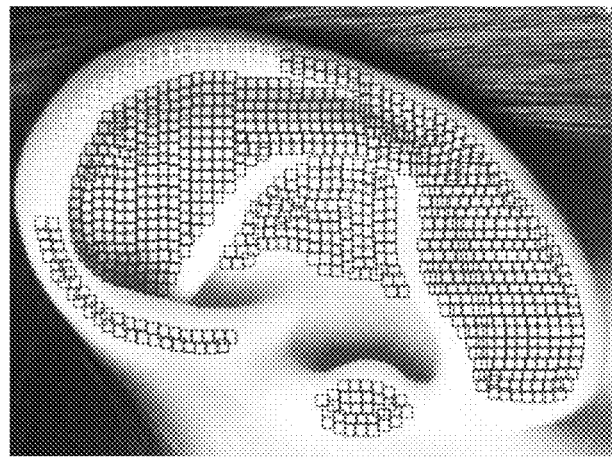

This disclosure is now described more fully with reference to FIGS. 1-90, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" may also be used herein. For example, "one or more" includes one, two, three, four, five, six, seven, eight, nine, ten, tens, hundreds, thousands, or more including all intermediary whole or decimal values therebetween.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including hyperlinked articles, web pages, and websites) that are mentioned in this disclosure are herein incorporated by reference in their entirety for all purposes, to same extent as if each individual issued patent, published patent application, or non-patent publication were copied and pasted herein or specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

This disclosure enables various technologies that solve various technological problems encountered by sellers or customers when virtually trying-on a jewelry item (e.g., an earring, a necklace, a ring, a bracelet, an anklet) before the jewelry item is purchased, although post-purchase virtual try-on of the jewelry item is enabled as well. For example, such virtual try-on includes virtually wearing a virtual item (e.g., a jewelry item, an earring, a necklace, a bracelet, a ring, an anklet) on a virtual object (e.g., a body part, an ear, a neck, a wrist, a finger, an ankle) as presented in an electronic display (e.g., a computer monitor, a touchscreen, a volumetric display, a smart mirror) positioned before a user (e.g., a seller, a potential customer). In particular, various currently known approaches to providing virtual try-on functionality are technologically problematic. This may be so at least because these approaches unrealistically present the item, which in-turn may (a) preclude the item from being purchased, (b) increase the likelihood of returning the item after the item is purchased, or (c) tarnish the seller or the manufacturer of the item. Therefore, these technologies enable various virtual try-on functionalities that realistically present the item during such virtual try-ons before the item is purchased, although post-purchase virtual try-on of the jewelry item is enabled as well. These technologies can be implemented individually or in combination with other technologies, as disclosed herein.

For example, these technologies may include presenting a UI for a potential customer, where the UI is easy, intuitive, self-explanatory, and realistically responsive. In addition, these technologies may include the UI present realistic outputs of various virtual try-ons by the customer that make the item (e.g., a virtual earring) look close to real photo shots. Also, these technologies may include the UI present automatic item scaling proportionally to an ear of the potential customer (e.g., as self-uploaded from an ear selfie taken by the potential customer), although other body parts (e.g., a face, a neck) may be used. Moreover, these technologies may include the UI operate based on various restrictions to be set, where these restrictions restrict which body parts the item can be virtually tried-on and further which locations (or regions) of the body parts the item can be virtually tried-on. Additionally, these technologies may include the UI permit multiple items to be virtually tried-on simultaneously for a combination of looks, while allowing easy addition/removal of items to create or customize various desired looks. Further, these technologies may include the UI present detailed looks with via zooming or panning of a body part (e.g., a virtual ear) or the item, while keeping the item and the body part appear proportional. Additionally, these technologies may include the UI allow various look configurations, as created or arranged by the potential customer, to be saved or stored for later use (e.g., review) or downloaded as an image (e.g. a JPEG file, a PDF file). Also, these technologies ma include the UI to enable a connection with social media platforms (e.g., Facebook, Instagram) to share various created or arranged looks thereon. Moreover, these technologies may include the UI present different skin tones, real-time image capture, virtual try-on using a video clip depending on the virtual object or the virtual item or morphologies thereof or where the virtual item is virtually tried-on the virtual object. Similarly, these technologies may include the UI be presented on many consumer devices (e.g., a computer monitor, a desktop, a laptop, a tablet, a smartphone, a touchscreen), while also (a) integrating openly with various e-commerce and shopping platforms or (b) offering an application programming interface (API) to integrate with multiple frontend or backend computing systems, whether of those selling the item or third parties.

Although this disclosure is described in context of virtual try-on of jewelry products (e.g., an earring, a charm) on an ear, this disclosure should not be limiting. Rather, this disclosure can be utilized for any body part and any product to virtually try-on. As such, these technologies can be applied to virtually trying-on various items (e.g., a jewelry item, an earring, a necklace, a garment, a ring, an anklet, a bracelet, a tattoo) on various objects (e.g., a human, a mannequin, a showcase model, a body part, a head, a nose, an ear, a neck, an arm, a forearm, an upper arm, a wrist, a torso, a navel, a toe, a finger, a garment, a shoe). For example, instead of virtual earrings being tried on virtual ears, these technologies can be adapted for virtual necklaces to be virtually tried-on virtual necks or other virtual items (e.g., a jewelry item, a garment, a hat, a ring, an anklet, a bracelet, a tattoo) to be virtually tried-on on other virtual objects (e.g., a human, a mannequin, a body part, a showcase model, a head, a nose, an arm, a forearm, an upper arm, a wrist, a torso, a navel, a toe, a finger, a garment, a shoe).

FIG. 1 shows an embodiment of a UI programmed for virtually trying-on a virtual earring according to various principles of this disclosure. In particular, the UI (e.g., a design studio UI) includes a set of user input elements (e.g., a button, an image, a link), a virtual try-on window (e.g., a pane, a tile, an area), and a virtual item window (e.g., a pane, a tile, an area). The set of user input elements includes a set of skin tone controls 1, a set of zoom controls 2, a view all control 5, a social media sharing controls 6, a set of earring selectors 7, and a set of auxiliary controls 8. The virtual try-on window presents a virtual ear 3 and a picture-within-picture (PIP) window 4 lateral or below the virtual ear 3 (although the PIP window 4 can be positioned external to the virtual try-on window above or below or lateral to the virtual ear 3). Note that the virtual ear 3 is frontally presented within the virtual try-on window. The virtual try-on window, the virtual item window, and the set of user input elements collectively enable a virtual try-on on the virtual ear 3 (or another body part) within the virtual try-on window of a virtual earring (or another virtual item) selected or customized within the virtual item window via the set of user input elements.

The virtual try-on window and the virtual item window are positioned side-by-side adjacent to each other. However, note that this positioning can vary and the virtual try-on window and the virtual item window can be positioned above or below or diagonal to each other. For example, the UI can be programmed to enable a user to rearrange (e.g., move) the virtual try-on window and the virtual item window within the UI. Likewise, the virtual try-on window and the virtual item window can be a single window.

The set of skin tone controls 1 (e.g., a set of buttons, a set of images, a set of links) selects a virtual skin tone on the virtual ear 3 frontally presented within the virtual try-on window, where such action occurs responsive to the user selecting a specific skin tone control 1. The set of skin tone controls 1 is external to the virtual try-on window and side-by-side therewith, although this positioning can vary (e.g., internal to the virtual try-on window or above or below or diagonal to the virtual try-on window). The virtual try-on window is positioned between the set of skin tone controls 1 and the virtual item window, although this positioning can vary (e.g., the set of skin tone controls 1 is positioned between the virtual try-on window and the virtual item window or the virtual item window is positioned between the set of skin tone controls 1 and the virtual try-on window). Note that the set of skin tone controls 1 can be omitted.

The set of zoom controls 2 (e.g., a set of buttons, a set of images, a set of links) enables the virtual ear 3 to be zoomed in or out within the virtual try-on window, while the virtual ear 3 is frontally presented within the virtual try-on window, where such action occurs responsive to the user selecting a specific zoom control 2 (e.g., a plus button, a minus button). Note that during such zooming the virtual earring can be simultaneously zoomed as well, which may be while maintaining proportions or scale to the virtual ear 3 or relative to the virtual ear 3. The set of zoom controls 2 is positioned internal to the virtual try-on window below the virtual ear 3, but can be positioned external to the virtual try-on window or above or diagonal or lateral to the virtual ear 3. Note that the set of zoom controls 2 can be omitted.

While the virtual try-on window frontally presents the virtual ear 3 (left as shown), the PIP window 4 frontally presents an opposite virtual ear (right as shown). The PIP window 4 is selectable (e.g., can be activated, clicked, touched) such that the virtual 3 switches with the opposite virtual ear such that the virtual try-on window frontally presents the virtual ear 3 (right as would be shown) and the PIP window 4 frontally presents the opposite virtual ear (left as would be shown). Note that the virtual earring shown virtually tried-on the virtual ear 3 (left as shown) within the virtual try-on window would be responsively placed in a same location on the opposite virtual ear (right as shown) when the virtual 3 switches with the opposite virtual ear such that the virtual try-on window frontally presents the virtual ear 3 (right as would be shown) and the PIP window 4 frontally presents the opposite virtual ear (left as would be shown). Note that the PIP window 4 can omitted. However, if such functionality is still desired, then both virtual ears can be simultaneously shown within the virtual try-on window and virtually trying-on the virtual earring can be simultaneously placed on both virtual ears or there maybe virtual try-on window dedicated to a specific ear. As such, virtually trying-on the virtual earring on one virtual ear 3 may or may not be virtually tried-on the opposite virtual ear.

The view all control 5 (e.g., a buttons, an image) enables simultaneous presentation of the virtual ear 3 and the opposite virtual ear. Such simultaneous presentation can be within the virtual try-on window or within virtual try-on windows dedicated to each virtual ear. For example, the virtual item window may be positioned between such virtual try-on windows, whether side-by-side, above, below, or diagonal to each other, or one of the virtual try-on windows may be positioned between the other virtual try-on window and the virtual item window, whether side-by-side, above, below, or diagonal to each other. There may be a user control element (e.g., a button, an image) to reverse this view all functionality to reversibly present the UI, as shown in FIG. 1.

The social media sharing controls 6 (e.g., a set of buttons, a set of images, a set of links) enables the user to share an appearance or a link to an appearance of the virtual earring being virtually tried-on the virtual ear 3 on a social media network (e.g., Facebook, Instagram). Such sharing can include a post with an image or a screenshot of the virtual earring being virtually tried-on the virtual ear 3. The post may include some preset or default or user customizable text for the virtual earring being virtually tried-on the virtual ear 3. The social media sharing controls 6 is presented lateral to the virtual try-on window and below the virtual item window. However, such presentation can vary. For example, the social media sharing controls 6 can be omitted or presented above or below or diagonal to the virtual try-on window or the virtual item window.

The set of earring selectors 7 (e.g., an image, a graphic, an icon, a tile, a text box, a dropdown menu) is presented within the virtual item window for selection by the user to virtually try-on the virtual ear 3 frontally presented within the virtual try-on window. The set of earring selectors 7 is presented a grid arranged by rows and columns, but this form of presentation can vary (e.g., a carousel, a list). The set of earring selectors 7 can be customizable by various controls (e.g., dropdown menus, dials) presented below the virtual item window (although these can be omitted). For example, these controls can populate, which can be dynamic or in real-time, the set of earring selectors 7 presented within the virtual item window. For example, upon selection of a right ear dropdown menu, the set of earring selectors 7 can be responsively and dynamically increased or decreased in number based on what earring selectors 7 correspond to the right ear drop down menu.

The set of earring selectors 7 is sourced from a catalog of virtual items (e.g., a database, a relational database, an in-memory database) that can be virtually tried-on the virtual ear 3. The catalog of virtual items can be hosted remote from the user or local to the user. For example, the user may operate an application (e.g., a browser, a mobile app, a dedicated application) running on a computing device (e.g., a desktop, a laptop, a smartphone, a tablet) and access the UI hosted on a server remote from the computing device. At that time, the server creates a current copy of the catalog of virtual items and then sends the copy to be downloaded into the application operated by the user. As such, the user may virtually try-on the virtual earring on the virtual ear 3 seamlessly, responsively, and realistically because the application has access to the copy, whether the copy is stored locally internal or external to the application. The copy may be periodically deleted by the application or have an expiration date recognizable by the application or be periodically updateable (e.g., based on differencing) by the application, whether via data push or pull techniques.

The set of auxiliary controls 8 (e.g., an image, a graphic, an icon, a tile, a text box, a dropdown menu) is presented lateral to the virtual try-on window. The set of auxiliary controls 8 enable the user to access various auxiliary functions. These functions can include (a) help for a virtual try-on (e.g., opens or links to a help page or file), (b) save a virtual try-on as presented within the virtual try-on window for remote accessing or customizing later, (c) download a virtual try-on as presented within the virtual try-on window in a file format (e.g., a PDF file, a JPEG file), or other auxiliary functions, as needed. Note that the set of auxiliary controls 8 can be less or more than shown or the set of auxiliary controls 8 can be omitted.

The UI can be presented via or on various form factors. For example, the UI can be presented in a browser running on a client in network communication with a server remote from the client, where the user virtually trying-on the virtual earring is operating the client. For example, the UI can be presented in a mobile app (e.g., a dedicated e-commerce app, a browser app) running on a client in network communication with a server remote from the client, where the user virtually trying-on the virtual earring is operating or physically present before the client. For example, the UI can be presented in an operating system running on a client in network communication with a server remote from the client, where the user virtually trying-on the virtual earring is operating or physically present before the client. For example, the UI can be presented in an application (e.g., a dedicated application, a browser application) running on a computing device (e.g., a desktop, a laptop, a smartphone, a tablet, a wearable, a smart mirror), where the user virtually trying-on the virtual earring is operating or physically present before the computing device. For example, the UI can be presented in an operating system running on a computing device (e.g., a desktop, a laptop, a smartphone, a tablet, a wearable, a smart mirror), where the user virtually trying-on the virtual earring is operating the computing device or physically present before the client.

Figure 2:
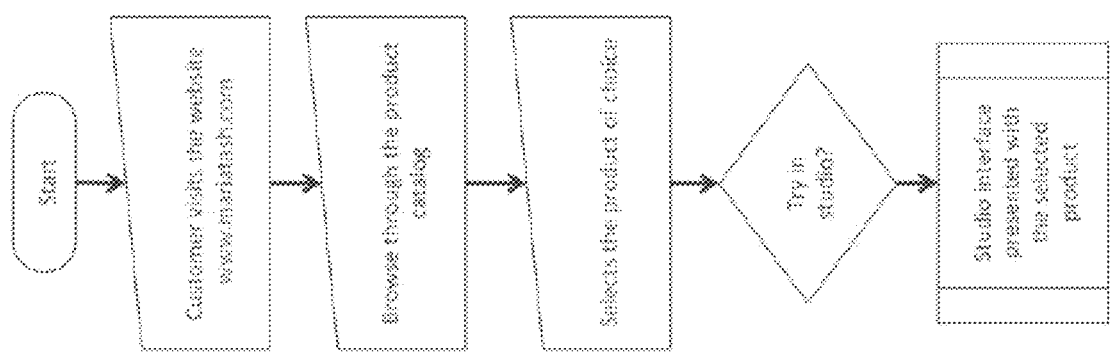
FIG. 2 shows an embodiment of a flowchart for accessing the UI of FIG. 1 according to various principles of this disclosure.

FIG. 2 shows an embodiment of a flowchart accessing the UI of FIG. 1 according to various principles of this disclosure. In particular, the UI is designed to work independently or in operative integration with the catalog of items that can be virtually tried-on the virtual ear 3 or an e-commerce platform of choice. As per the flowchart, when the UI embodied in a web application accessible via a browser, the user may employ the browser to (a) visit www.mariatash.com (or another URL), (b) browse through the catalog of items at www.mariatash.com (or another URL), (c) navigate to an item page (e.g., a jewelry item page, an earring page, a necklace page) to see more details on www.mariatash.com (or another URL), (d) navigate on the item page to see a hyperlink to virtually try-on that jewelry item using the UI (although in-page virtual try-on is possible), (d) activate the hyperlink, and (e) present the UI programmed to enable virtually trying-on the virtual earring corresponding to the item page. The UI is presented within the browser with the item chosen by the user with a choice to pick any other items to virtually try on from the catalog of items. Alternatively, the user can employ the browser, access a webpage (e.g., a third party webpage) presenting a hyperlink to the UI, and activate the hyperlink to present the UI, where the UI can decide what item to virtually try-on on a preset or selected body part. For example, this modality can occur from a top web navigation header or through a promotional link. At that point, the UI does not appear in a default location in the virtual ear as if the user had arrived through an ear category page, as discussed above. If the end user finds the item page from a search result page (e.g., Google search result page), then appearance of the UI can be same as if the user had navigated to the UI via a not product detail page (PDP) link. But that item appearing in or linked from search results should appear as a first choice of the item to select to virtually try-on the virtual ear. Note that the UI can be presented with no preloaded items virtually tried-on on the virtual ear or with a choice to pick any items listed in the catalog of items to virtually try-on or presented as the set of earring selectors 7 within the virtual item window.

Figure 3:
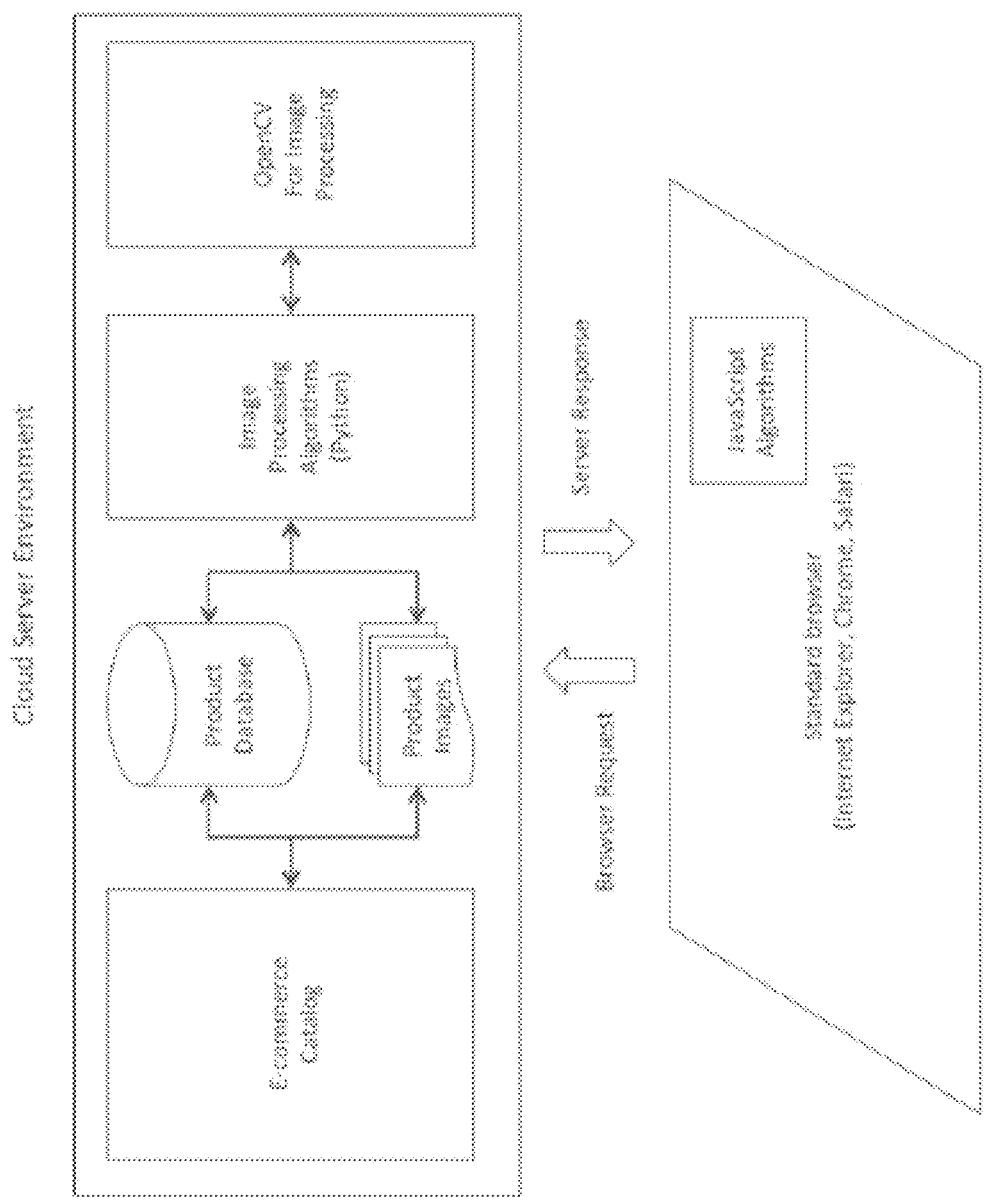
FIG. 3 shows an embodiment of a computing architecture for implementing the UI of FIG. 1 according to various principles of this disclosure.

FIG. 3 shows an embodiment of a computing architecture for implementing the UI of FIG. 1 according to various principles of this disclosure. In particular, the UI is enabled via or executes its algorithms on both client (e.g., a browser) and server (e.g., a cloud server connected to internet) environments. Separation of the algorithms may be done to improve at least some speed of user interaction or improve updating the catalog of items. In general, some, many, most, or all interactions that are related to user responses are delivered within the browser environment (or another application), while tasks (e.g., image manipulation, creating new images) are executed on the server. This is also done with the consideration of limitations of individual technologies as well as maintaining various compatibility with multiple platforms, screen sizes, viewports, and browsers. Some programming technologies that can utilized for the UI can include HTML/DHTML, JavaScript, PHP, MYSQL, Python, OpenCV, or others. Note that FIG. 3 shows the computing architecture diagram for a hosting and execution environment.

The computing architecture can include a network, a server, and a client. The server and the client are communication (e.g., wired, wireless, waveguide) with each other over the network.

The network includes a plurality of computing nodes interconnected via a plurality of communication channels, which allow for sharing of resources, applications, services, files, streams, records, information, or others. The network can operate via a network protocol, such as an Ethernet protocol, a Transmission Control Protocol (TCP)/Internet Protocol (IP), or others. The network can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, or others. The network can include an intranet, an extranet, or others. The network can include Internet. The network can include other networks or allow for communication with other networks, whether sub-networks or distinct networks.

The server can include a web server, an application server, a database server, a virtual server, a physical server, or others. For example, the server can be included within a computing platform (e.g., Amazon Web Services, Microsoft Azure, Google Cloud, IBM cloud) having a cloud computing environment defined via a plurality of servers including the server, where the servers operate in concert, such as via a cluster of servers, a grid of servers, a group of servers, or others, to perform a computing task, such as reading data, writing data, deleting data, collecting data, sorting data, or others. For example, the server or the servers including the server 104 can be configured for parallel processing (e.g., multicore processors). The computing platform can include a mainframe, a supercomputer, or others. The servers can be housed in a data center, a server farm or others. The computing platform can provide a plurality of computing services on-demand, such as an infrastructure as a service (IaaS), a platform as a service (PaaS), a packaged software as a service (SaaS), or others. For example, the computing platform can providing computing services from a plurality of data centers spread across a plurality of availability zones (AZs) in various global regions, where an AZ is a location that contains a plurality of data centers, while a region is a collection of AZs in a geographic proximity connected by a low-latency network link. For example, the computing platform can enable a launch of a plurality of virtual machines (VMs) and replicate data in different AZs to achieve a highly reliable infrastructure that is resistant to failures of individual servers or an entire data center.

The client includes a logic that is in communication with the server over the network. When the logic is hardware-based, then the client can include a desktop, a laptop, a tablet, or others. For example, when the logic is hardware-based, then the client can include an input device, such as a cursor device, a hardware or virtual keyboard, or others. Likewise, when the logic is hardware-based, then the client can include an output device, such as a display, a speaker, or others. Note that the input device and the output device can be embodied in one unit (e.g., touchscreen). When the logic is software-based, then the client can include a software application, a browser, a software module, an executable or data file, a mobile app, or others. Regardless of how the logic is implemented, the logic enables the client to communicate with the server, such as to request or to receive a resource/service from the computing platform via a common framework, such as a hypertext transfer protocol (HTTP), a HTTP secure (HTTPS) protocol, a file transfer protocol (FTP), or others.

Note that this disclosure describes some function in context of some open source libraries. These libraries, their use, utility and purpose are loosely coupled with the algorithms and methods described herein and can therefore be completely replaced or supplemented with any other suitable open source or commercially licensed packages. For example, OpenCV can run on the server and JQuery runs in the browser. For example, OpenCV can run on the server and serves to generate various gray scale models of colored images and outlines of model ear and jewelry. As such, OpenCV can be replaced or supplemented with Google Cloud Vision API, Microsoft Computer Vision, SimpleCV, or other suitable libraries. Likewise, JQuery runs in the browser and helps in better understanding the web page structure and placement of elements, their sizes in the web browser, and other related data. As such, JQuery can be replaced or supplemented with multiple other libraries or even using self-developed functions (if the need arises) to showcase the user interface on multiple devices/screen resolutions and sizes. For example, JQuery can be replaced or supplemented with UmbrellaJS (https://umbrellajs.com), MooTools (https://mootools.net), Sancha JS (https://sencha-.com), or other suitable libraries.

Figure 4:
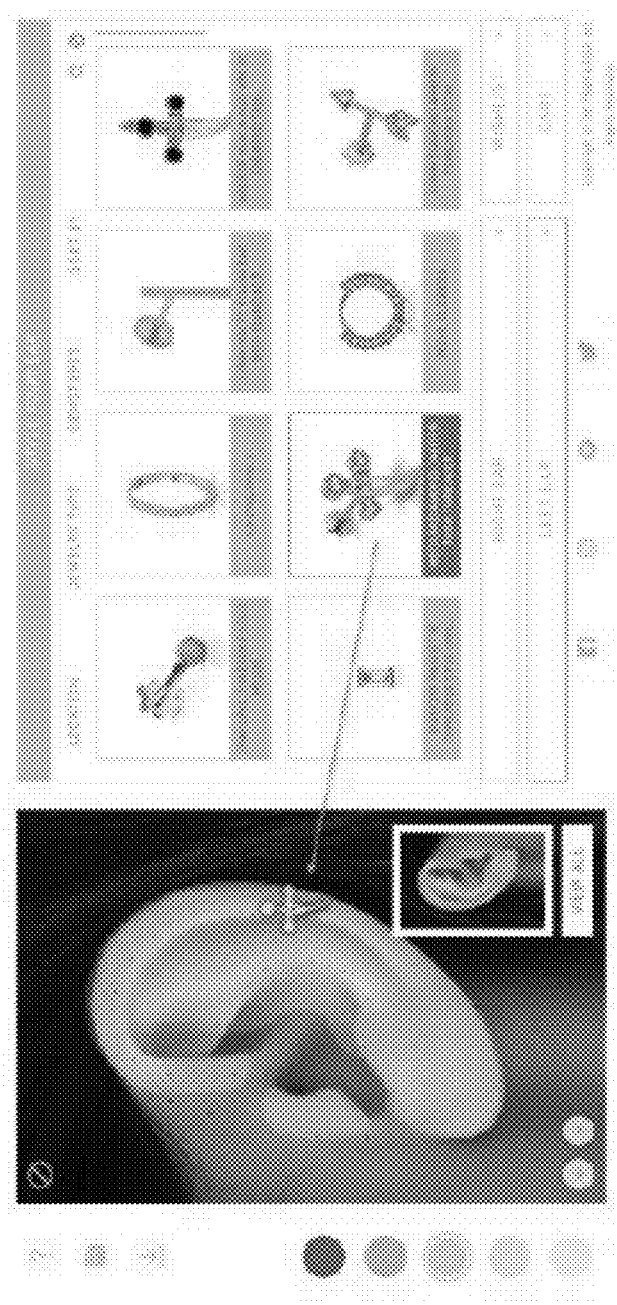
FIG. 4 shows the UI of FIG. 1 where the virtual earring has been drag-and-dropped for virtual try-on according to various principles of this disclosure.

FIG. 4 shows the UI of FIG. 1 where the virtual earring has been drag-and-dropped for virtual try-on according to various principles of this disclosure. In particular, the UI is programmed to enable the virtual earring to be selected by the user in the virtual item window (first user selection), dragged from the virtual item window to the virtual try-on window, and dropped over the virtual ear 3 frontally presented within the virtual try-on window (second user selection) at a virtual location of the virtual ear 3. If where the virtual earring is dropped over the virtual ear 3 at the virtual location is programmed to be suitable for such virtual try-on, then the virtual earring is virtually tried-on the virtual ear frontally presented within the virtual try-on window.

This drag-and-drop functionality can be enabled in various ways. For example, this drag-and-drop functionality can be enabled from an open source library JQuery with its "draggable" and "droppable" functionalities. Further, when the UI is loaded in the browser (or another application), the UI preloads various item information of the item selected by the user to be virtually tried-on (e.g., from a server remote from the browser). This item information can include product images, variants, pricing information and all other related data that is needed to make a successful purchase by the user if the user decides to purchase the item via or from the UI. The server or the client can also request other items that are set by the administrator in the administrator console or panel using various "administrative settings" and/or a predefined list of items or items in a specific category defined in the administrator console or panel. The administrator panel may have different access settings to the UI (or any of its components) from the user.

The drag-and-drop functionality is not required for the UI and other forms of user selection for virtual try-on are possible within the UI. For example, the UI may present a popup, a webpage, a screen, a menu, a prompt, a form, a reflexive questionnaire, a hyperlink, a button, a radio button, a knob, a dial, a wheel, a dropdown menu, a wizard, or other forms of user input that the user can activate, select, operate, navigate, or interface with in order to select the virtual earring and the virtual location on the virtual ear frontally presented within the UI, whether such selection occurs in one action or multiple actions, whether on a per virtual earring basis, per virtual location basis, or collectively for the virtual earring and the virtual location. For example, the user can select the virtual earring presented in the virtual item window and then select the virtual location on the virtual ear in the virtual try-on window or vice versa to enable the virtual try-on of the virtual earring on the virtual ear in the virtual try-on window. Note that such user selection is not limited to a cursor device (e.g., a mouse, a touchpad, a trackpad) or a keyboard (e.g., a physical keyboard, a virtual keyboard). Resultantly, such user selection can occur via a microphone (e.g., a voice command, an intelligent virtual assistant, Apple Siri), a camera (e.g., an optical camera, a thermal camera, a depth camera), or any other suitable sensor (e.g., a radar, a distance sensor, a proximity sensor, a motion sensor, a LIDAR, a sonar, an ultrasonic sensor). For example, such user selection may occur via various touchless hand gestures or touchless finger tracking, whether can be tracked via the camera or any other suitable sensor.

Figure 5:
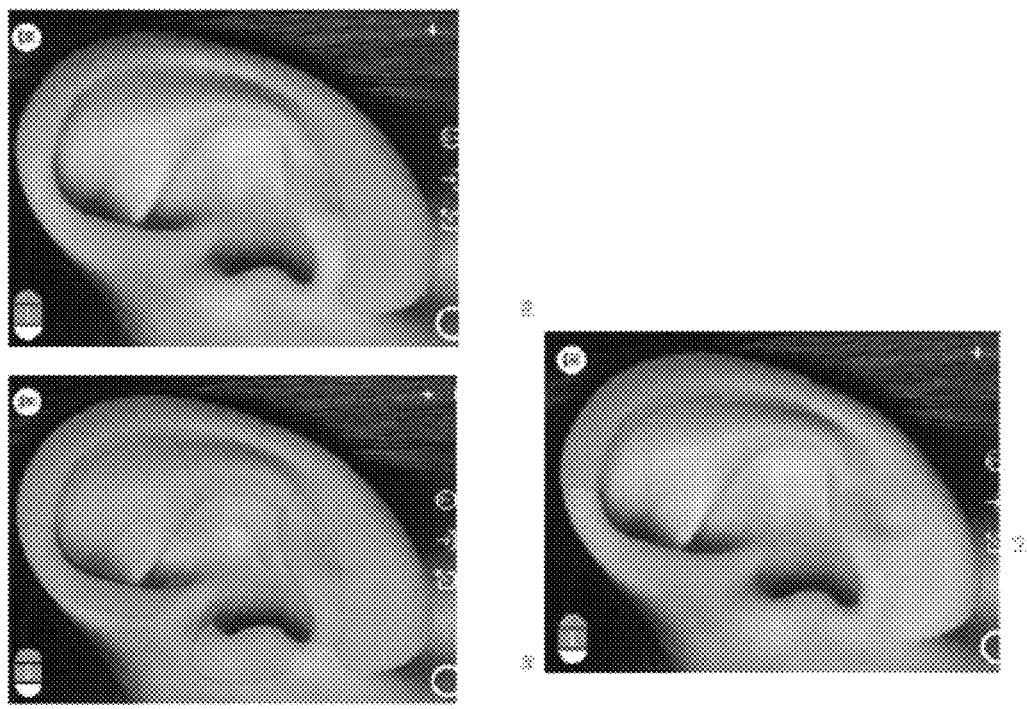
FIG. 5 shows an embodiment of a virtual ear segmented into a set of virtual anatomical regions according to various principles of this disclosure.

FIG. 5 shows an embodiment of a virtual ear segmented into a set of virtual anatomical regions according to various principles of this disclosure. In particular, the virtual try-on of the virtual earring on the virtual ear can be enabled in various ways. For example, the virtual try-on can be enabled via the virtual ear being dependent on an ear architecture where, pictorially, the virtual ear is frontally represented as "a country" segmented by a set of virtual anatomical regions ("a set of states") each further segmented by a set of virtual zones ("a set of counties").

Figure 7:
FIG. 7 shows an embodiment of a virtual ear segmented into a set of anatomical regions and a set of virtual zones within the set of anatomical regions according to various principles of this disclosure.

As shown in FIGS. 5 and 7, the set of virtual anatomical regions is not identical to each other in shape and size. As such, the set of virtual anatomical regions is not identical to each other in perimeter and area. However, this configuration is not required. For example, the set of virtual anatomical regions can be identical to each other in shape or size. As such, the set of virtual anatomical regions can be identical to each other in perimeter or area.

The set of virtual anatomical regions can include a virtual earlobe, a virtual helix, and others. Each virtual anatomical region selected from the set of virtual anatomical regions is further segmented into the set of virtual zones that are polygonal (e.g., square, rectangular, honeycomb, triangular) boxes that may or may not border each other at least within that respective virtual anatomical region from at least one side, as frontally presented. The set of virtual anatomic regions may or may not border each other, as frontally presented.

Each virtual anatomic region selected from the set of virtual anatomical regions has a certain number of virtual zones which may or may not border each other from at least one side, as frontally presented. These virtual zones contain or are logically associated with information about how far or spaced apart from to the virtual anatomical edge/physical border of the ear that respective virtual zone is, which photographic/rendered angle of the virtual item (e.g., a ring or a stud) applies to that respective virtual zone, and applies to an entire area of that respective virtual zone.

When the virtual ear is segmented by the set of virtual anatomical regions each further segmented into the set of virtual zones that are polygonal to each other, as frontally presented, the virtual ear forms an ear canvas or map based on which the virtual earring can be virtually tried-on the virtual ear, especially in a manner more realistic than currently known approaches to providing such functionality without such canvas or map. The ear canvas or map is not visible to the user during the virtual try-on, although the ear canvas or map may be configured to be visible to the user during the virtual try-on. The ear canvas or map is presented over the virtual ear. The ear canvas or map is visible to the administrator operating the administrator console or panel whether or not during the virtual try-on, although the ear canvas or map may be configured to be not visible to the administrator operating the administrator console or panel whether or not during the virtual try-on. Note that when the UI is employed for virtual try-on on other virtual objects, then similar canvas or map can be created or edited accordingly. For example, such canvas or map can be formed for other virtual objects (e.g., a human, a mannequin, a showcase model, a body part, a head, a nose, a neck, an arm, a forearm, an upper arm, a wrist, a torso, a navel, a toe, a finger, a garment, a shoe).

As explained above, the virtual ear is segmented into the set of virtual anatomical regions (e.g., a virtual earlobe, a virtual helix, a virtual tragus) and every such virtual anatomic region is further segmented into the set of virtual zones, as frontally presented. In order to enable the virtual try-on of the virtual earring on the virtual ear, a respective virtual earring (e.g., a database record, a file, an image, a data structure) has a guideline or rule (due to its size and nature) corresponding to which virtual anatomical region of the virtual ear the respective virtual earring can be placed on based on which the administrator of the UI configures possible virtual anatomical regions for the items, while adding the items to the catalog of items for presentation via the UI via the administrator console or panel. Based on various dimensions (e.g., height, length, width) of the virtual earring, as preprogrammed by the administrator via the administrator console or panel, the UI determines which "virtual pierceable areas" would accommodate the virtual earring. The UI is enabled to understand how much the virtual earring can rotate before placement over or within the virtual anatomic region or one of its virtual zones ("hotspot") by the user. While the virtual earring is being dragged or dropped on the virtual ear, as frontally presented within the virtual try-on window, the UI is programmed to highlight various virtual anatomical regions that the virtual earring can be placed on while the virtual ear is frontally presented within the virtual try-on window. If the user decides to drop the virtual earring outside the set of virtual anatomical zones or the set of virtual zones (prescribed areas), then the UI enables or employs a magnet algorithm to find a nearest applicable place for the virtual earring, as frontally presented within the virtual try-on window. This region awareness is created or modified by various settings in the administrator console or panel by the administrator. The UI is programmed to understand various topology of the set of virtual anatomical regions and the sets of virtual zones and appears to place or virtually try-on the virtual earring on an appropriate rotational angle on the virtual ear accordingly, as frontally presented within the virtual try-on window. This appearance creates a realistic rendering of how the virtual earring is virtually worn in different parts of the virtual ear, as would be in real world.

The ear canvas or map, may be formed or edited in many ways. For example, there may be an image of a model ear, as frontally presented, split or segmented in multiple parts according to a respective virtual anatomical region and loaded as such into an application (e.g., a browser). The UI loads various data related to region applicability of the virtual earring while loading various item information, as explained above, which makes the UI aware of each item's applicable regions within the ear canvas or map. Then, a combination of DHTML layers and scripts (e.g., JavaScript) use a position of a cursor (e.g., a mouse, a trackpad, a touchpad, a stylus, a finger) to highlight various applicable regions for the virtual earring. Note that FIG. 5 shows the virtual ear being split or segmented into several virtual anatomical regions, a virtual earlobe anatomical region, and a virtual helix anatomical region, each as frontally presented.

Figure 6:
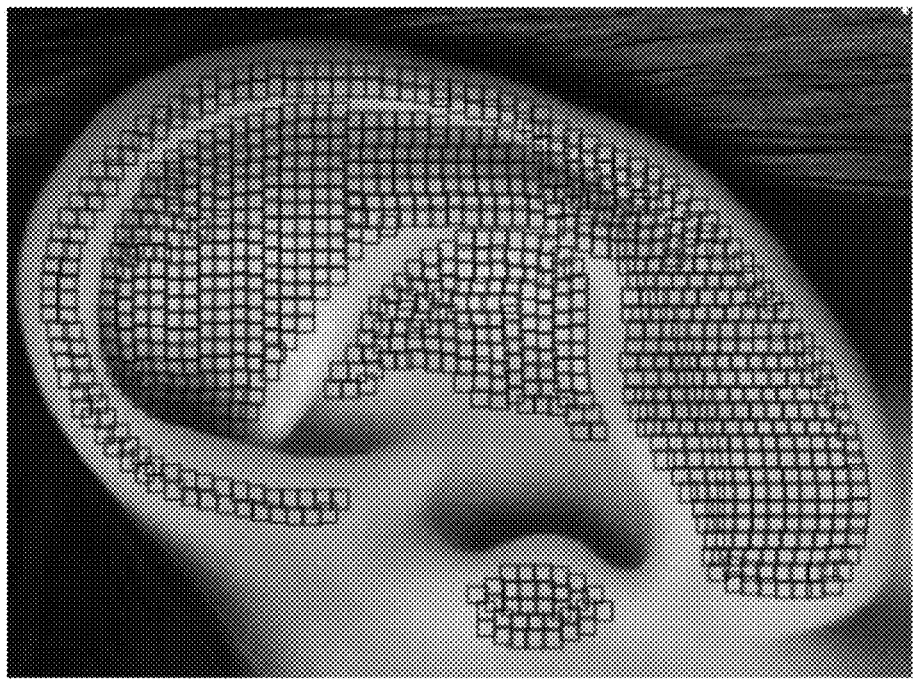
FIG. 6 shows an embodiment of a virtual ear segmented into a set of virtual zones according to various principles of this disclosure.

FIG. 6 shows an embodiment of a virtual ear segmented into a set of virtual zones according to various principles of this disclosure. As explained above, each virtual anatomical region is further segmented into the set of virtual zones. As shown in FIG. 6, a single zone is a rectangular (but can be square or polygonal or triangular or non-rectangular) area where the virtual ear can be virtually pierced in order to virtually insert the virtual earring in the virtual ear or virtually try-on the virtual earring on the virtual ear, as frontally presented. Each such zone is mapped to a virtual anatomical region. If the item can be placed in or over or virtually tried-on at a virtual anatomical region, then the item can be placed (e.g., dragged over) on any of its assigned zones. For simplification, the set of virtual zones are subparts of each virtual anatomical region, as frontally presented.

For example, there may be a total of 919 zones (although more or less is possible as needed for more or less granularity). Further distribution of virtual zones to virtual anatomical regions can be: tragus virtual anatomical region=1-33 virtual zone number, earhead virtual anatomical region=34-77 virtual zone number, helix virtual anatomical region=78-186 virtual zone number, rook virtual anatomical region=187-387 virtual zone number, Tash Rook virtual anatomical region=388-417 virtual zone number, contra conch virtual anatomical region=418-483 virtual zone number, earlobe virtual anatomical region=484-723 virtual zone number, anti-tragus virtual anatomical region=724-782 virtual zone number, conch virtual anatomical region=783-915 virtual zone number, and daith virtual anatomical region=916-919 virtual zone number. Note that this is illustrative and there can be more or less virtual zones, depending on granularity desired.

In terms of virtual size, each virtual zone selected from the set of virtual zones are about 1 millimeter per side, as suitably scaled, or in area or perimeter (but can be greater or lesser). Although each virtual zone selected from the set of virtual zones can be identical in size and shape to each other, as frontally presented, this is not required and various virtual zones selected from the set of virtual zones can be identical and non-identical to each other in shape or size, as frontally presented. Each virtual zone selected from the set of virtual zones is mapped to a product angle, which means whenever any item is placed on or in or virtually tried-on at this virtual zone, as frontally presented, the UI is programmed to cause the item to appear to rotate to virtual zone angle realistically suitable for that virtual zone. The item can be placed "anywhere" in a respective virtual zone, eventually which means that an ear can be pierced anywhere within an area enclosed within that virtual zone. If the item is dropped out of a respective pierceable area, then a magnetic effect is applied to cause the item to attract or snap to a nearest realistically suitable zone (e.g., based on smallest pixel distance thereto). The set of virtual zones is not visible to the user (but can be). The set of virtual zones is predefined in the UI, as set or programmed within the administrator console or panel by the administrator, and preloads with various specified regions. Note that various HTML, CSS, and JavaScript technologies may be combined to enable placement of the item in appropriate virtual zones.

FIG. 7 shows an embodiment of a virtual ear segmented into a set of virtual anatomical regions and a set of virtual zones within the set of anatomical regions according to various principles of this disclosure. Note that each colored area corresponds to a different virtual anatomical region of the virtual ear, where each virtual anatomical region is further segmented into the set of virtual zones, as described above.

Figure 8:
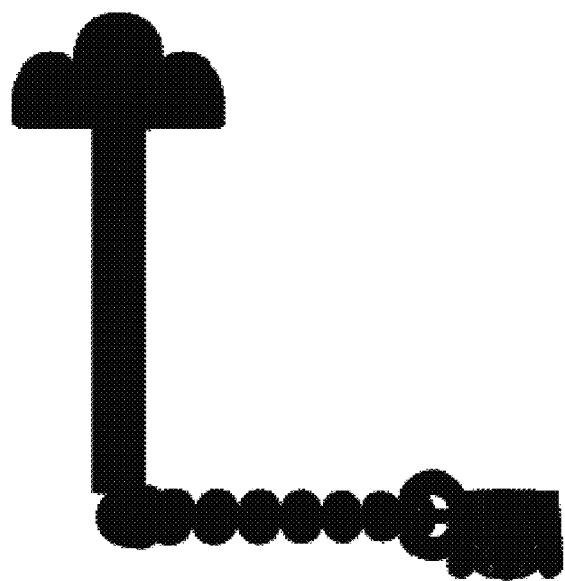
FIG. 8 shows an embodiment of a virtual earring appearing as being rotated in an XZ plane according to various principles of this disclosure.
Figure 9:
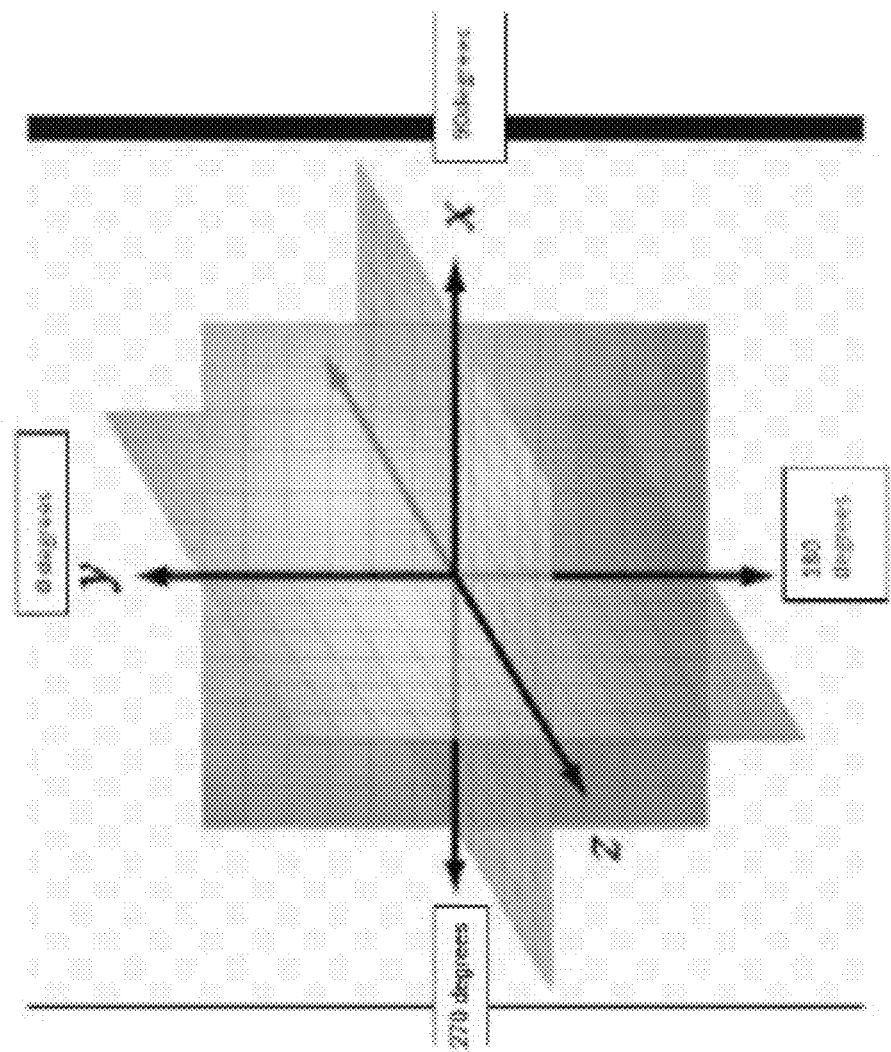
FIG. 9 shows an embodiment of a virtual plane for rotation of an earring according to various principles of this disclosure.

FIG. 8 shows an embodiment of a virtual earring appearing as being rotated in an XZ plane according to various principles of this disclosure. FIG. 9 shows an embodiment of a virtual plane for rotation of an earring according to various principles of this disclosure. In particular, the UI is programmed such that the virtual earring appears to change in rotational angle within the UI (e.g., during or after a drag-and-drop operation or a user selection) depending on where the virtual location for virtual try-on is located on the virtual ear within the UI. This may be enabled in various ways. For example, each virtual zone, as explained above, may correspond to a specific rotational angle (e.g., on an X-Y-Z plane) of the virtual earring, depending on the virtual earring selected by the user (first user selection). Each virtual earring may have various images associated therewith. These images depict that virtual earring from various different rotational angles. Each virtual zone may be associated with a different image for the virtual earring selected to be virtually tried-on. Therefore, when the user selects the virtual earring to be virtually tried-on at the virtual location of the virtual ear, the UI identifies a respective virtual anatomic region containing the virtual location, a respective virtual zone within the respective virtual anatomic region containing the virtual location, identifies a corresponding image for the respective virtual zone, and presents the corresponding image of the virtual earring selected for that virtual try-on, as explained above. Since each virtual zone corresponds to a specific image with a specific rotational angle for the virtual earring selected for that virtual try-on, the virtual earring is thereby enabled to orientationally appropriate present itself in a manner more realistic that currently known approaches to providing such functionality. Therefore, various rotation angles specified by various allocated virtual zone are used to rotate the virtual earring, as selected for virtual try-on. For example, based on the virtual earring shown in FIG. 8 and the virtual plane shown in FIG. 9, a rotational angle in the XZ plane of −12 deg, −6 deg, 0 deg, +6 deg & +12 deg can be used for virtual studs, while a rotational angle in the XZ plane of −24 deg, −18 deg, +18 deg & +24 deg can be used for virtual rings. Note that these angles are illustrative and can be modified as needed based on virtual earring type, morphology, and other parameters.

Figure 10:
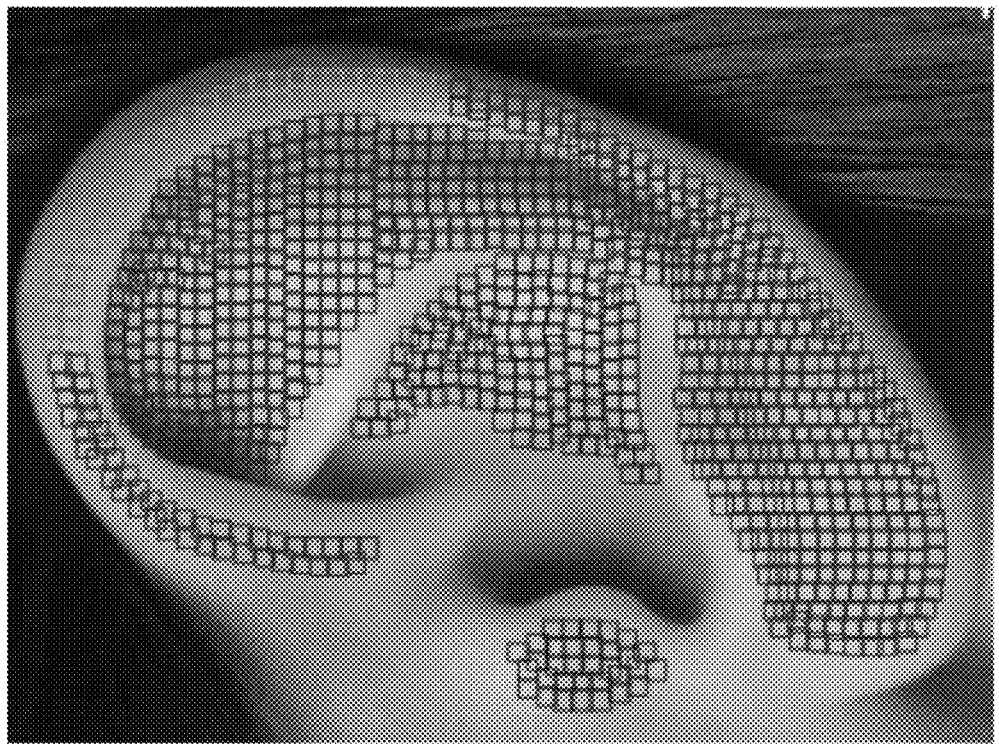
FIG. 10 shows an embodiment of a set of virtual zones corresponding to a set of angles for rotating a virtual earring with a stud according to various principles of this disclosure.

FIG. 10 shows an embodiment of a set of virtual zones corresponding to a set of rotational angles for rotating a virtual earring with a stud according to various principles of this disclosure. Note that there are various photographic angles for the virtual earring with the stud. As shown in FIG. 10, green rectangles use 0 deg studs in the XZ plane, blue rectangles use 6 deg studs XZ plane, and black rectangles use 12 deg studs in the XZ plane. Therefore, FIG. 10 shows various zone-to-item rotation angles mapping for the virtual earring with the stud.

Figure 11:
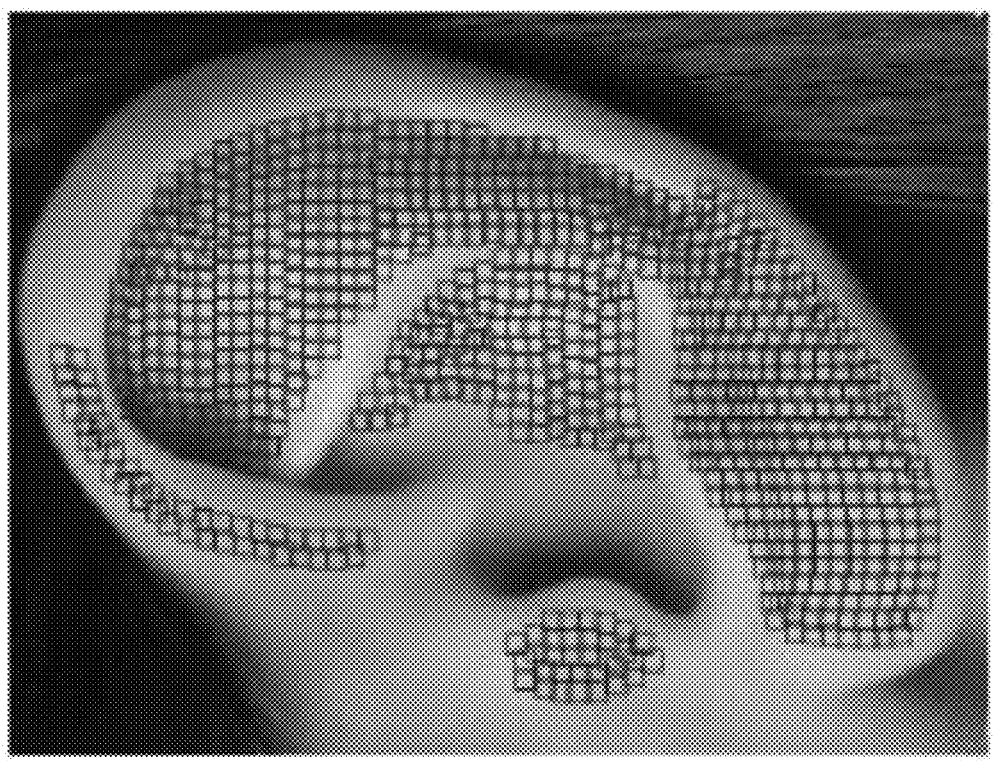
FIG. 11 shows an embodiment of a set of virtual zones corresponding to a set of angles for rotating a virtual earring with a ring according to various principles of this disclosure.

FIG. 11 shows an embodiment of a set of virtual zones corresponding to a set of rotational angles for rotating a virtual earring with a ring according to various principles of this disclosure. Note that there are various photographic angles for the virtual earring with the ring. As shown in FIG. 11, blue rectangles use 18 deg rings in the XZ plane and black rectangles use 24 deg rings in the XZ plane. Therefore, FIG. 11 shows various zone-to-item rotation angles mapping for the virtual earring with the ring.

Figure 12:
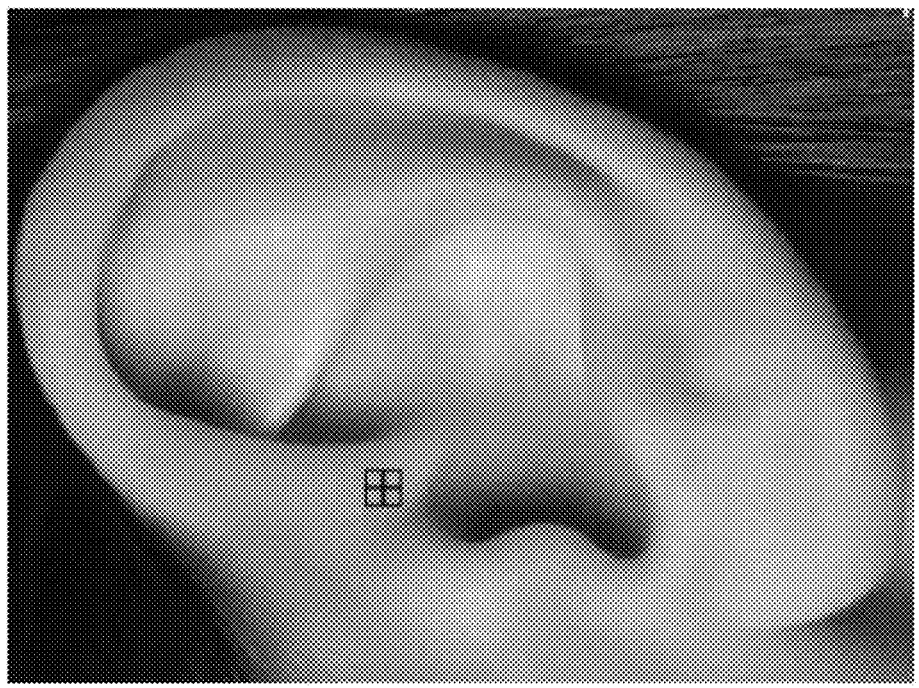
FIG. 12 shows an embodiment of a set of virtual zones corresponding to a set of angles for rotating a virtual earring with a daith ring according to various principles of this disclosure.

FIG. 12 shows an embodiment of a set of virtual zones corresponding to a set of rotational angles for rotating a virtual earring with a daith ring according to various principles of this disclosure. Note that there are various photographic angles for the virtual earring with the daith ring. As shown in FIG. 12, there may be a daith ring rotation angle +6 deg. Therefore, FIG. 12 shows various zone-to-item rotation angles mapping for the virtual earring with the daith ring.

FIG. 13 shows an embodiment of a virtual earring with a set of rotational angles that are different from each other according to various principles of this disclosure. In particular, the virtual earring shown on left has a sample virtual try-on in the virtual helix anatomical region at a rotational angle of 0 deg. The virtual earring shown on right has a sample virtual try-on in the virtual tragus anatomical region at a rotational angle of 12 deg. The UI may apply rotational angle in various ways. For example, there may be a logic having a pseudocode:

```
Procedure applyRotation( ):
1.   hotspot ← The current hotspotwhere the item is placed (e.g. user
        drag and dropped, user clicked or otherwise selected)
2.   productType ←get the type of current item placed (e.g. type data
        related to data record of item being currently viewed)
3.   angle := hotspot.getRotationAngleFor (productType based on
        hotspot)
4.   newProductImage← Get the product image for angle
5.   update_product_image (newProductImage)
6.   return
```

Figure 14:
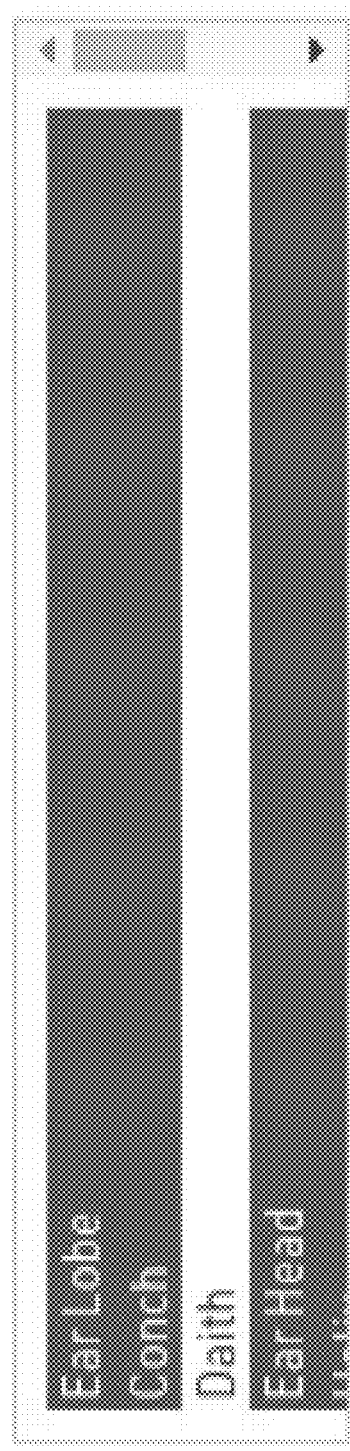
FIG. 14 shows an embodiment of a section of a UI programmed for mapping a virtual earring to an anatomic region selected from the set of anatomical regions of FIGS. 5-7 according to various principles of this disclosure.
Figure 15:
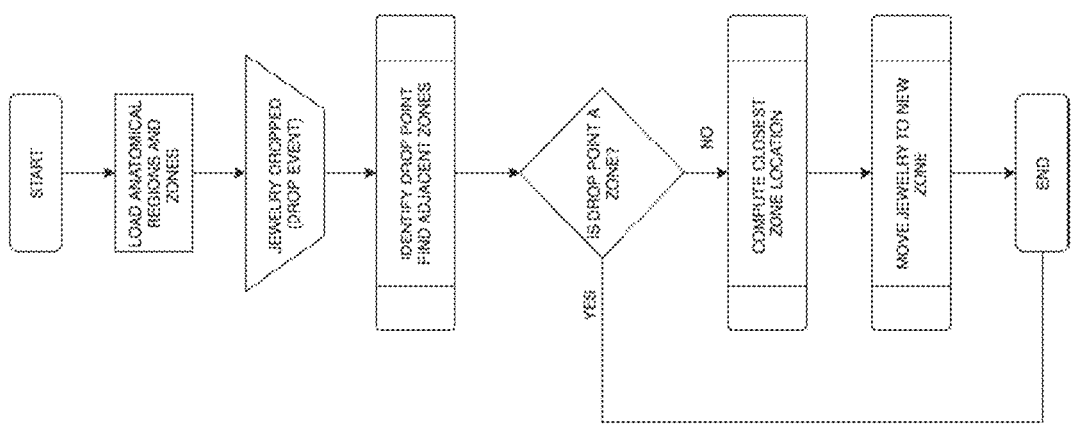
FIG. 15 shows an embodiment of a flowchart for enabling a magnetic effect according to various principles of this disclosure.

FIG. 14 shows an embodiment of a section of a UI programmed for mapping a virtual earring to an anatomic region selected from the set of anatomical regions of FIGS. 5-7 according to various principles of this disclosure. In particular, the UI may employ a magnetic effect. FIG. 15 shows an embodiment of a flowchart for enabling a magnetic effect according to various principles of this disclosure. In particular, the virtual ear is mapped with the virtual anatomical regions to specify where a specific virtual earring can be virtually positioned/placed or otherwise virtually tried-on. These virtual anatomical regions are preconfigured in the administrator console or panel and then applied to each individual virtual earring based on the virtual location/position that virtual earring can be worn at. The UI, as part of its loading process, preloads this information along with various virtual earring data. Some virtual anatomical regions on the virtual ear can be highlighted as the user drags and tries to place the virtual earring on the virtual ear. If the user places or attempts to virtually try-on the virtual earring on the virtual ear, but not exactly on a particular virtual zone, as described above, then the virtual earring is automatically moved to a nearest virtual zone, i.e., those virtual zones virtually attract the virtual earrings thereto and thereby enabling the magnetic effect. The nearest virtual zone can be based on a rectilinear pixel distance between where the user places the virtual earring and a border, whether inner or outer, or the central point or the non-central point of the nearest virtual zone. Having the virtual earring positioned over or on the virtual zone enables or helps the UI to know its exact current image zone location and relative position to different parts of the virtual ear (which can be equally important and utilized in multiple other computations as listed in subsequent sections).

As shown in FIG. 15, the ear map or canvas used to place the virtual earring is location-sensitive. As soon as or responsive to the virtual earring entering the ear map or canvas area over the virtual ear (in background), the UI starts tracking where the virtual earring is located over the ear map or canvas over the virtual ear. As the drop (or positioning) event is identified, the UI accesses a list of pre-defined virtual zones, as explained above, and runs various real-time calculations to identify the nearest virtual zone, which can be based on the rectilinear pixel distance between where the user places or drops (or positions) the virtual earring and the border, whether inner or outer, or the central point or the non-central point of the nearest virtual zone. The virtual earring is then moved to place on the hotspot by adjusting the drop coordinates, which can be with an animation effect of movement. This magnetic functionality may be written using JavaScript or may run in a browser environment, although other languages or environments can be used as well. The UI may apply the magnetic effect in various ways. For example, there may be a logic having a pseudocode:

```
Procedure getNearestPossibleHotspot( ):
1.   x,y ←The current coordinate where the item is dropped
        (or positioned). For example, the current coordinate can
        include a virtual zone identifier or an X-Y coordinate.
2.   nearestZone ← Initialize first virtual zone
3.   nearestDistance ← Assign distance between first virtual
        zone and x,y coordinates
4.   for each zone do
        zoneX, zoneY ← The coordinate of zone
        if (x,y) lies with zone do
            a. return currentZone
        end if
        distance = √((zoneX − x)2 + (zoneY − y)2
        if distance < nearestDistance do
            b. nearestZone ←Current virtual zone
            c. nearestDistance ←distance
        end if
5.   end for
6.   return nearest Zone
```

Figure 16:
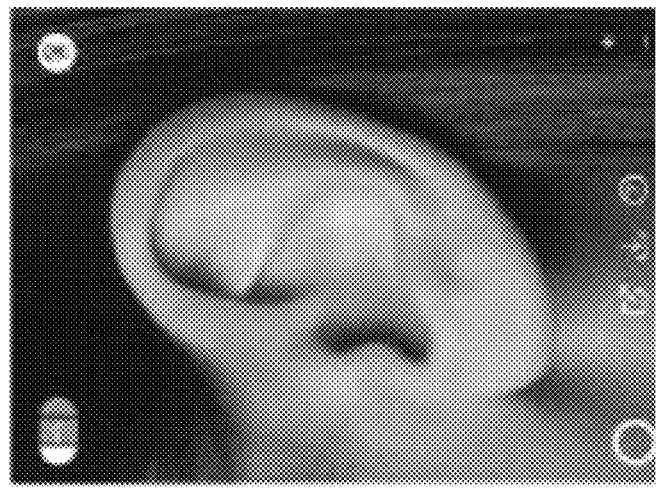
FIG. 16 shows an embodiment of a virtual ear segmented into a set of layers according to various principles of this disclosure.
Figure 17:
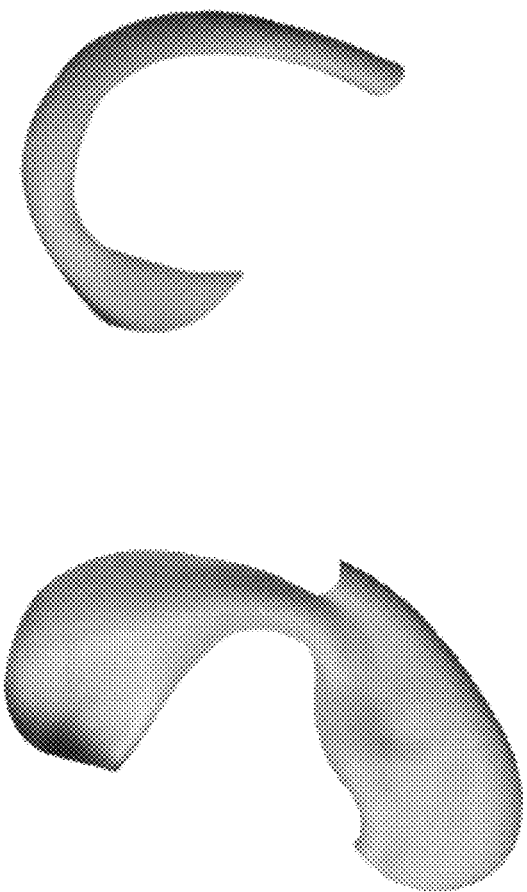
FIG. 17 shows an embodiment of a set of layers of a virtual ear according to various principles of this disclosure.

FIG. 16 shows an embodiment of a virtual ear segmented into a set of layers according to various principles of this disclosure. FIG. 17 shows an embodiment of a set of layers of a virtual ear according to various principles of this disclosure. FIG. 18 shows an embodiment of a virtual ear without a tucking effect and with a tucking effect during a virtual try-on according to various principles of this disclosure. In particular, the virtual ear includes a set of depth areas where the item can be positioned (e.g., dropped). As such, the UI may be programmed to appear as if a portion of the item in these depth areas is dynamically hidden or dynamically unhidden. The UI is programmed to make positioning of the item appear more realistic by knowing which depth portions and how much of the item can appear to be dynamically hidden under uneven pockets of the virtual ear and hides those portions of the item via the depth portions as the user virtually tries find a desired placement for a desired look of the item being virtually tried-on. As the item is moved (e.g., positioned, repositioned, dragged-and-dropped) to other portions of the virtual ear, which may not be necessarily hiding any parts of the item, then the UI adjusts the desired look accordingly.

The UI can be programmed to dynamically hide and dynamically unhide the portion of the virtual earring in various ways. For example, to map the set of depth areas, the virtual ear, as shown in FIG. 16, is cropped in multiple regions of various depths. There are various regions (e.g., 2, 3, 4, 5, 6, 7, 8, 9, 10 or more) in which the virtual ear is segmented, as shown in FIG. 17. These regions are different layers that are used to achieve such functionality. Each of these layers is set with an opacity to hide various objects underneath or overlaid in certain areas. Layers also have predefined boundaries that limit at least some movement of the objects, which offers at least some feel of the item being pocketed in certain parts of the virtual ear.

The item may be overlaid over or tucked into the set of depth areas of the virtual ear. As shown in FIG. 17, an image depicting the virtual ear into different layers so that the item can get sandwiched between these layers. As shown in FIG. 18, the virtual earring shown right left is presented without a tucking effect into any depth areas of the virtual ear, whereas the virtual earring shown on right is presented with the tucking effect into at least one of depth area of the virtual ear. The UI may apply dynamic tucking and dynamic untuckng angle in various ways. For example, there may be a logic having a pseudocode:

```
Initialize:
    tuckingBoundaries ←Initalize the boundaries for all tucking
    areas in the virtual ear with x,y coordinates.
Procedure perform ProductTucking( ):
1.  productBoundaries ← Get the item boundaries after the item
    is dropped or positioned on the virtual ear
2.  appliedLayer ← Get the current layer from the allocated
    virtual zone
3.  if productBoundaries crossed tuckingBoundaries do
      i. revert to previous position
4.  else
      ii. sandwich the item in layers using z-index
5.  end if
6.  return
```

Figure 19:
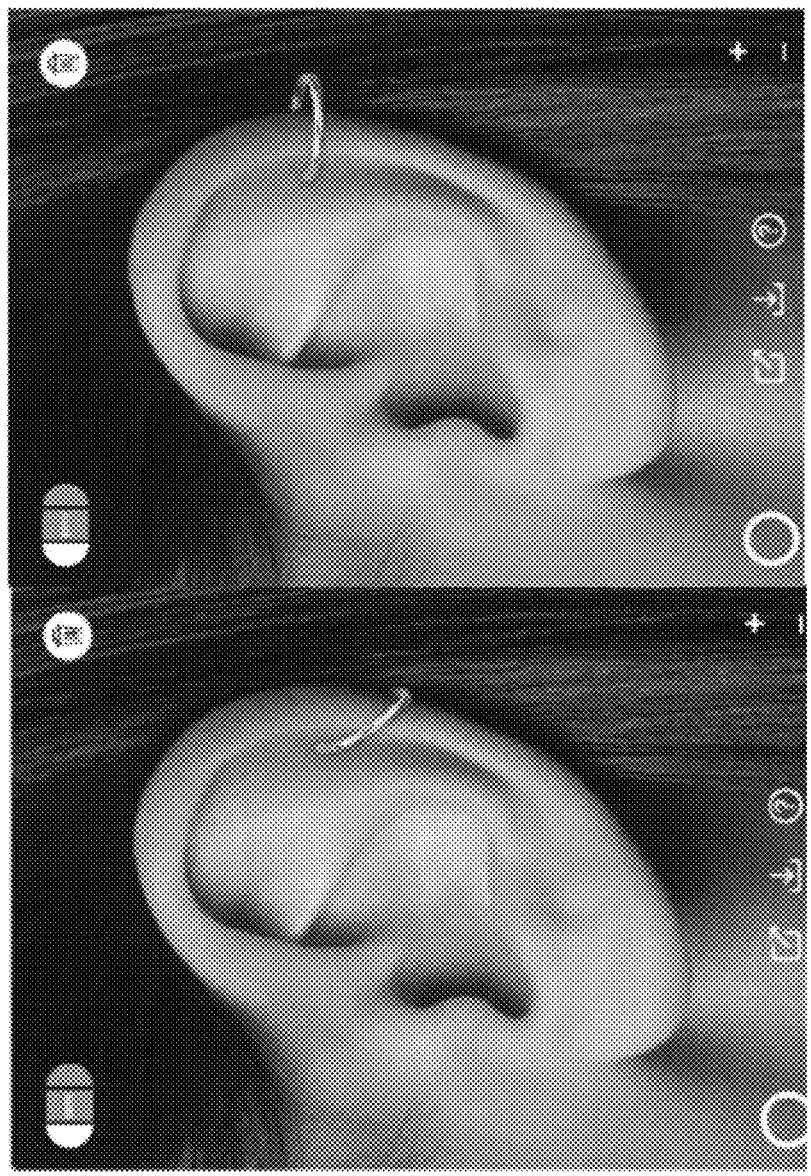
FIG. 19 shows an embodiment of a virtual gravity effect being applied to a virtual earring virtually tried-on a virtual ear according to various principles of this disclosure.

FIG. 19 shows an embodiment of a virtual gravity effect being applied to a virtual earring virtually tried-on a virtual ear according to various principles of this disclosure. The UI is programmed to enable the gravity effect for the virtual earring. The gravity effect occurs when item virtually falls down due to its perceived virtual weight. For example, when the virtual earring includes a ring placed or positioned on the virtual ear, the ring falls down to provide more realism. The ring virtually falls down only when there is space available between an outer edge of the virtual ear and an outer edge of the ring. This fall occurs only to a level until the ring virtually touches or contacts the virtual ear (e.g., virtual skin).

The gravity effect may be implemented in various ways. For example, when the ring is virtually placed or positioned onto the virtual ear, the ring starts completely horizontally and then starts virtually falling down (e.g., pivoting, rotating) until the ring virtually touches or contacts the virtual ear. The gravity effect may be developed in JavaScript. As shown in FIG. 19, the virtual earring shown on left is virtually tried-on with the gravity effect, in contrast with the virtual earring shown on right, which is virtually tried-on without the gravity effect. The UI may apply the gravity effect in various ways. For example, there may be a logic having a pseudocode:

```
Initialize:
    earBoundary ←Initalize the boundary of the virtual ear with x,y
    coordinates.
Procedure applyGravity( ):
1.  ringBottom Point ←Get the bottom point of ring from where
    material starts
2.  piercingPoint ←Get the point where the virtual ear is pierced to
    put ring
3.  gravityAngle := NULL
4.  while gravityAngle is NULL do
      a. spin ringBottom Point towards outer ear boundary
      b. if ringBottom Point crossed earBoundary do
         i.  gravityAngle := spinAngle
         ii. exit while loop
      c. end if
5.  end while
6.  Spin the ring by gravityAngle
7.  return
```

Figure 20:
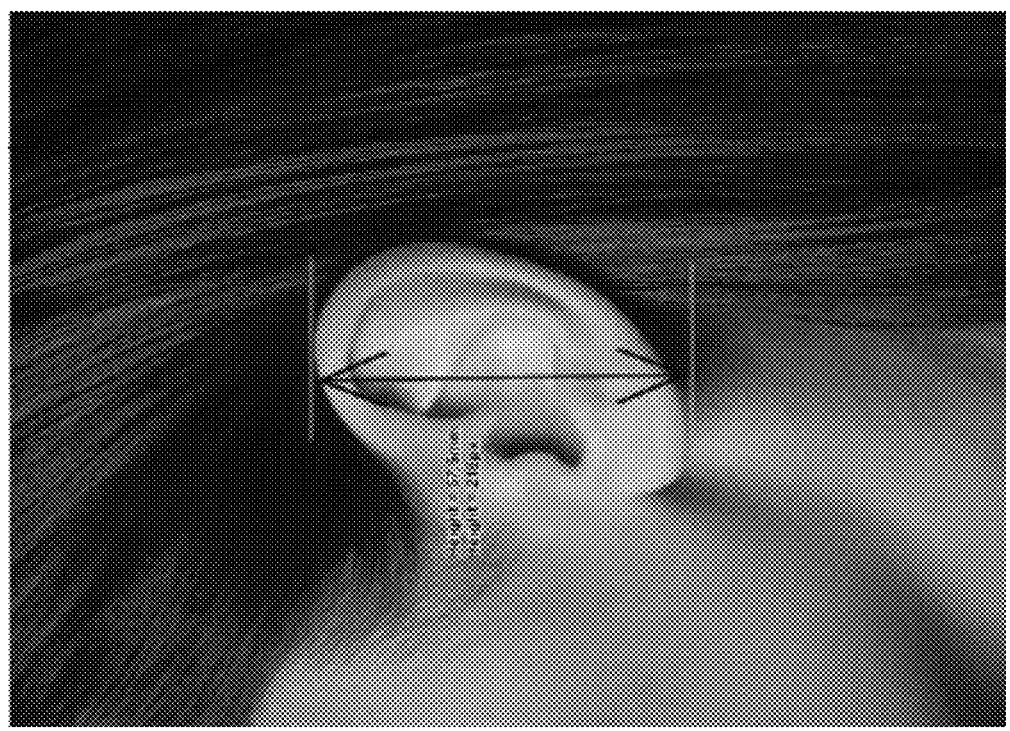
FIG. 20 shows an embodiment of a size of a virtual ear for proportion according to various principles of this disclosure.
Figure 21:
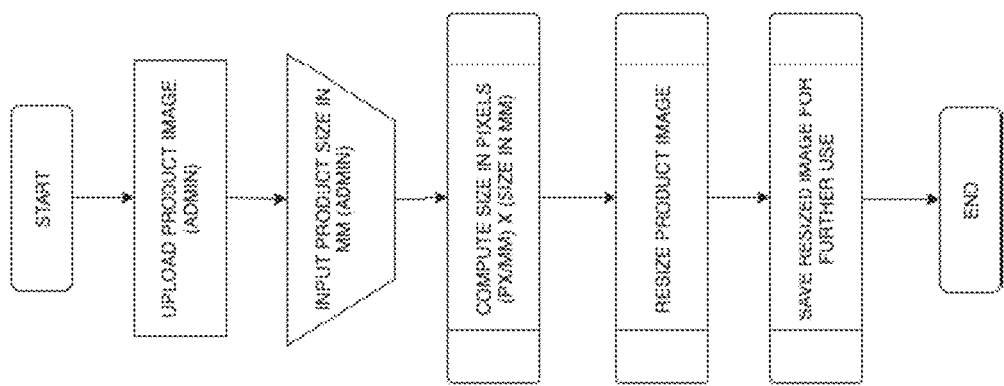
FIG. 21 shows an embodiment of a flowchart for resizing an image of an ear for subsequent use according to various principles of this disclosure.

FIG. 20 shows an embodiment of a size of a virtual ear for proportion according to various principles of this disclosure. FIG. 21 shows an embodiment of a flowchart for resizing an image of an ear for subsequent use according to various principles of this disclosure. In some embodiments, since the virtual ear is an image, the virtual ear may not properly reflect an actual size of a real ear, just like the item to be virtually tried-on. As the size of the image (e.g., a photo) is not proportioned to an actual size of the real ear, various techniques can be performed to pre-process the image to the actual size. The size of the virtual ear can stay fixed in millimeter (even though in zoom and pan functions the size increases in the proportionate size). For accurate sizing, the actual ear depicted in the image is considered for proportion. The size of the ear is specified as 57.5 mm in height (although this sizing can vary). There is no specific need of knowing the width. Any one from height/width is enough, since this is desired to have an idea about dimension conversion ratio from millimeter to pixels. At the most zoomed out level, the respective proportion of ear in pixels can be 218 px. i.e. about 1 mm is equal to 218/57.5 P-1 3.8 px (although this can vary). There may be a total 16 zoom stages (although this can vary). These stages range from level 1 to level 2.5 with a zooming rate of 0.1 i.e. 10% each mode. The default zoom level is 1.8 when the UI is loaded first (although this level can vary). In the administrator console or panel, there is a form or a user input element to offer the administrator to input the item's dimensions height or width in millimeters (mm). This measurement of about 1 mm P-1 3.8 px at zoom level 1 is used to scale the item proportionally into pixels. The formula used to determine the item scale is: Size in pixels=Size in mm*3.8*Current Zoom Level.

As explained, in some embodiments, the lowest zoom level can be 1 and highest is 2.5 (although these levels can vary as needed). Each zoom is incremented by 0.1 i.e. by 10% (although these increments can vary as needed). Therefore, the zoom values would be 1.0, 1.1, 1.2, 1.3 . . . , 2.4 & 2.5. Resulting into a total 16 stages. The image of the item is then processed to remove the background and scaled to the proportionate size according to the virtual ear. Note that various techniques can pre-process these scaled version of images for immediate access to the user using the UI, while a different set of images may be used to showcase the item display in search and product detail pages. As shown in the flowchart of FIG. 21, the image of the item is scaled to the correct size by taking in the measurements of the item entered by the administrator via the administrator console or panel, while adding the item and proportionately adjusting the size of the item. Resizing images with an added dimension of proportion ensures the item size remains realistic and the user can pick and choose from the different sizes of the same item based on their preference.

Figure 22:
FIG. 22 shows an embodiment of a virtual earring being virtually tried-on with a drop shadow and without a drop shadow during a virtual try-on according to various principles of this disclosure.

FIG. 22 shows an embodiment of a virtual earring being virtually tried-on with a drop shadow and without a drop shadow during a virtual try-on according to various principles of this disclosure. In particular, once the item is placed or positioned on the virtual ear with the clear background and size, sometimes, the item may still appears to be fake or as two images stapled on each other as such. Therefore, natural look of the item placement can be achieved via adding natural light the shadows to the item and around the item. The shadows may be placed with a presumed source of light and its impact so multiple items positioned on the virtual ear reflect similarly. There can be two types of shadows that are related to the item. The first one is a reflection of a virtual skin tone on the item and second one is the shadow to item on the virtual ear. The shadow on the virtual ear can be programmed in a system for five different static virtual skin tones (although more or less is possible). Depending on the virtual skin tone selected, the shadow may vary. Each shadow can have different color, shadow movement, and spread. For example, there can be a presumed light source and for 2d images there may be one light source in a studio for creating 2d images of the item rotationally angled differently, as described above. However, for 3d images, there may be multiple light sources in the studio for creating 3d images of the item rotationally angled differently, as described above.

These forms of shadowing can be implemented in various ways. For example, when the image of the item is placed or positioned on the virtual ear, a JavaScript algorithm detects its coordinates as the UI interface is location aware. The shadow may differ for each virtual skin type and colors may be different per virtual skin tone. Each virtual skin tone may have a unique shadow, hue/color, density (opacity), position/placement (top, left, right, and bottom) or other characteristics.

If the UI is programmed to enable the user to upload an image depicting the user's own ear (e.g., a selfie from a webcam, a smartphone camera, a tablet camera, a laptop camera, a smart mirror camera), then the UI will apply dynamic shadow depending on the virtual skin tone detected within the ear depicted in the image. When the item is placed or positioned on the virtual ear, there will be a snap or section of the virtual skin surrounding the item. The virtual skin tone can be obtained from this skin snap or section, which may be via an average skin hex or hexadecimal color code. Once the average skin tone hex or hexadecimal color code is obtained, then the relative shadow color will be applied to the item. The image depicting the user's own ear may be scanned for the virtual skin tone, based on pixels. The UI may be programmed to apply reflections, lights, and shadows on the item, from the virtual skin. For example, a reflection of the virtual skin may be applied on the metal (or non-metal) surface of the item. The virtual skin tone may be dynamically selected by reading the average hex or hexadecimal color of the virtual skin region around the item virtually tried-on the virtual ear. As shown in FIG. 22, the virtual earring shown on right is given the drop shadow to make the virtual earring appear more real and dimensional, whereas the virtual earring shown on left presents the virtual earring without the drop shadow.

Figure 23:
FIG. 23 shows an embodiment of a virtual earring being virtually tried-on as not recommended (although possible) or impossible during a virtual try-on according to various principles of this disclosure.
Figure 24:
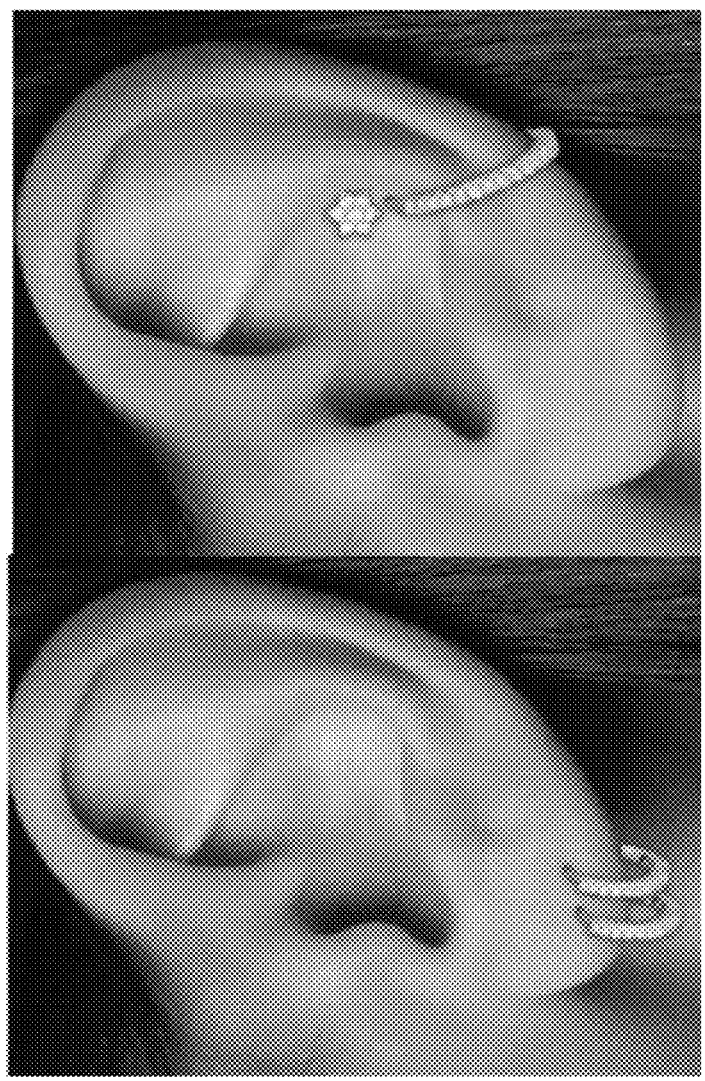
FIG. 24 shows an embodiment of a virtual earring being virtually tried-on as recommended or possible during a virtual try-on according to various principles of this disclosure.

FIG. 23 shows an embodiment of a virtual earring being virtually tried-on as not recommended (although possible) or impossible during a virtual try-on according to various principles of this disclosure. FIG. 24 shows an embodiment of a virtual earring being virtually tried-on as recommended or possible during a virtual try-on according to various principles of this disclosure. In order to create various looks or compare and contrast various looks or items, the UI is programmed to have awareness of positioning of multiple items. The user of the UI is free to add as many items as desired to enable the user to come up with a desired look that the user would like to see (although this number of items may be capped at a preset amount). Therefore, the UI allows adding multiple items as well as adding the same item multiple times on the virtual ear. If the item is selected and then placed or positioned on the virtual ear, then no other item should be able to be placed on top of that item (although that is possible). Some techniques may be used to restrict placement or positioning of the items by the end user on top of one another and if the items are tried to be placed on one another over the virtual ear, then these techniques may use the magnetic effect, as described above, to move the newly added item to the nearest possible location such that the newly item is not placed or moved on top of the old item that is already being virtually tried-on on the virtual ear.

This awareness of positioning of multiple items may be implemented in various ways. For example, each time the item is placed or positioned on the virtual ear, a script (e.g., JavaScript) keeps track of the virtual location of the placement or positioning and the virtual zone. The script stacks the virtual locations and on the event of the item drop event, the virtual location is validated for its overlapping on any other item. The script may then call or invoke the magnetic effect to find the nearest possible placement for the item, knowing various constraints of the virtual anatomical region placements, based on the ear canvas or map.

FIG. 25 shows an embodiment of a virtual ear being shows as a left ear and a right ear during a virtual try-on according to various principles of this disclosure. In particular, the UI is programmed to present a left frontal view of the virtual ear or a right frontal view of the virtual ear. The user may be allowed to place the items on both right and left virtual ears, as presented frontally within the virtual try-on window, based on the user's preference. The user can switch the view between the left and right virtual ears by clicking on selection button (or another user input visual element) in the UI of a preferred ear to virtually try-on item. While accounting for reversal, mirroring, or symmetry, both views (left and right) of the virtual ears are mapped with the exact same zones, sizes and all other required configuration to offer the accurate placements, as described above. When switching over from the right view to the left view or vice versa, the UI may or may not automatically place or position the item the user is currently virtually trying-on onto the corresponding spot on the newly switched view of the virtual ear. For example, the UI can offer the freedom to place and work with different items on different virtual ears, as needed. The different virtual ears may or may not be simultaneously presented. As shown in FIG. 25, there are different items added on the virtual left ear view and the virtual right ear view, although same is possible, as explained above.

Such switching between the left frontal view of the virtual ear or the right frontal view of the virtual ear may be implemented in various ways. For example, various scripts (e.g., JavaScript) managing the placements, drag, drop, pan, move, zoom and other techniques including the magnetic effect, the virtual zone management, and others, are configured differently with the each ear but can be similarly configured as well. With these two sets of data, depending on the switch the user makes, the data set changes for all calculations and placements. For example, the item images of different views can be correspondingly reversed for different ear images. For example, since each virtual ear view provides similar functionality, there may be a shared core algorithm to virtually try-on items on both virtual ear views, but with different data sets for different virtual ears. For example, the different data sets may be from the user, where the virtual right ear view and the virtual left ear view don't have to be symmetrical to each other but can be. The UI may apply virtual ear view switching in various ways. For example, there may be a logic having a pseudocode:

```
Procedure perform LeftRightSwitch( ):
  1. NewSide ← Get the ear side to be switched
  2. Change the Ear Image in the dashboard
  3. Update all virtual anatomical region area for new ear
  4. Update all virtual zones for new areas
  5. Remove all added items for OldSide
  6. Update all previously added items for NewSide
  7. return
```

```
Procedure performPanning( ):
  1. movementX ← Get the number of pixels dragged in X axis
  2. movementY ← Get the number of pixels dragged in Y axis
  3. Reposition Ear image by movementX and movementY
  4. Reposition Regions by movementX and movementY
  5. Reposition Zones by movementX and movement
  6. Reposition products in ear by movementX and movementY
  7. return
```

Figure 26:
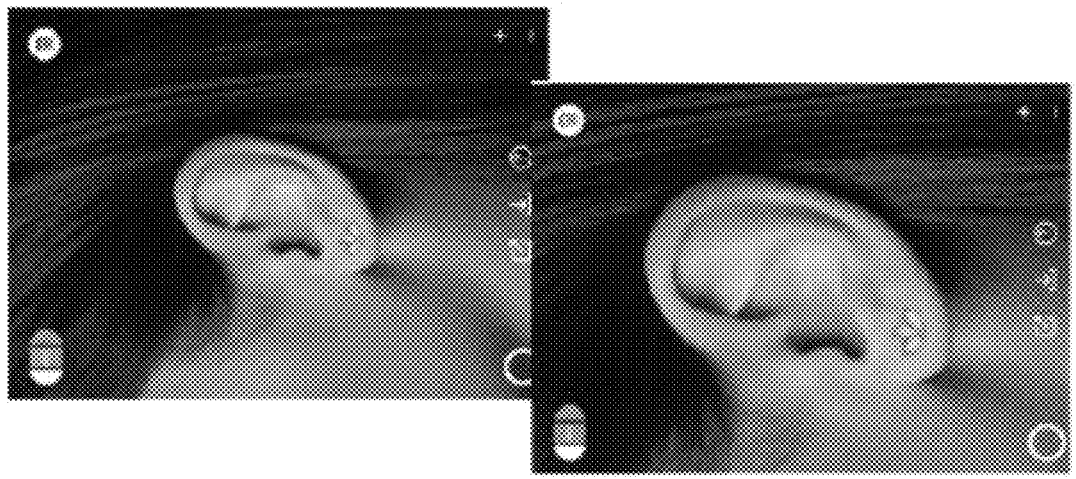
FIGS. 26-27 show an embodiment of a virtual ear being zoomed during a virtual try-on according to various principles of this disclosure.
Figure 27:
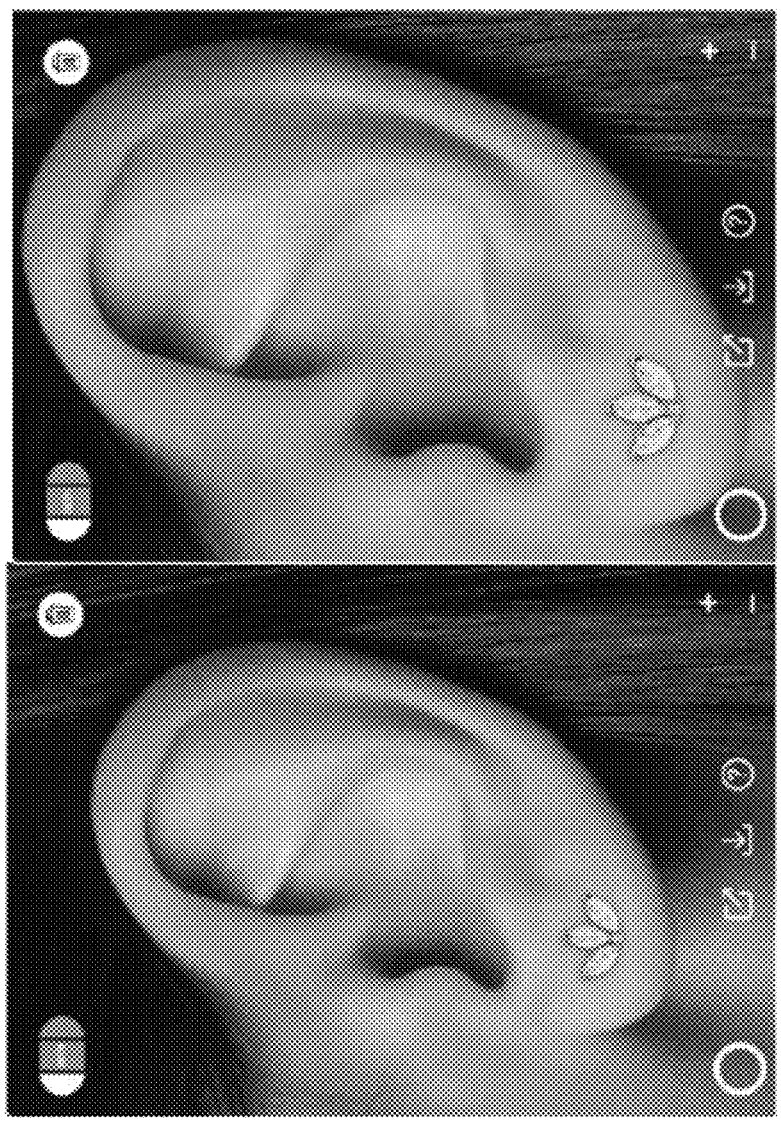

FIGS. 26-27 show an embodiment of a virtual ear being zoomed during a virtual try-on according to various principles of this disclosure. In particular, the user is offered the zoom functions through + and − icons on the UI (although other icons can be used). The + function enlarges the size of the virtual ear and the − function reduces the size. Default zoom is set at 0, which means that is the smallest view the user can have. There are 7 zoom levels (or more or less), each one enlarges the view bit further than the previous one.

Such zooming functionality can be implemented in various ways. For example, the zoom level is one such parameter as the virtual left ear view or the virtual right ear view. The zoom level functions as a switch which adds a multiplier to all placements and calculations. As the user presses the zoom button, the UI increases the height and width of the virtual ear in proportion and the currently placed item as well. More so, the UI also recalculates the pixels at which the item will be placed in a zoom view, new boundaries for the zones, and so forth. When the item is being placed or positioned while the zoom function is on, the multiplier acts as a base for calculating the accurate size of the item in the zoom setting. Note that the size in pixels=size in mm*3.8*current zoom Level. As shown in FIGS. 26-27, the virtual ear is zoomed in from 100% to 250% and the item is proportionally scaled or resized as well. The UI may apply zooming in various ways. For example, there may be a logic having a pseudocode:

```
Procedure updateZoomLevel( ):
  1.    newZoom Level ← Get the new zoom level to be applied
  2.    Calculate & update Ear image size for new zoom level
        a. newSize = InitialSize * zoomLevel    . . . Eq (1)
  3.    Calculate & update virtual anatomical region sizes for new
        zoom level (using eq.1)
  4.    Calculate & update virtual zone sizes for new zoom level
  5.    Calculate & update item sizes in the virtual ear
  6.    return
```

Figure 28:
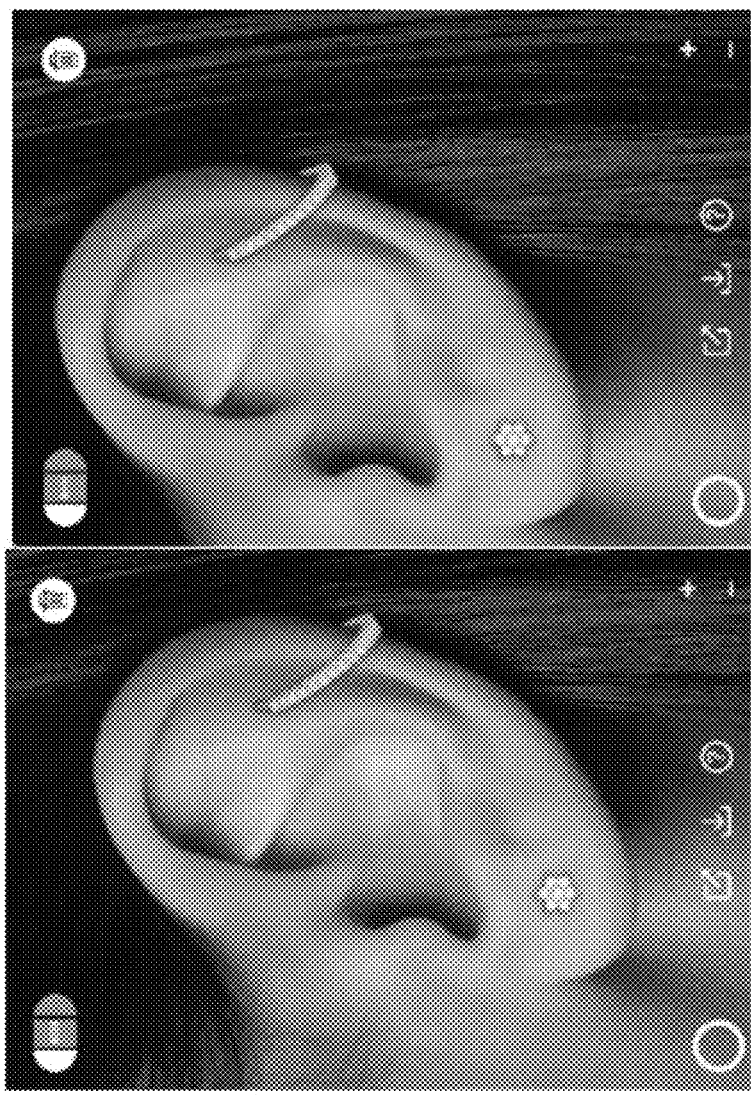
FIG. 28 shows an embodiment of a virtual ear being panned or moved during a virtual try-on according to various principles of this disclosure.
Figure 29:
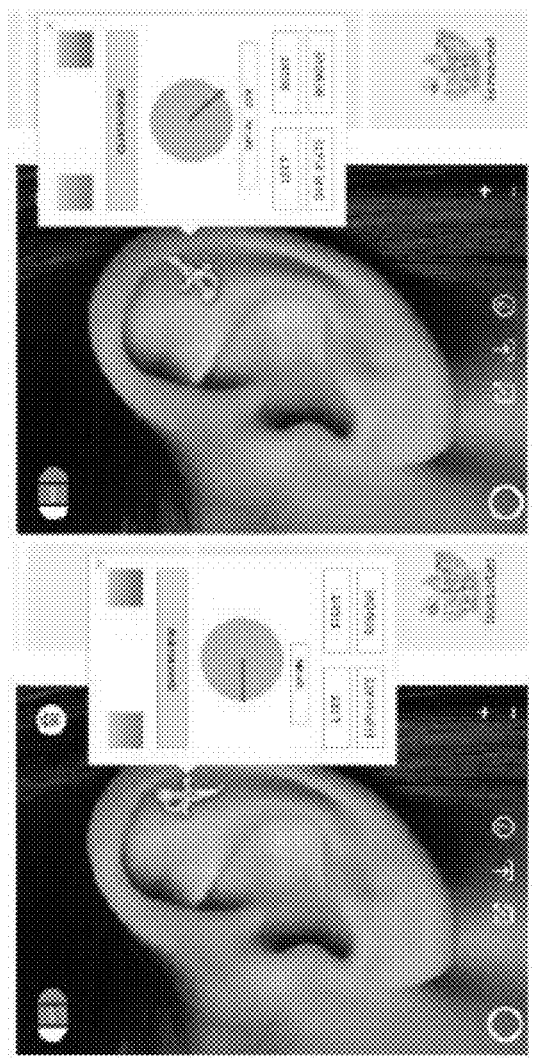
FIG. 29 shows an embodiment of a virtual earring being spun responsive to a user input over a virtual ear relative to the virtual ear during a virtual try-on according to various principles of this disclosure.

FIG. 28 shows an embodiment of a virtual ear being panned or moved during a virtual try-on according to various principles of this disclosure. In particular, the UI may be programmed to enable panning or moving. When the virtual ear is zoomed in, the user may want to pan (move) the virtual ear to see other areas of the virtual ear. The user may be offered a way to move the virtual ear within the virtual try-on window when zoomed in. The user may drag the virtual ear and start moving top-down or sideways. All the items, virtual anatomical regions, and the virtual zones automatically move when the user moves the virtual ears. For example, when the user drags the virtual ear within the virtual try-on window, the relative moment is recorded by the UI such that other contents in corresponding virtual anatomical regions, virtual zones and previously placed items also is moved accordingly. This functionality may be implemented in various ways (e.g., JavaScript). The UI may apply this panning or moving in various ways. For example, there may be a logic having a pseudocode:

FIG. 29 shows an embodiment of a virtual earring being spun responsive to a user input over a virtual ear relative to the virtual ear during a virtual try-on according to various principles of this disclosure. In particular, when the virtual earring with a stud is placed or positioned over the virtual ear, the user may want to spin the item to see how that style would look. The users are provided with a popup or menu or sidebar, whether over or not the virtual try-on window, with a user input element (e.g., a spinner, a rotate wheel, a knob, a dial) programmed to enable the virtual earring to spin about the stud once placed or positioned over the virtual ear. For example, the rotate wheel can be provided to the user where the user can spin the virtual earring to any desired angle desired, whether clockwise or counterclockwise. Note that the UI is programmed such that if the virtual earring is spun and resultantly extends beyond a tucking restriction of a specified area, as described above, then the spin may be reverted to best possible spin angle such that the virtual earring does not appear to puncture or hurts the virtual skin.

The spinning functionality can be implemented in various ways. For example, the spinning functionality can be handle by a script library (e.g., a JavaScript library). When the virtual earring is spun, the UI may be programmed to check if any part of the virtual earring crosses the tucking area, as explained above, if not, then the spin angle is allowed, else the spin angle is reverted back to previous spin angle. The UI may apply this spinning in various ways. For example, there may be a logic having a pseudocode:

```
Procedure performSpinning( ):
  1.    currentSpinAngle ← Get the current spin angle of item
  2.    spinAngle ← Get the spin angle to be applied
  3.    Apply the specified spinAngle to the item
  4.    Validate the new item coordinates are not crossing the
        tucking boundaries
  5.    If boundary is crossed then
        a. Revert the spinAngle to the currentSpinAngle
  6.    return
```

Figure 30:
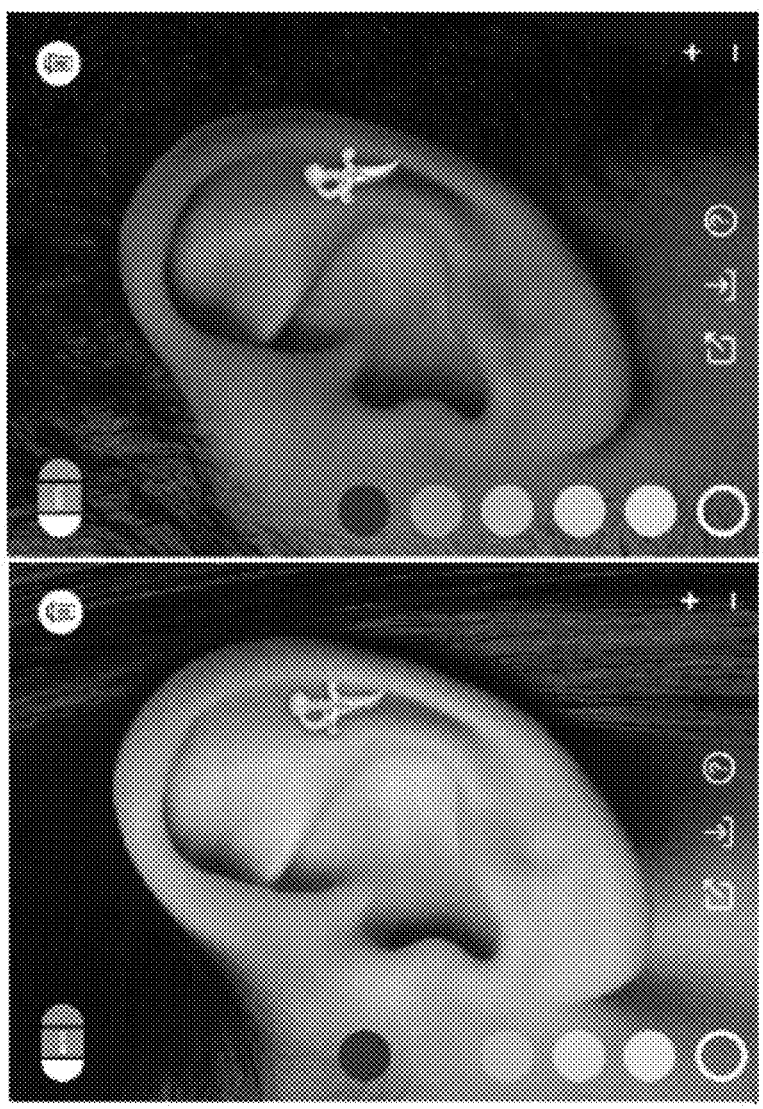
FIG. 30 shows an embodiment of a virtual ear changing in a virtual skin ton during a virtual try-on according to various principles of this disclosure.

FIG. 30 shows an embodiment of a virtual ear changing in a virtual skin tone during a virtual try-on according to various principles of this disclosure. In particular, the UI is programmed to enable the user to select the virtual skin tone from a specific range of skin tones in the UI. When the user chooses the appropriate virtual skin tone, the ear image may be changed to match the selected virtual skin tone (e.g., new image, filter) or the virtual skin tone may change without changing the ear image. Selecting the virtual skin tone does not affect the placement of item and all placed items stay in the same place. The shadow of the item may get changed to match the selected virtual skin tone. When the user selects the virtual skin tone, the corresponding skin image may be called from the server and updated on the UI or the virtual skin tone may change without changing the ear image. The new shadow settings for the selected virtual skin tone can also be applied to the item.

The UI may also be programmed to save the look, as formed or edited by the user in the UI. When the user is satisfied with the various item placements, the user may want to save that virtual workspace to modify later or to show to another person. The UI may be programmed to enable the user to save the look into a user's account associated with the UI or a platform providing the UI or an e-commerce platform for the seller of the item. This form of saving the virtual workspace may be enabled in various ways. For example, when the user clicks an input element for the save option, all the added items with its locations (e.g., coordinates based on the ear canvas or map) are saved in the user's account. The user could login to the account later and resume the process when desired. The virtual workspace may be cleared after a preset time period (e.g., 3 days, 2 weeks, 1 month).

The UI may be programmed to enable collaboration on the look, as formed or edited by the user in the UI. The users may want to seek someone's suggestion in placing the item. The user may want to share an editable version of the virtual workspace. The UI may be programmed to enable the user to share the editable virtual workspace with some other user for that other user to read, write, delete, or other computing functions. This functionality can be implemented in various ways. For example, this process can be handled by a script (e.g., JavaScript) and a database storing the virtual workspace and managing access, as disclosed herein. The database may also store the catalog of items, as described above. The user will first save the current virtual workspace and then could share that workspace, as saved, with the other user (e.g., via email, text message, social media post). The other user may receive a link to this workspace where that other user could activate the link, access the shared virtual workspace, and edit therein as needed. These edits can be manually or periodically saved (e.g., every 1 minute, every 30 seconds). These edits can be visible to all the collaborators in real-time.

The UI may be programmed to enable the user to download the look. When the user is satisfied with the various item placements, the user may want to save the whole look into file (e.g., a PDF file, an image file). The UI may be programmed to present a user input element (e.g., a button, a hyperlink) to be activated by the user in order for the user to save the look into the file and then download the file onto the user's computing device (e.g., a desktop, a laptop). This download functionality may be implemented in various ways. For example, when the user clicks the user input element for the download option, a new image is created with the look, as created or edited by the user, and all the relevant visual elements, including the virtual ear, items, and so forth, are added into the file. Then, the file then gets downloaded to the user's browser.

The UI may be programmed to enable the user to share the look on various social media networks. When the user is satisfied with the various item placements, the user may want to share the look, in part or in whole, with their friends via email or social media handling. The UI may be programmed to have a hyperlink to enable such sharing from the UI. This social sharing functionality may be implemented in various ways. For example, when the user clicks a user input element (e.g. a button, a hyperlink) for the share option, the UI has a new popup appear prompting the user to select a sharing method (e.g., email, Facebook, Instagram). When the user selects the method, a third party system is opened or a third party API is called or invoked to perform a corresponding social media login and then the look is posted from the user's account. Note that the UI or its underlying system may or may not store user credential for the sharing method.

As explained above, various technologies described herein enable the user to more accurately or realistically virtually try-on or preview or simulate various jewelry items (or other wearables) on the virtual ear, body, or skin. Likewise, various technologies described herein enable the user to virtually try-on or preview or simulate various jewelry items (or other wearables) in various virtual piercing locations that the user may not yet have and the user may thereby be enabled to plan future real piercings. Similarly, various technologies described herein enable the user to custom-size virtual jewelry items (or other wearables). For example, after uploading an image of the user's own ear with current piercings (e.g., via a smartphone camera, a tablet camera, a webcam camera, a dedicated camera), the server may process the image via various computer vision techniques (e.g., object detection, edge detection, color contrast, depth detection) and identify (e.g., detect, recognize) the current piercings for accurate sizing of the jewelry items to be virtually tried-on or previewed or simulated. This can be achieved in multiple ways. For example, one way this can be achieved is by recognizing various pictorial characteristics of a piercing/divot on the ear of the image uploaded by the user. For example, there can be calibrating the scale of the ear depicted in the image to the UI. Knowing the user's current piercings, as identified, and the relative scale of the ear of the user depicted in the image, especially the distance between the current piercings and the edge of the ear of the user depicted in the image, allows the UI to output suggestions (e.g., text, images, sound) based on where the current piercings (e.g., divot, hole) are virtually located in the ear of the user depicted in the image. For example, the server can detect the hole (or its surrounding area) seen in the divot/dimple in the skin of the ear of the user depicted in the image in relation to the outer edge of the ear anatomy, as shown in the image. When the user places or positions a new item image on or over the uploaded ear image, as now depicted as the virtual ear, in order to virtually try-on or preview or simulate the new item over the virtual ear, as formed from the ear depicted in the image uploaded by the user, then the item (e.g., a virtual earring with a ring pattern) that are depicted may be placed more realistically and "snugness" of the item (e.g., a virtual earring with a ring pattern) would be measured accurately for the user's own unique ear pattern depicted in the image, as uploaded by the user. Likewise, unique styling suggestions can be made for the user.

As explained above, various technologies described herein enable virtual try-on or preview or simulation more realistically than currently known approaches to providing such functionality. For example, unlike some of such approaches, which may allow the user to virtually try-on the item on the earlobe image in one fixed location over the earlobe image, sitting in one orientation, various technologies described herein enable the user to virtually try-on or preview or simulate the item because the user can drag-and-drop (or otherwise select the item and the virtual location) the item onto some, many, most, all, or any pierceable area on the ear image. Further, unlike some of such approaches, various technologies described herein enable virtual try-on or preview or simulation that renders the item image realistically on the virtual ear taking into consideration virtual gravity effects, virtual ear morphology, volume, and scale. Additionally, unlike some of such approaches, various technologies described herein enable for customized virtual try-on or preview or simulation of the item (e.g., spinning the item over the virtual ear). Moreover, unlike some of such approaches, various technologies described herein enable the user to place or position the virtual earring with a stud over the virtual ear and spin the virtual earring to some, many, most, all, or any desired angle (just as the user may in real life with a real stud being worn in the user's ear) The UI enables the virtual earring to be virtually tried-on or previewed or simulated, while accounting for its scale and boundaries. For example, the virtual earring may avoid rotating beyond a predetermined boundary. For example, if the earring would not rotate in real world due to hitting or contacting the skin, then such state of being may be virtually mimicked in the UI. As explained above, such functionality may be enabled via some, many, most, all, or any boundaries of flaps and ridges of the virtual ear being mapped. Also, various technologies described herein enable the UI to be programmed to preclude placement or positioning (e.g., drag-and-drop) of certain types of virtual earrings (e.g., with studs) for virtual try-on or preview or simulation over certain virtual locations over the virtual ear since those may not be possible in the real world. For example, if the user wanted to select a width of a virtual stud and tried to place or position that stud image in the conch area of the virtual ear and, due to the width, the virtual stud was too large to fit, as would be in the real world, then the stud image would magnetically snap to the closest location to that selected where the virtual could fit, as explained above. For example, this magnetic snap may be enabled because the UI understands the width of all of the folds and crevices in the mapped topology of the virtual ear, as preprogrammed in advance. In addition, various technologies described herein enable a virtual try-on or preview or simulation of more than one item on the virtual ear simultaneously. For example, as explained above, the user may virtually try-on a first item on the virtual ear and then may virtually try-on a second item, different or identical to the first item, while the first item is being virtually tried-on the virtual ear in order to compare or contrast how the first item compares to the second item at different virtual locations of the virtual ear. Moreover, the UI is enabled for various layering abilities where the user can add charm images to ring images. Also, various technologies described herein enable the UI to turn or spin or rate the item while the item is being virtually try-on or previewed or simulated. Moreover, various technologies described herein enable the UI to present the item, while accounting for gravity, ear morphology, and item type being virtually tried-on or previewed or simulated. For example, the UI enables the item to be virtually tried-on or previewed or simulated over the virtual ear, while accounting for various piercing principles, piercing angles, piercing rules, and pierceable locations of the ear. For example, the UI enables the item to be virtually tried-on or previewed or simulated over the virtual ear, while dynamically hiding (e.g., obscuring) or dynamically unhiding parts of the item when those are placed or positioned under the flaps of the virtual ear (e.g., under the virtual helix region), where such dynamic hiding or dynamic unhiding occurs based on the ear canvas or map, as described above. Further, various technologies described herein enable automatically imports the user' existing collection at a specified seller (e.g., e-commerce data) into the UI or other brand jewelry into the UI for virtual try-on or preview or simulation, as described above.

Figure 31:
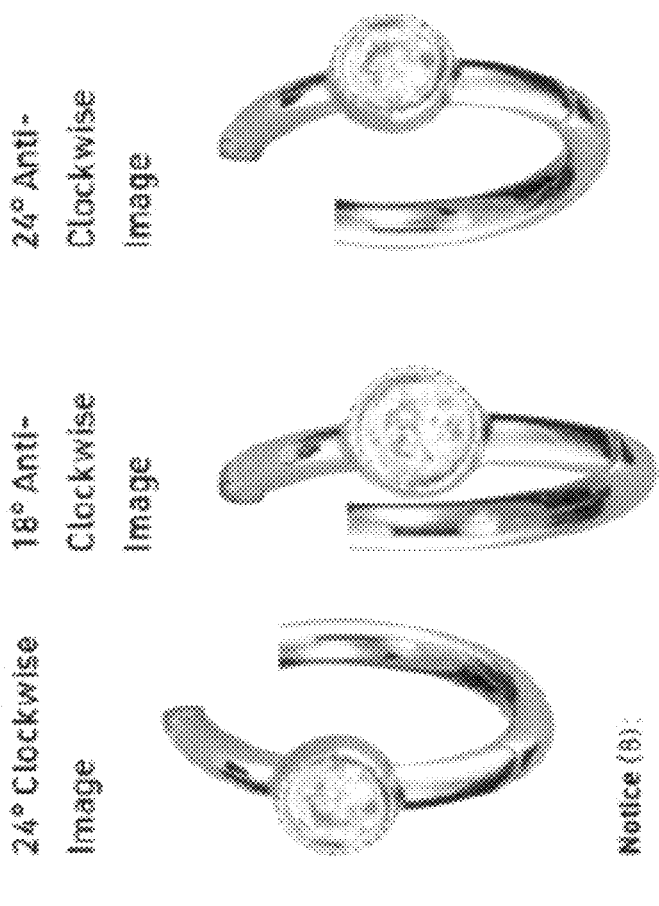
FIGS. 31-33 shows an embodiment of various sets of images presenting various sets of virtual earrings from various sets of rotational angles that are different from each other according to various principles of this disclosure.
Figure 32:
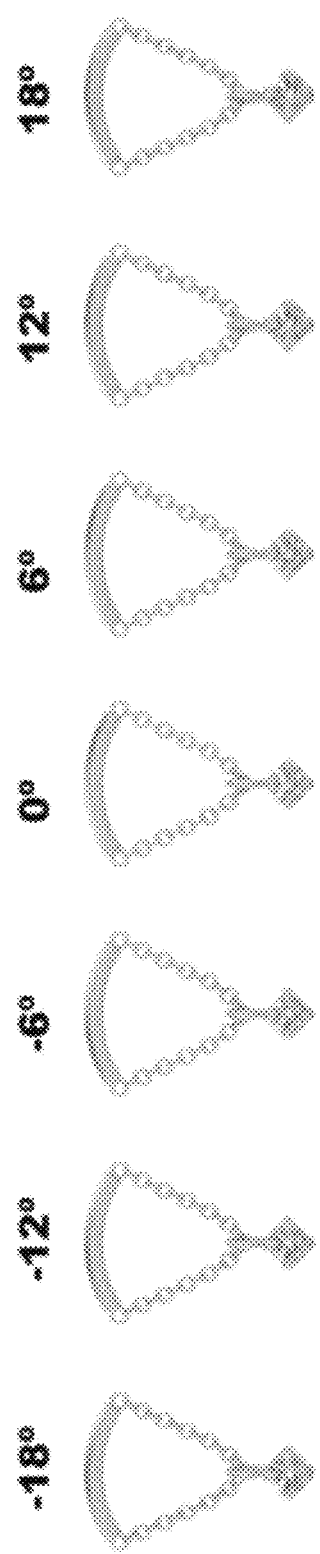
Figure 33:
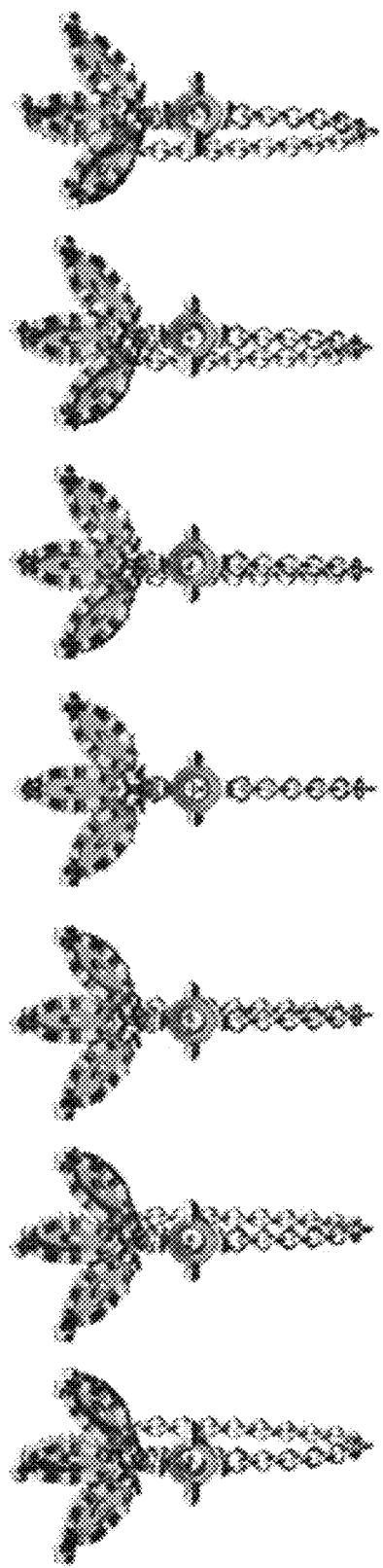

FIGS. 31-33 shows an embodiment of various sets of images presenting various sets of virtual earrings from various sets of rotational angles that are different from each other according to various principles of this disclosure. In particular, as explained above, the item (e.g., the virtual earring) can be represented in various ways. For example, the item may be associated with the set of images depicting the item from a set of rotational angles that are different from each other, as shown in FIGS. 31-33. For example, the set of rotational angles can be different by or in multiples of degrees from each other (e.g., 1, 2, 3, 4, 5, 6, 7, 8, 9, 10 or more). The set of images may be or may be formed from a set of photographs of a real item at such various rotational angles, as shown in FIG. 31. The set of images may be or may be formed from a CAD rendering, as shown in FIGS. 32 and 33. For example, the CAD rendering can be read and the set of images may be extracted from the CAD rendering. After the set of images is formed, the administrator operates the administrator console or panel to enter (e.g., a via a physical or virtual keyboard, a microphone) various parameters (e.g., dimensions, width, length, height, depth, inner diameter, item type, wearing location, insertion point, suitable for right or left ear) for the item, which may be applicable to some, many, most, or all images selected from the set of images. As such, the set of images and these parameters collectively enable determining of compatible placements per each item and thereby enable the UI to virtually try-on, as described above.

Figure 34:
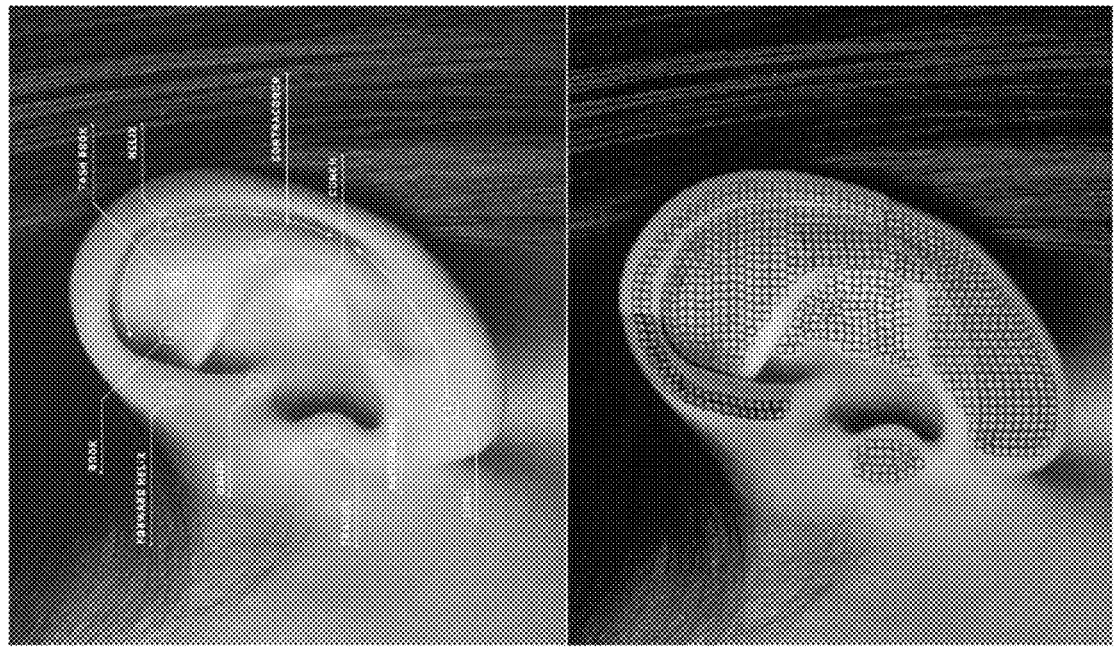
FIG. 34 shows an embodiment of a virtual ear segmented by anatomical regions according to various principles of this disclosure.

FIG. 34 shows an embodiment of a virtual ear segmented by anatomical regions according to various principles of this disclosure. In particular, the UI is enabled for virtual try-on, as explained above, based on various rotational angles associated with the depicted virtual earrings, virtual studs, virtual rings, and virtual piercings. For example, as explained above, the UI is programmed to enable the virtual earring to appear as if the corresponding imagery of virtual studs or virtual rings rotate in discrete angles away from a straight on view, depending on the intended area of virtual try-on the virtual ear. These angles are determined by over 25 years of body piercing and the development of the Maria Tash piercing methodology of "forward facing" angles. For example, the virtual ear can include any part thereof that is pierceable by current modern techniques. These virtual anatomical regions are called, earlobe, stacked earlobe, helix, Tash rook, tragus, anti-tragus, daith, rook, forward helix, contra-conch, and conch.

The UI may be programmed to understand the laws of piercing in conjunction with understanding the topology of the entire ear and inner/outer ring diameters and length/width of various stud jewelry items. Each virtual piercing location may be mapped out as a 3d tunnel, and not a one dimensional dot. Accurate real life piercings may not be determined with dots. Accurate real life needle placement may not requires a dot on the skin but a knowledge of the angle the needle goes into the skin and the depth. These 3d tunnels may be rendered through various photographic angles. Modern piercing may go beyond marking a dot on the top skin of the ear, and the jewelry does not just stick on the tissue in the straight on, perpendicular, zero rotational degree view of a stud earring (or another earring). As such, the UI may be programmed to present the virtual earring that is more sophisticated in its realism, and its adherence with body piercing rules and the Maria Tash piercing angle aesthetic. This approach to virtual try-on uses various tools to understand and accurately render the Maria Tash piercing methodology.

For example, as explained above, the UI may be programmed to enable virtual try-on of the virtual earring over the virtual ear based on segmenting the virtual ear (e.g., an image of the virtual ear presented frontally) into the set of virtual anatomical regions, which correspond to the areas of the virtual ear that have common attributes related to piercing. Those virtual anatomical regions are further segmented into polygonal (e.g., rectangular, triangular, honeycomb, square) virtual zones that cover some, many, most, or all pierceable areas on the virtual ear.

As shown in FIG. 34, the virtual ear is segmented into the set of virtual anatomical regions each further segmented into me set of virtual zones that are polygonal, which may or may not border each other, thereby forming the ear canvas or map Therefore, new piercing placement piercing techniques, and jewelry for those piercings can be invented (e.g., virtual earrings). As such, the UI may be programmed to understand those scenarios. For example, some of new piercings or virtual anatomical regions include helix drape, rook drape, and vertical conch regions.

Figure 35:
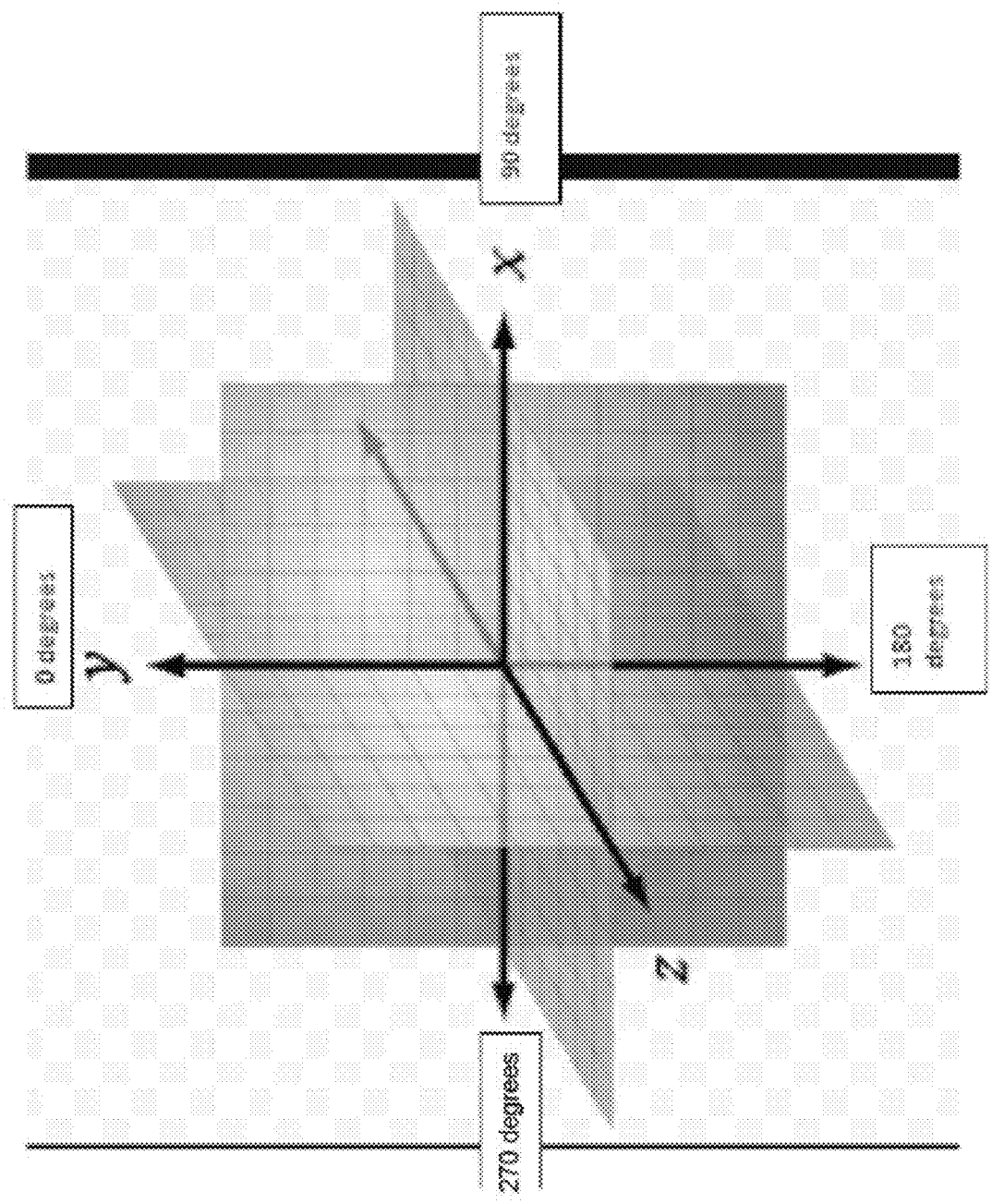
FIG. 35 shows an embodiment of a plane for rotation of a virtual earring according to various principles of this disclosure.

FIG. 35 shows an embodiment of a plane for rotation of a virtual earring according to various principles of this disclosure. In particular, as explained above, the set of images for the virtual earring, as selected, presents the virtual earrings from various photographic angles (e.g., rotations angles), whether isometrically, frontally, or other views. Through vigorous tests and studying, the anatomical regions were simplified into photographic angles In reality the angle might be unique per user. For augmented reality, these angles are a fair average for how the jewelry would be worn for most people. Note that the photographic angles have the potential to change or there may be added new or other photographic angles as more distinct jewelry items (e.g., virtual earrings) are developed. As shown in FIG. 35, the photographic angles for the set of images, as explained above, may be rotated along the XZ plane (illustrated as an orange plane).

Figure 36:
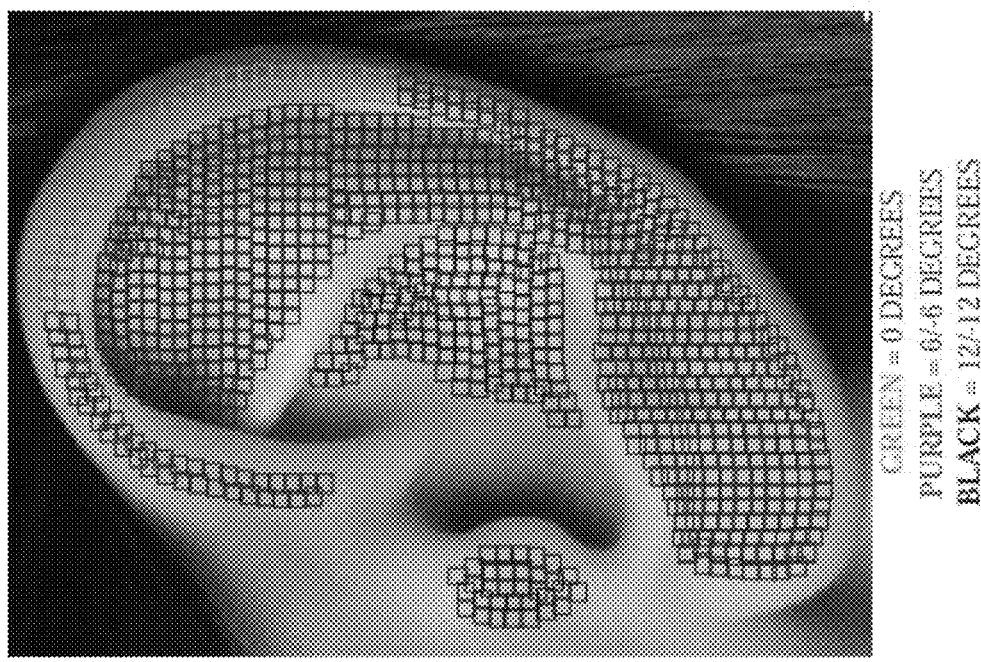
FIG. 36 shows an embodiment of a virtual ear segmented by various sets of zones within various sets of anatomical regions where each anatomical region has its own respective rotational angle for its respective set of virtual zones over which a virtual earring can be virtually tried-on according to various principles of this disclosure.

FIG. 36 shows an embodiment of a virtual ear segmented by various sets of zones within various sets of anatomical regions where each anatomical region has its own respective rotational angle for its respective set of virtual zones over which a virtual earring can be virtually tried-on according to various principles of this disclosure. As explained above, the virtual earring may include a stud. Therefore, the photography angles used for such virtual earring (mirrored for virtual left and right ears) can be 0, 6, 12 degrees for the virtual right ear and 0, −6, −12 degrees for the virtual left ear (e.g., polar opposites). As shown in FIG. 36, the green virtual zones=0 degrees, the purple virtual zones=6/−6 degrees, and the black virtual zones=12/−12 degrees.

Figure 37:
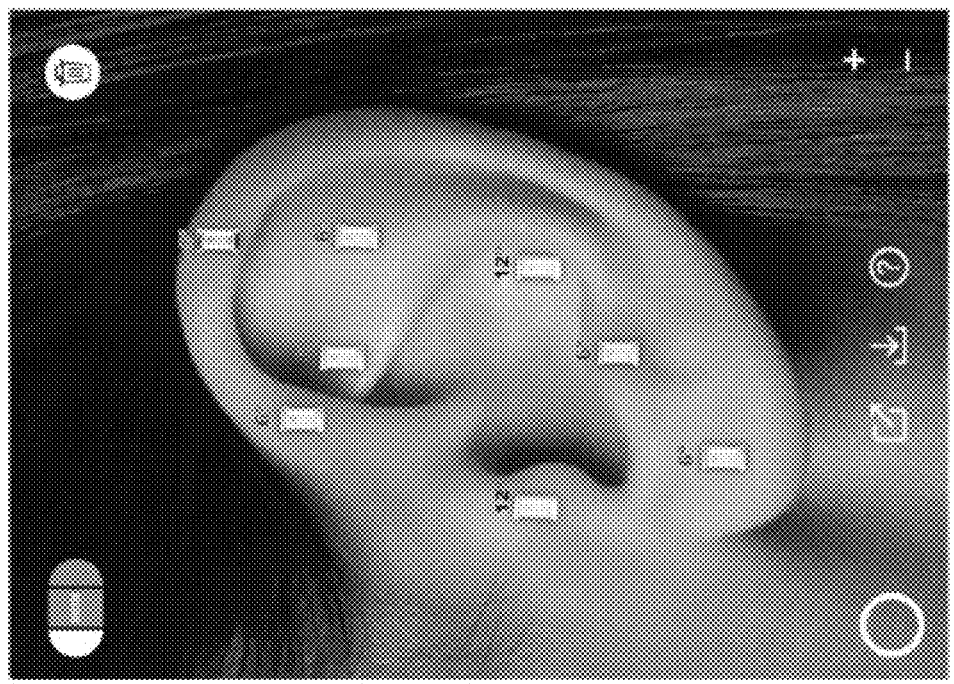
FIG. 37 shows an embodiment of various virtual earrings being virtually tried-on on a virtual ear where the virtual earrings are angled depending on what anatomical zone is hosting each respective virtual earring according to various principles of this disclosure.

FIG. 37 shows an embodiment of various virtual earrings being virtually tried-on on a virtual ear where the virtual earrings are angled depending on what anatomical zone is hosting each respective virtual earring according to various principles of this disclosure. Note that examples of stud and photography angle in the UI correspond to the green, purple, and black zones of FIG. 36.

As explained above, the UI may be programmed to enable "size awareness." This may occur via the UI being programmed to know where a virtual earring with a stud (or another virtual earring) could not be placed or positioned over the virtual ear to mimic the real-world. For example, if the user wanted to select the virtual earring with a wide stud and tried to position or move the virtual earring with the wide stud over the virtual conch region and the virtual earring with the wide stud was too large to fit in real world, then the virtual earring with the wide stud would magnetically snap to the closest virtual zone that the virtual earring with the wide stud, as selected, could fit. The UI may be programmed to understands the width of various the folds and crevices in the mapped topology of the virtual ear, as explained above.

Figure 38:
FIGS. 38-40 show an embodiment of a virtual earring being spun responsive to a user input over a virtual ear relative to the virtual ear according to various principles of this disclosure.
Figure 39:
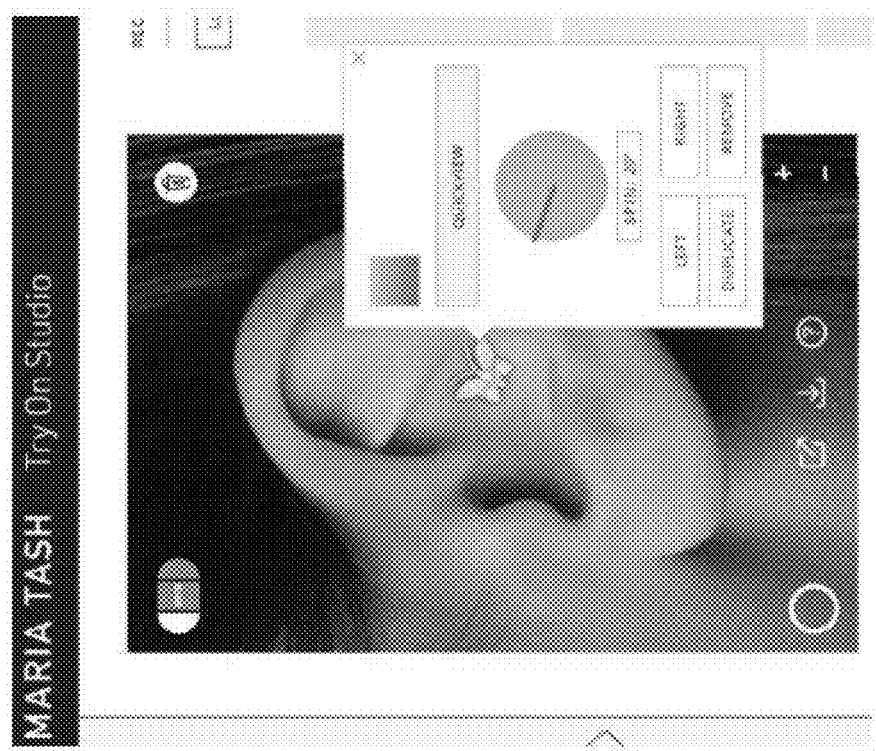
Figure 40:

FIGS. 38-40 show an embodiment of a virtual earring being spun responsive to a user input over a virtual ear relative to the virtual ear according to various principles of this disclosure. As explained above, the UI may be programmed to spin the virtual earring while the virtual earring is virtually tried-on the virtual ear. For example, the user may select the virtual earring with a stud and the user may be presented with a window or a menu having a spin control element (e.g., a spin wheel, a knob, a dial) programmed to spin (e.g. turn, rotate, pivot) the virtual earring, whether freely or incrementally, relative to the virtual ear over the virtual ear at a point corresponding to where a real earring mirroring the virtual earring would be inserted in a real ear, as shown in FIGS. 38-40. For example, such increments can be by one degree (or more or less). Note that such spin may or may not occur on a different axis that a respective photographic angle. For example, such spin may be a rotation about the XY plane or the XZ plane, whereas the respective photographic angle may be a rotation about the XZ plane or the XY plane, as explained above. Note that some virtual earrings may include a stud that is not round or symmetric. As such, the user may spin the virtual earring relative to the virtual ear over the virtual ear to a desired orientation.

Figure 41:
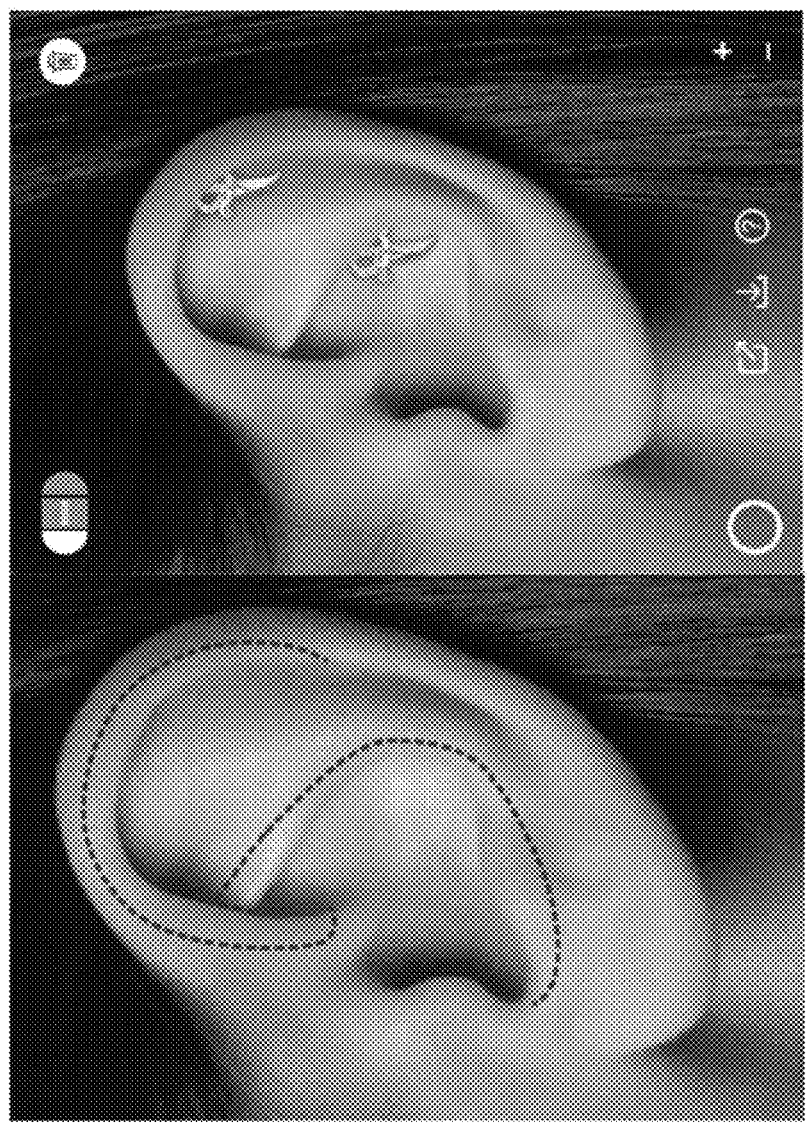
FIGS. 41-42 show an embodiment of a virtual earring having a stud that is overlapped according to various principles of this disclosure.
Figure 42:
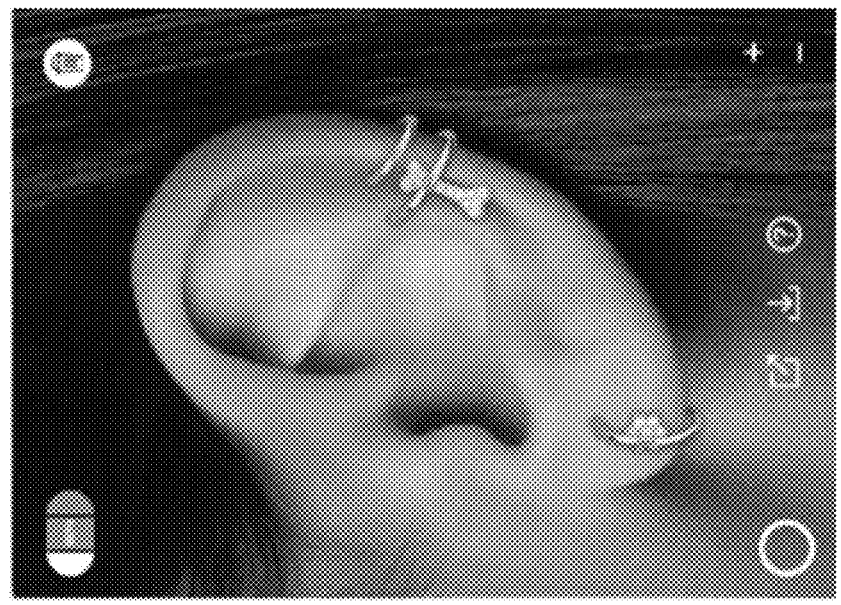

FIGS. 41-42 show an embodiment of a virtual earring having a stud that is overlapped according to various principles of this disclosure. As explained above, the UI may be programmed to present the virtual earring while account in for potential overlapping that may occur when a real earring mirroring the virtual earring may be worn. For example, such overlapping may occur in various scenarios. One of such scenarios occurs when there may be ear anatomy overlapping the virtual earring. As such, the UI may be programmed to account for such overlap based on a virtual region being defined, where the virtual region is positioned under the virtual upper fold of the virtual helix region, under the virtual rook region and the virtual contra conch region, and behind the virtual antitragus region to be hollow. For example, there may be a map in this virtual ear showing how far under this virtual fold there is room for the virtual earring with a virtual stud to turn or be hidden.

Figure 43:
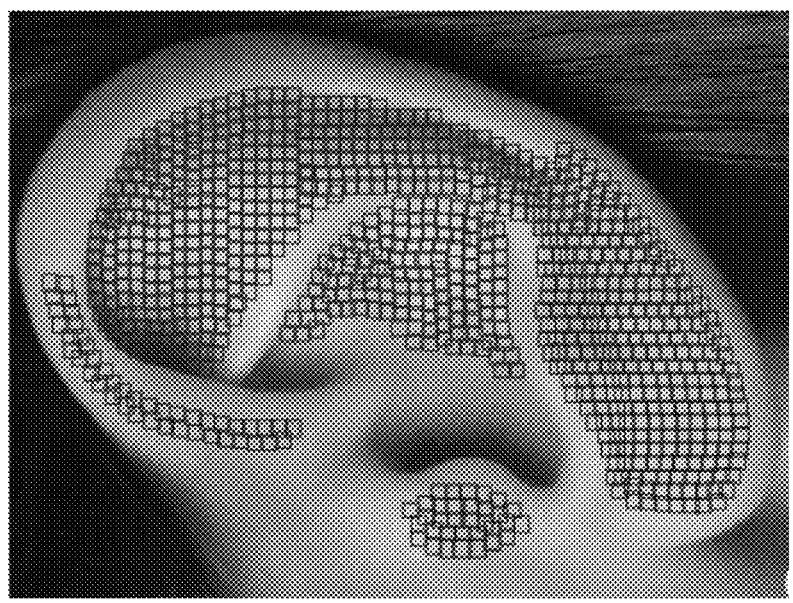
FIG. 43 shows an embodiment of a virtual ear segmented by various sets of zones within various anatomical regions programmed for rotation of a virtual earring with a ring according to various principles of this disclosure.

FIG. 43 shows an embodiment of a virtual ear segmented by various sets of zones within various anatomical regions programmed for rotation of a virtual earring with a ring according to various principles of this disclosure. As explained above, some virtual earring include a ring (commonly referred to as clickers or hoops). Therefore, the photography angles used for such rings may be −24, −18, 18, 24 and the photography angles for used for daith rings may be forward facing, −6 degrees. Note that pictorially, ring placements are more involved than studs, as a piercing intended for a ring does have the same 3-dimensional tunnel placement angling, but also the UI is programmed to account for the realism of how virtual gravity pulls down differently in each part of the virtual ear, how that virtual droop varies depending on the diameter of the virtual earring or the virtual ear, and how much of the ring is obscured by the virtual ear tissue as the ring wraps behind the virtual skin of the virtual ear. Likewise, in some situations, there may be a basic placement principle for rings: the inner diameter of the virtual ring, can be the same as the maximum or less than maximum distance between the virtual piercing (e.g., the virtual zone) and edge of the virtual anatomy for that ring style. For example, a ring with a 5 mm inner diameter can sometimes be placed at most, 5 mm from the edge of the virtual anatomy of the virtual ear. Similarly, the angle of the rings may be based on forward facing Maria Tash piercing angle aesthetics plus the rules of body piercing. Also, some virtual rings can be placed in some, many, most, all, or anywhere in the virtual ear taking into consideration the virtual inner diameter. This inner diameter is the determining measurement that may determine whether the ring can clear the virtual edge of any virtual tissue. Therefore, some, many, most, any, or all of the ring jewelry pieces are measured for inner and outer diameter for proper scaling and entered via the administrator console or panel. As shown in FIG. 43 and explained above, there is zone-to-product rotation angles mapping for such rings, where the purple virtual zones use 18 deg rings in the XZ plane, the black virtual zones use 24 deg rings in the XZ plane.

Figure 44:
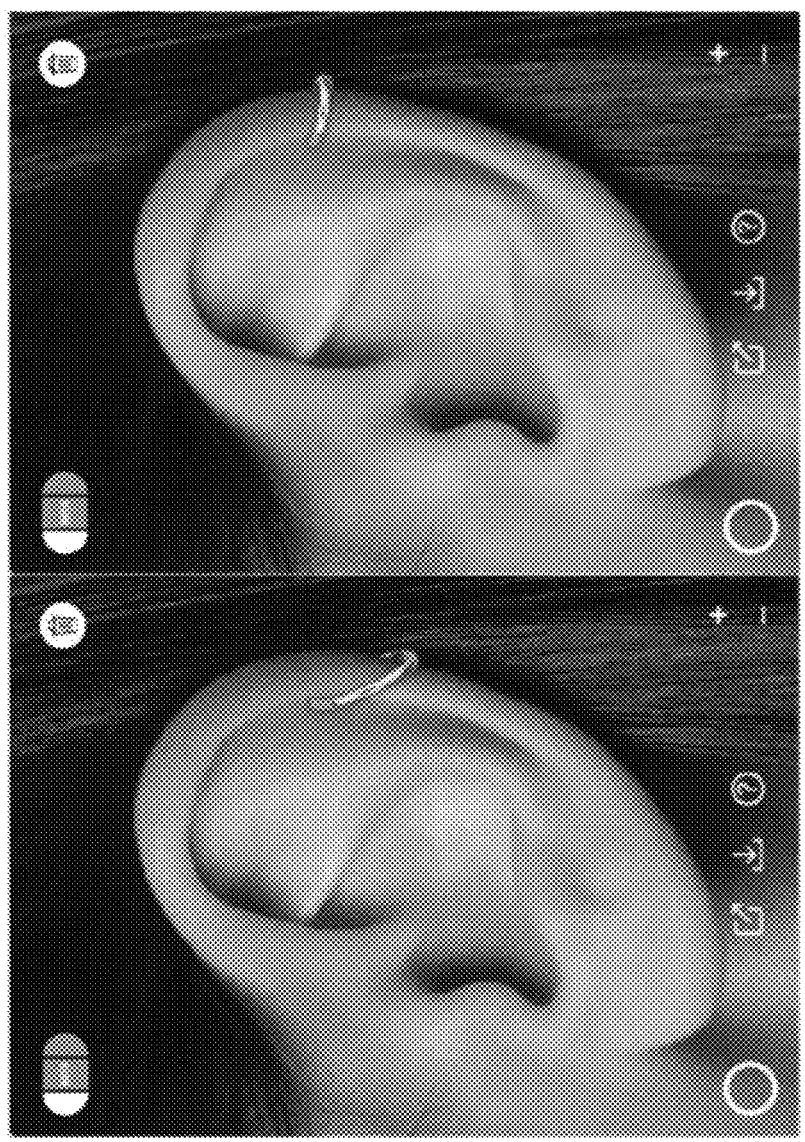
FIG. 44 shows an embodiment of a virtual gravity effect being implemented on a virtual earring being virtually tried-on a virtual ear according to various principles of this disclosure.
Figure 45:
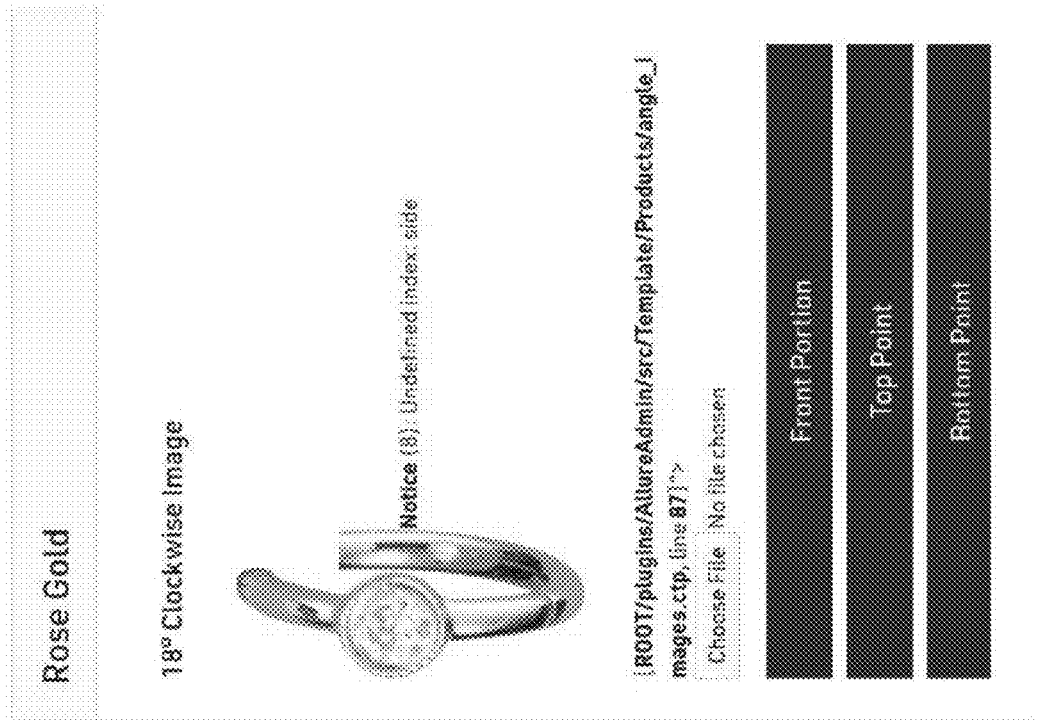
FIGS. 45-48 show an embodiment of an image from a set of images corresponding to a virtual earring to be virtually tried-on a virtual ear while the image is being set by an administrator in an administrator console or panel for virtual try-on depending on a virtual try-on location within a set of anatomic regions of the virtual ear and a set of virtual zones of the virtual ear and a virtual entry point or a virtual exit point from the virtual ear according to various principles of this disclosure.

FIG. 44 shows an embodiment of a virtual gravity effect being implemented on a virtual earring being virtually tried-on a virtual ear according to various principles of this disclosure. The inner diameter measurement may be significant or technologically advantageous for enabling the UI to enable the virtual earring to be virtually tried-on the virtual ear. In particular, the gravity tool's basic function is to virtually pull the jewelry downward from the virtual insertion point or piercing placement. Pictorially, the ring's ability to virtually hang straight down with the virtual gravity is relative to the inner diameter and the virtual piercing location on the virtual ear. Since a real earlobe is commonly pierced, rendering this scenario may be relatively straightforward. However, as you add more rings to the real ear, the real ear topology changes and the anatomy of the real ear will start to prevent the jewelry from hanging straight down. Therefore, if the user drags (or otherwise positions or virtually tries-on) the virtual earring with the ring to a spot where the virtual diameter will not let the virtual ring clear the virtual anatomy, as would be mirror in real world, then the virtual ring snaps to the closest location (e.g., virtual zone) to the original selected spot where the diameter would clear and fit snugly. The spot that the UI snaps to is only a suggestion for that piece of jewelry. The user can relocate the virtual jewelry or choose a larger size ring if the user wants to place or position the virtual jewelry in the intended location. If the chosen ring virtually fits, then the virtual gravity tool may position the ring into a natural virtual resting position. This virtual droop/hang may be determined by the distance of the virtual piercing to the virtual edge of the virtual anatomy and the inner diameter of the ring. As shown in FIG. 44, if the virtual piercing placement simulates 4.5 mm from the virtual edge of the virtual anatomy, and the inner diameter of the ring is 9.5 mm, as set by the administrator via the administrator console or panel, the virtual ring may fall into a more vertical position. If the user virtual places or positions a 5 mm ring, as set by the administrator via the administrator console or the panel, in the same virtual piercing placement, the virtual ring may hang more horizontally—this relationship may be referred to as "snugness."

Figure 46:
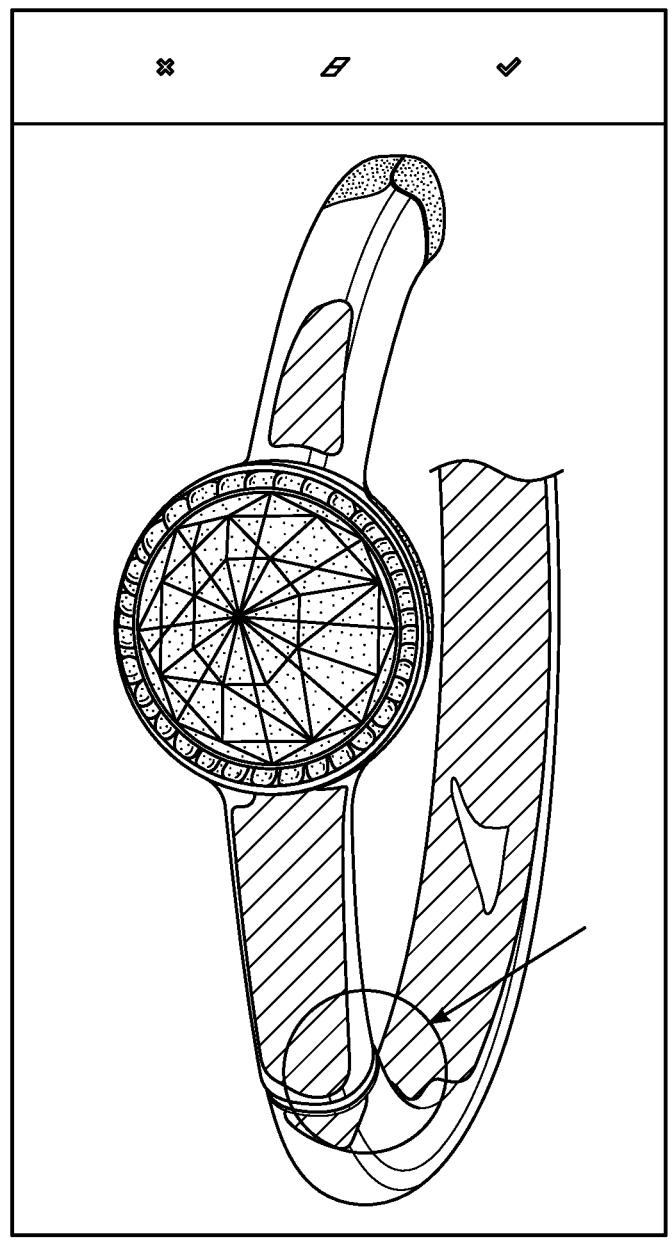
Figure 47:
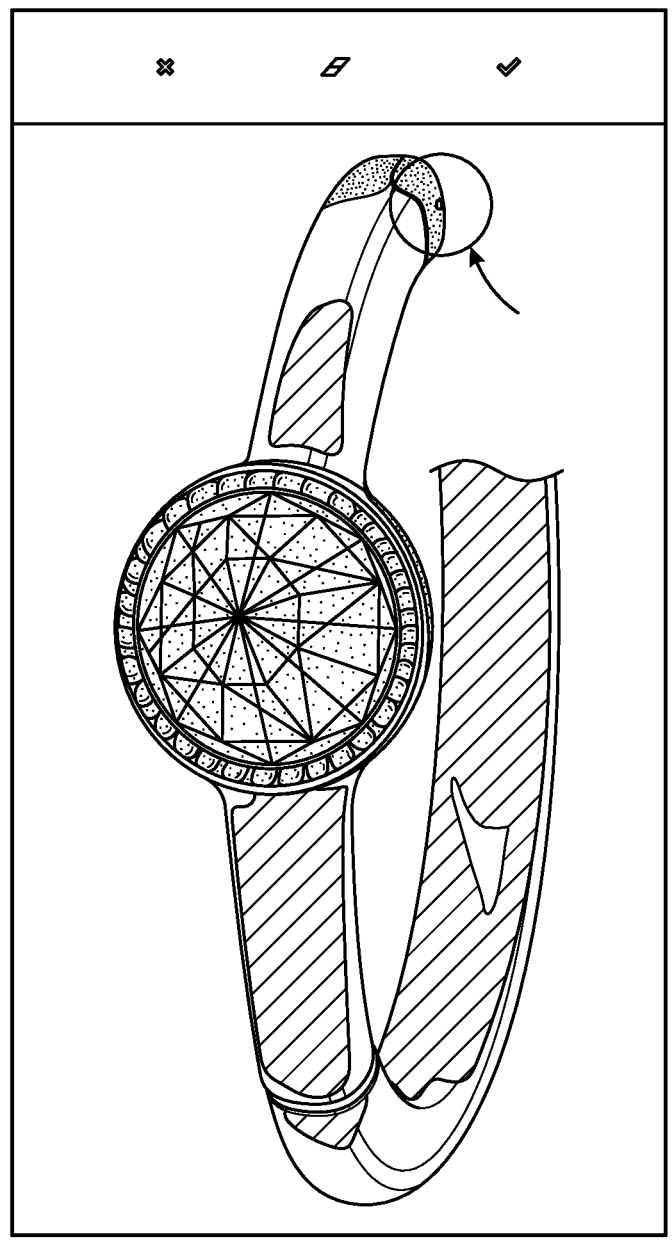
Figure 48:
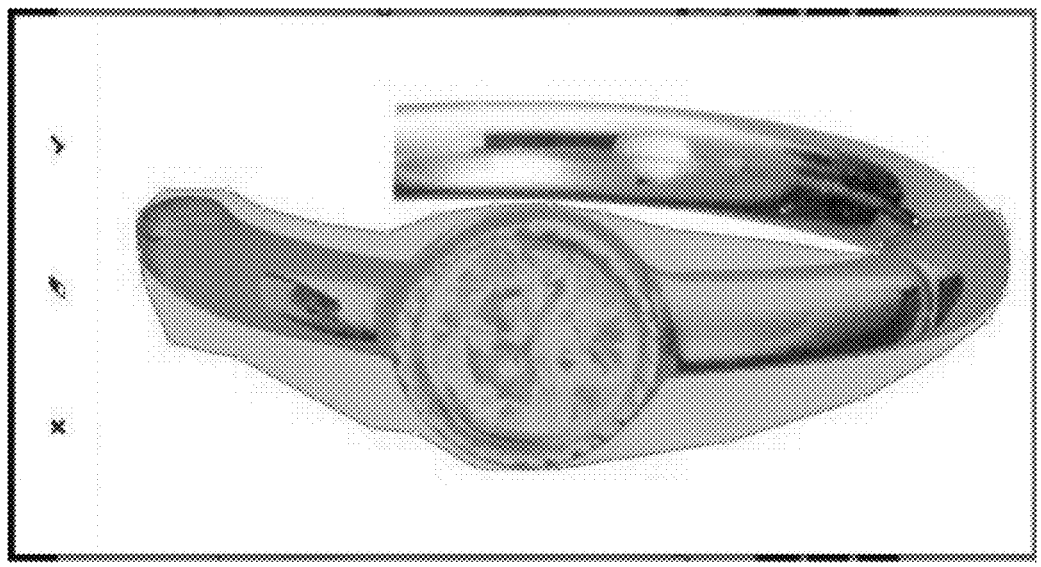
Figure 49:
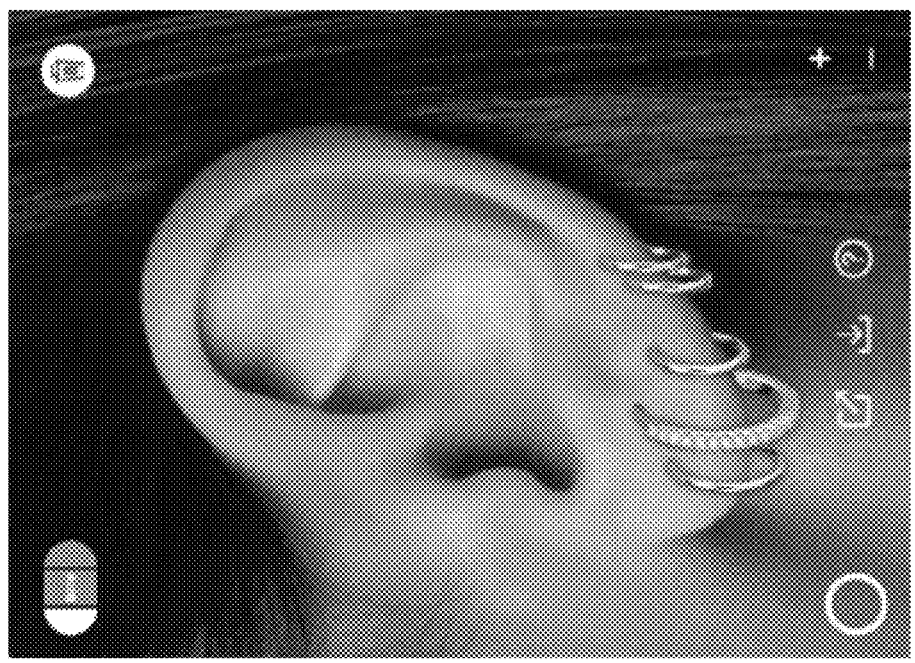
FIGS. 49-58 show an embodiment of various virtual earring with various virtual rings being virtually tried-on in various regions of various anatomical regions of a virtual ear according to various principles of this disclosure.
Figure 50:
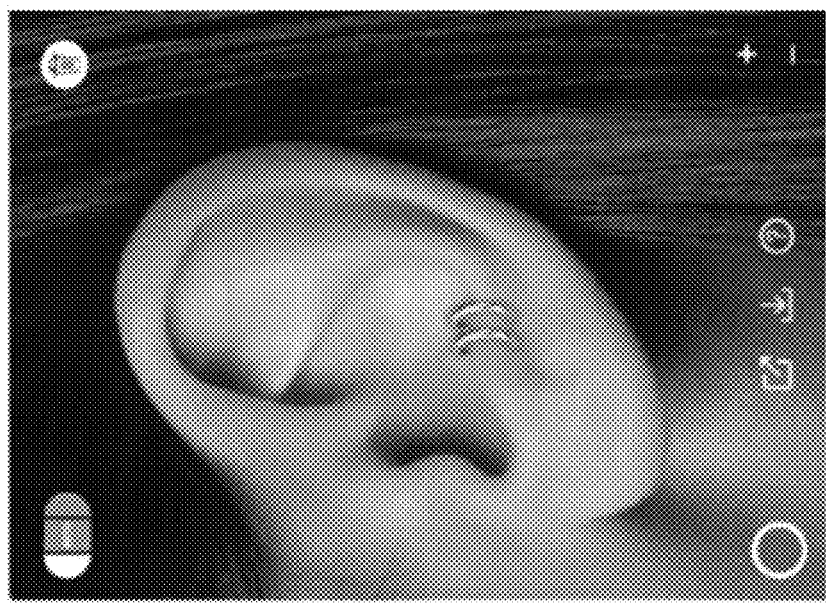
Figure 51:
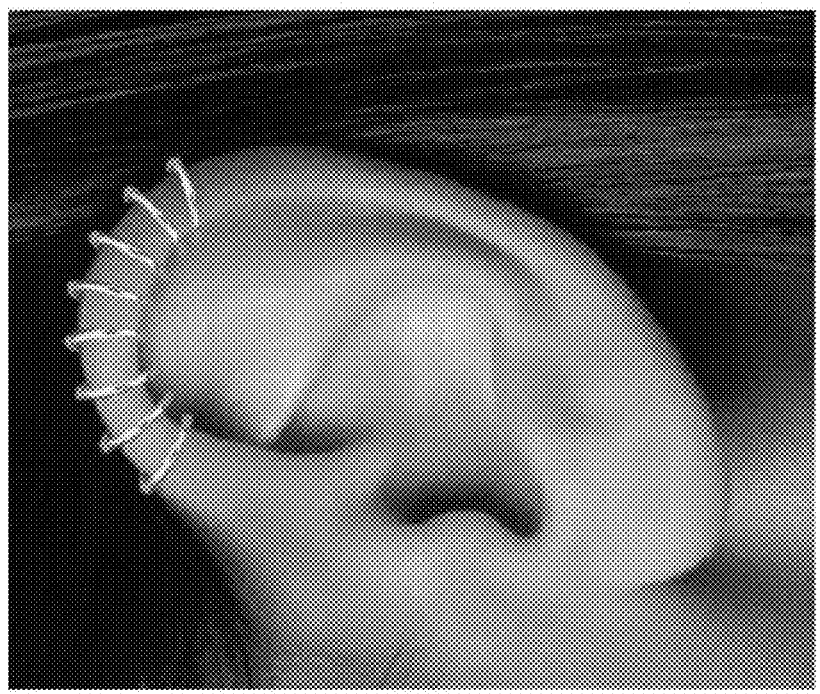
Figure 52:
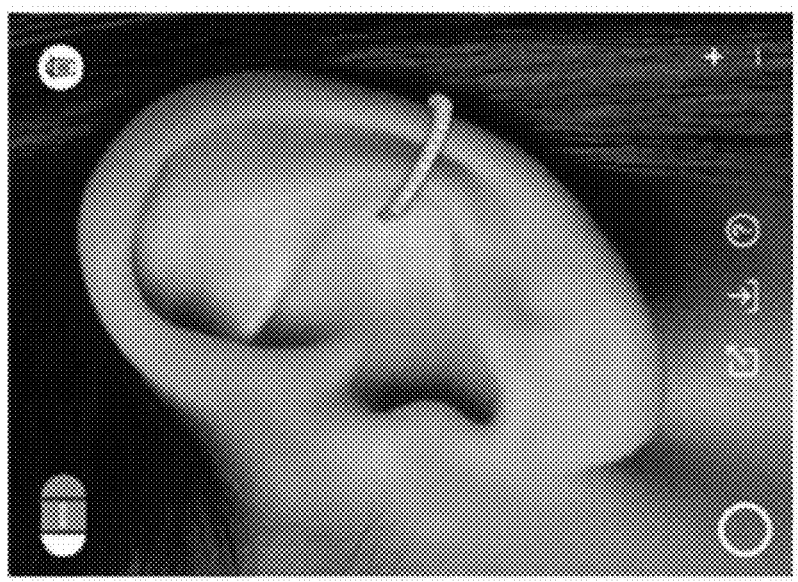
Figure 53:
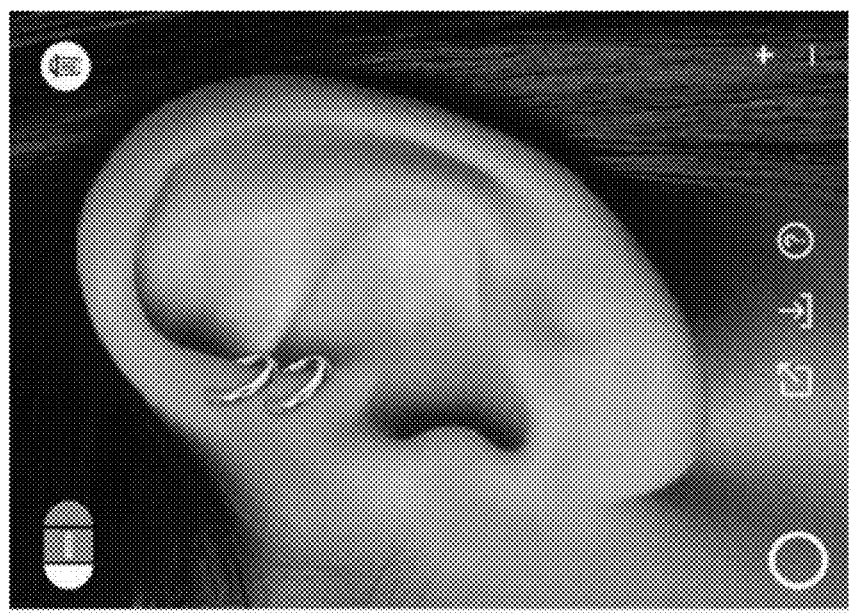
Figure 54:
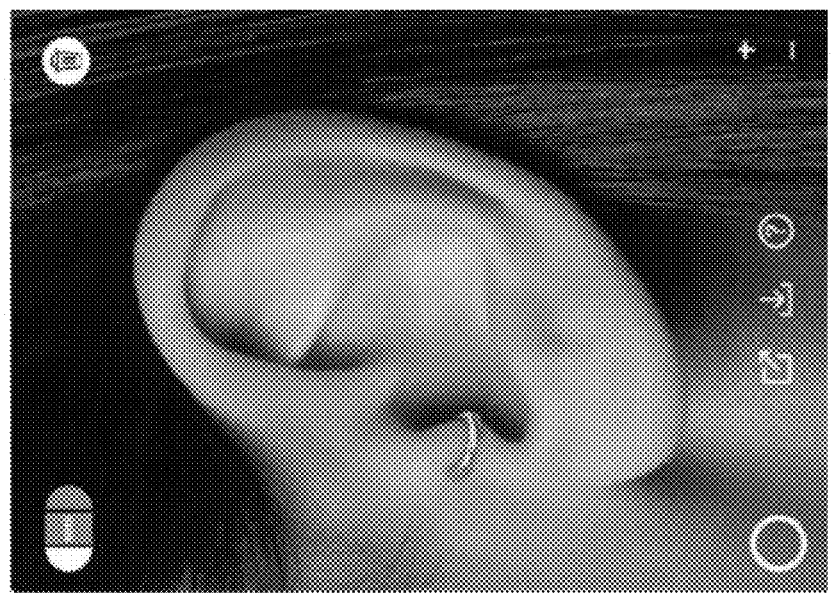
Figure 55:
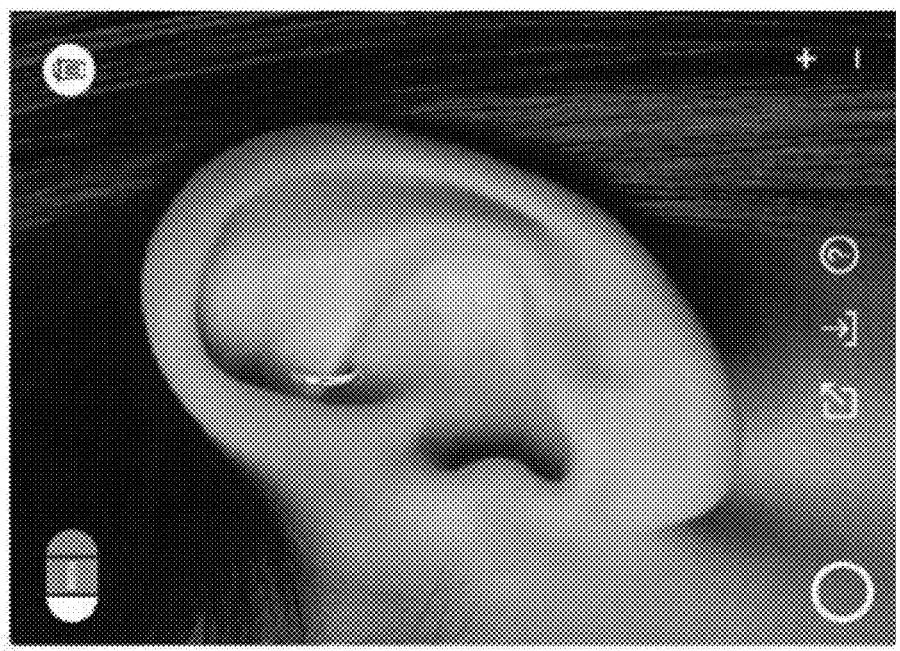
Figure 56:
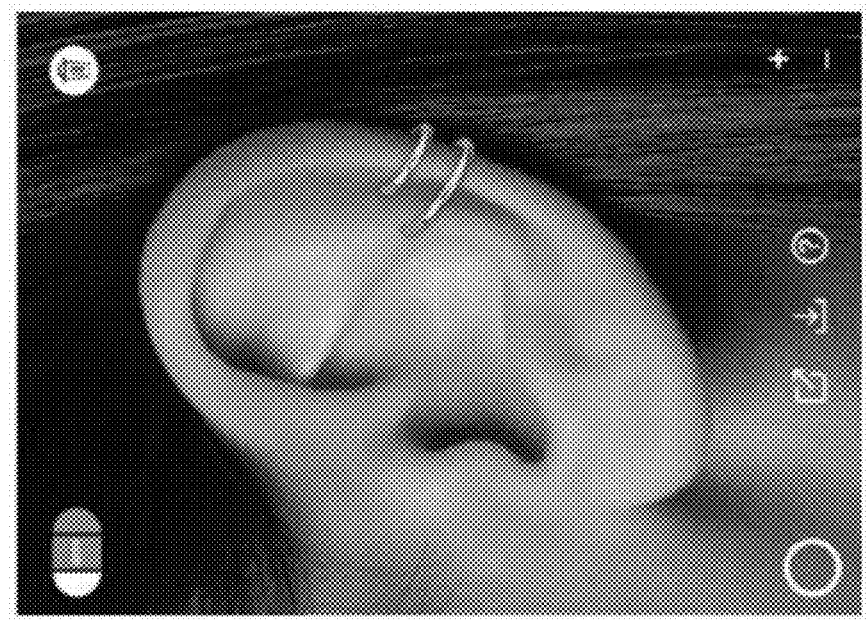

FIGS. 45-48 show an embodiment of an image from a set of images corresponding to a virtual earring to be virtually tried-on a virtual ear while the image is being set by an administrator in an administrator console or panel for virtual try-on depending on a virtual try-on location within a set of anatomic regions of the virtual ear and a set of virtual zones of the virtual ear and a virtual entry point or a virtual exit point from the virtual ear according to various principles of this disclosure. Note that FIG. 46 shows where the inner diameter is located on this virtual earring. Likewise, note that FIG. 47 shows where the point of insertion is located on this virtual earring. Similarly, note that FIG. 48 shows overlapping, where pictorially, rings deal with overlapping of the anatomy. The ring may need to be cropped to appear like the ring is wrapping around the virtual anatomy. The boundary may be outlined on the backend (e.g., not visible to the user), which can be by the administrator via the administrator console or panel. The boundary defines when the jewelry starts to tuck behind the anatomy. Rings can be overlapped with charms or overlapped with other products to appear like those rings are further back in space.

Figure 57:
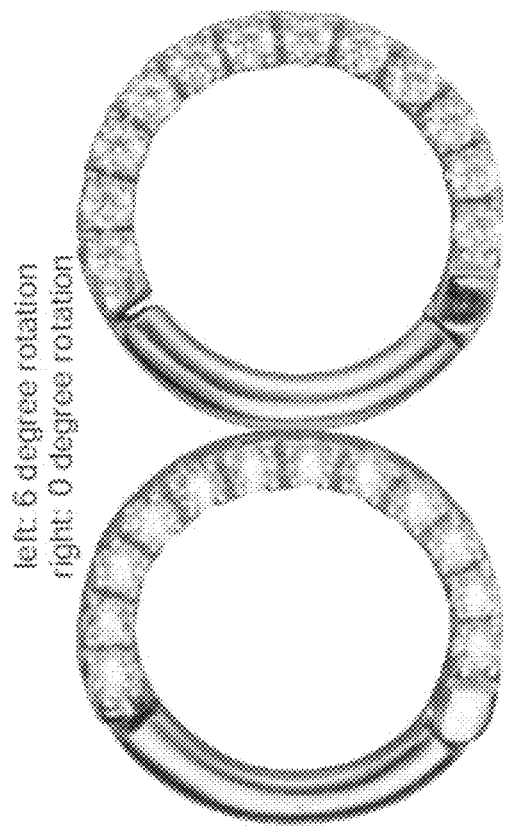
Figure 58:

FIGS. 48-58 show an embodiment of various virtual earring with various virtual rings being virtually tried-on in various regions of various anatomical regions of a virtual ear according to various principles of this disclosure. Note that these virtual earrings are shown to be virtually tried-on in the virtual earlobe, anti-tragus, forward helix/earhead, tragus, rook, and other virtual regions of the virtual ear. When some of the virtual earrings are virtually tried-on in the virtual upper helix region, pictorially, if the virtual earring has a ring that is located near the top of the virtual helix and is tight/snug, then the ring may sit up vertically. The virtual piercing placement in relation to the virtual edge of the virtual anatomy may draws a virtual vertical line. When some of the virtual earrings are virtually tried-on in the conch, if the virtual has a ring, then the virtual resting position generally may be more horizontal. For example, in some situations, a 9.5 mm inner diameter, as set for a specific ring by the administrator via the administrator console or panel, may be the minimum ring size that would virtually fit. When some of the virtual earrings have a ring in the rook or contra-conch virtual region, pictorially, these rings hang may almost 90 degrees or somewhere between 90 and 60 degrees depending on inner diameter. Sometimes, there is a virtual region with no rings allowed due to the lack of practicality and the enormity of the diameter needed to clear the tissue. When some of the virtual earrings have a ring in the virtual daith region, then front facing shots may be used. For example, there may be used 6 degree in the XZ plane rotation but from the front facing. This information helps demonstrate how the UI enables relatively accurately rendering of desired piercing angles. As shown in FIG. 57, the virtual earring shown on left has a 6 degree rotation in contrast to the virtual earring shown on right with a 0 degree rotation.

Figure 59:
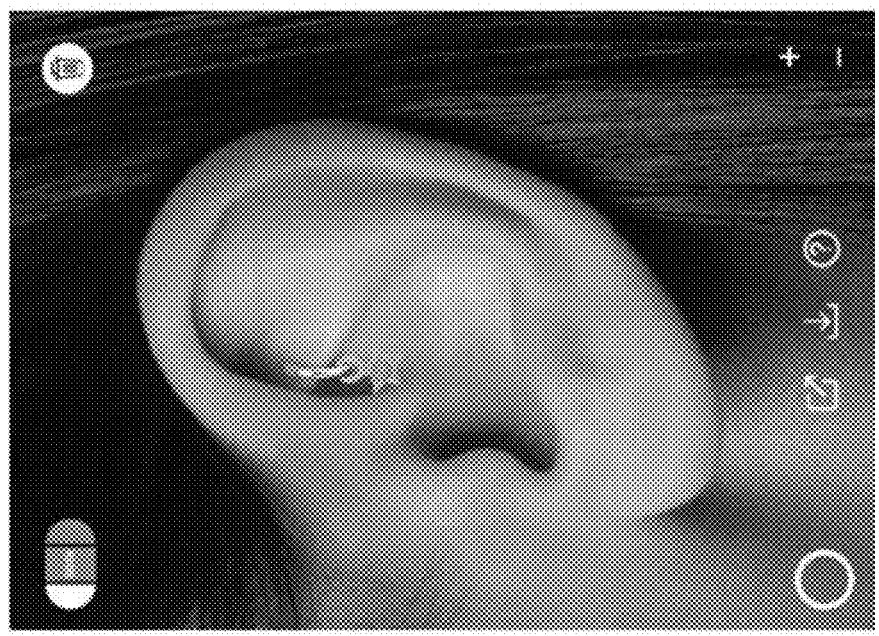
FIG. 59 shows an embodiment of a virtual charm being added to a virtual earring being virtually tried-on a virtual ear according to various principles of this disclosure.
Figure 60:
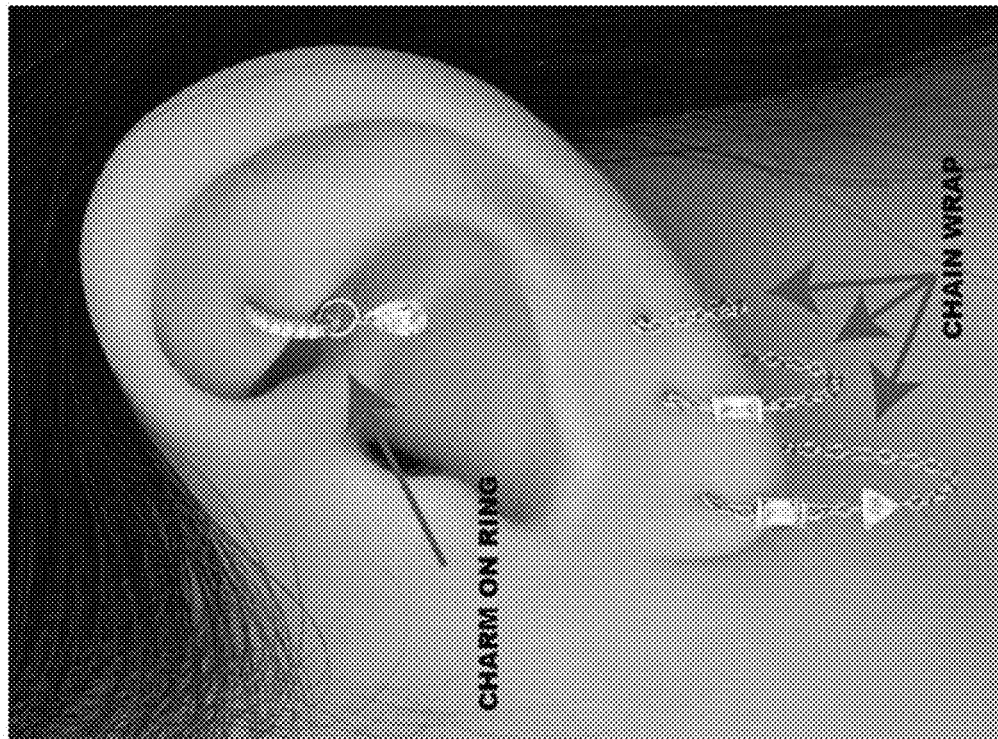
FIG. 60 shows an embodiment of a virtual charm being virtually tried-on a virtual ear according to various principles of this disclosure.
Figure 68:
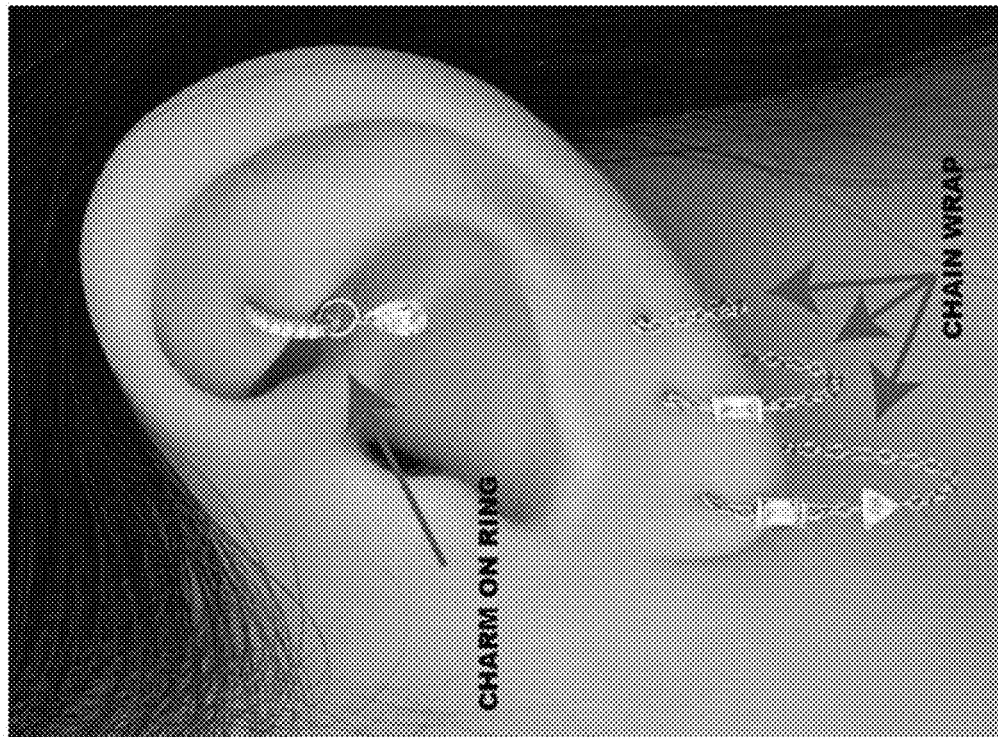
FIGS. 68-69 show an embodiment of various virtual charms on virtual rings and virtual chain wraps being virtually tried-on according to various principles of this disclosure.
Figure 69:

FIG. 59 shows an embodiment of a virtual charm being added to a virtual earring being virtually tried-on a virtual ear according to various principles of this disclosure. FIG. 60 shows an embodiment of a virtual charm being virtually tried-on a virtual ear according to various principles of this disclosure. FIGS. 68-69 show an embodiment of various virtual charms on virtual rings and virtual chain wraps being virtually tried-on according to various principles of this disclosure. In particular, there are various virtual layering, virtual moveable parts, and virtual chains described below. The UI may be programmed to virtually try-on virtual earrings with charms. The user can add up to a certain number of charms to the virtual earring (e.g., 1, 2, 3, 4, 5 or more). Pictorially, such charms may be pulled straight down with virtual gravity, as described above. Pictorially, such charms may follow the same photographic angle as the piece those charms are connected too. Pictorially, such charms can be virtually layered onto most rings. Pictorially, such charms may also have an inner diameter that may need to be considered. If the inner diameter of the jump ring is smaller than the width of the jewelry, as set by the administrator via the administrator console or panel, then the charm may not virtually fit for virtual try-on. If the inner diameter of the charm jump ring is larger than the width of the jewelry, then the charm may virtually fit for virtual try-on. Note that FIG. 59 shows one type of a virtual charm on a virtual earring, whereas FIG. 60 shows another type of the virtual charm on the virtual earring and a virtual earring with a chain wrap.

Figure 61:
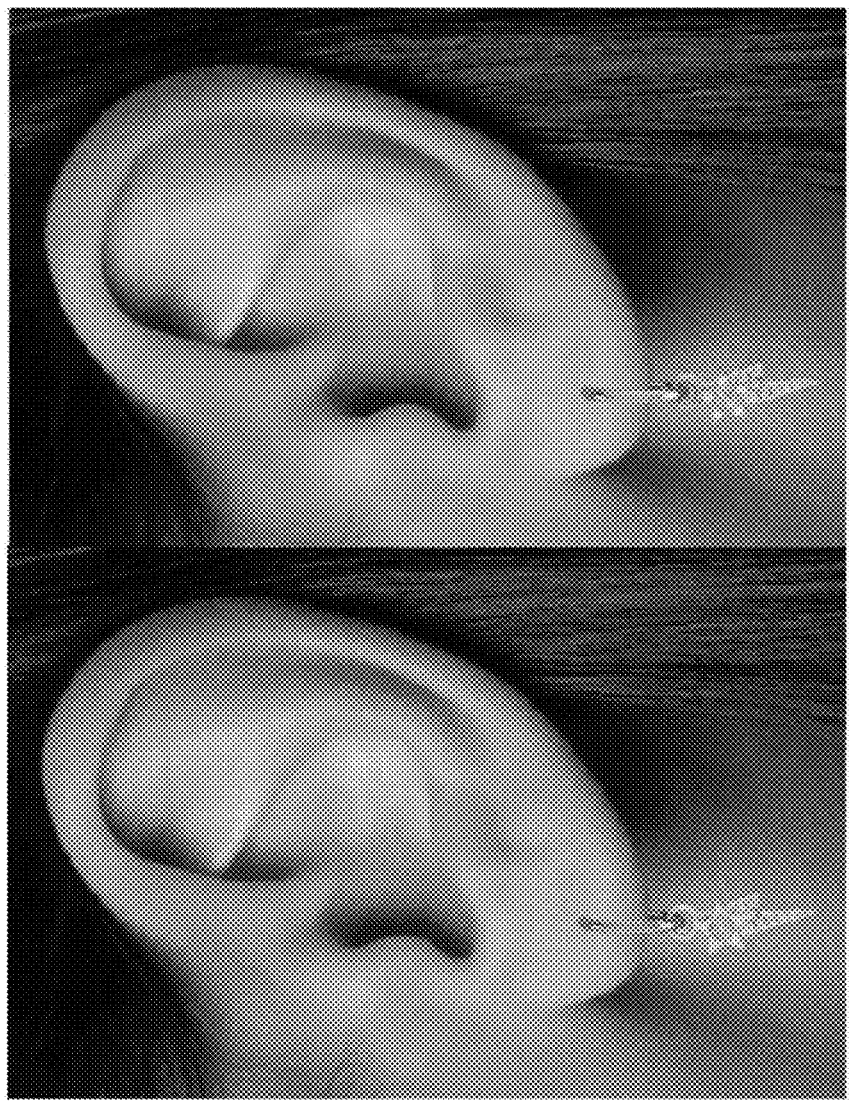
FIG. 61 shows an embodiment of various virtual charms being virtually tried-on a virtual ear and having same angling according to various principles of this disclosure.

FIG. 61 shows an embodiment of various virtual charms being virtually tried-on a virtual ear and having same angling according to various principles of this disclosure. The virtual earring may have at least two charms. As shown in FIG. 61, the virtual earring shown on left has a multi-tone metal styling in contrast to virtual earring shown on right having a white metal styling. Both virtual earrings show the same item (star charm, lightning bolt charm, 8 mm ring) but in different metal tones—for visual clarity. The ring photographic angle is −6 degrees (although other angles are possible). The charms follow the same photographic angle, as explained above.

Figure 62:
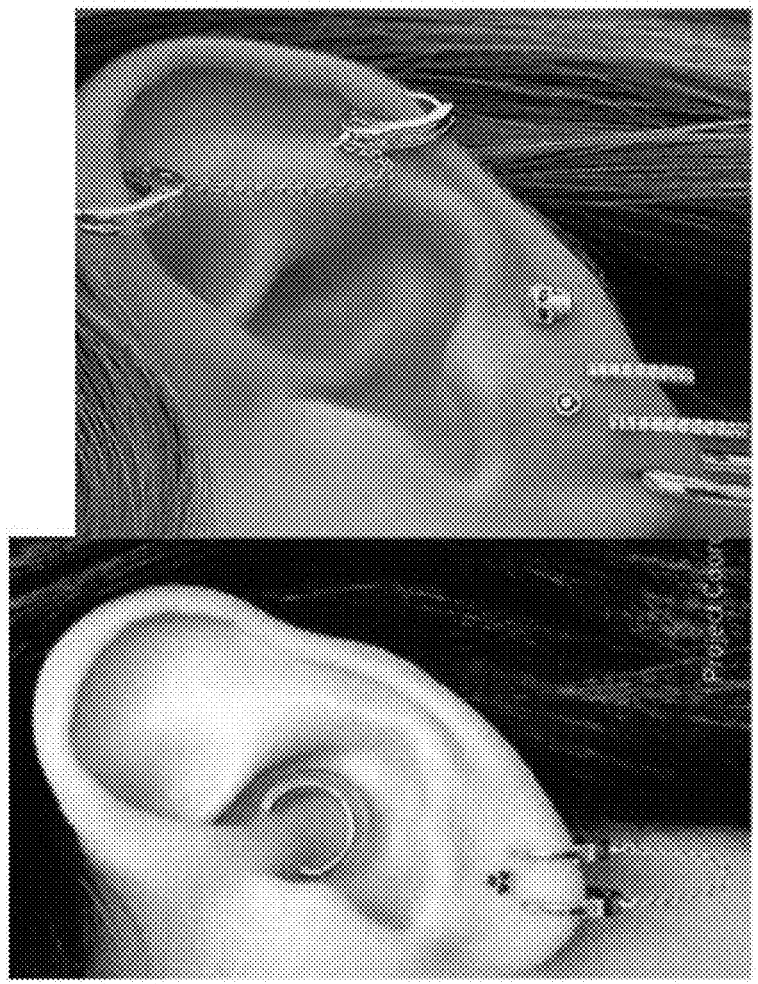
FIG. 62 shows an embodiment of a virtual handcuff earring being virtually tried-on a virtual ear according to various principles of this disclosure.

FIG. 62 shows an embodiment of a virtual handcuff earring being virtually tried-on a virtual ear according to various principles of this disclosure. The virtual earring may be embodied as a handcuff, which can be virtually tried-on in various ways, as described herein. Pictorially, some virtual styling techniques enable the handcuff to be worn as a way to connect two virtual piercings, can be used as a charm as well, or can be worn in one piercing and the second ring can hang straight down. FIG. 62 shows the handcuff with two virtual points of insertion.

Figure 63:
FIG. 63 shows an embodiment of a virtual handcuff earring being virtually tried-on a virtual ear as a charm according to various principles of this disclosure.

FIG. 63 shows an embodiment of a virtual handcuff earring being virtually tried-on a virtual ear as a charm according to various principles of this disclosure. The UI is programmed to understand that the base of the design is two virtual rings, as shown in FIG. 63. Pictorially, there is a virtual chain that attaches the two virtual handcuff rings. Pictorially, the UI is programmed to allow the user to choose the placement of both virtual rings. The chain and rings may be virtually rendered naturally for that scenario. Pictorially, since the virtual chains have a fluid nature, with each unique virtual piercing placement, the virtual chain may settle differently per virtual gravity, anatomy, or other parameters. All these virtual chain scenarios may be virtually rendered. When the UI is programmed to allow the administrator or the user to import 3D geometry, then the virtual chain may virtually adjust itself automatically when the user moves the virtual chain or the virtual earring over the virtual ear.

Figure 64:
FIGS. 64-65 show an embodiment of a virtual earring with an arcuate portion being virtually tried-on with the arcuate portion being virtually hidden while the virtual earring is precluded from spinning according to various principles of this disclosure.
Figure 65:
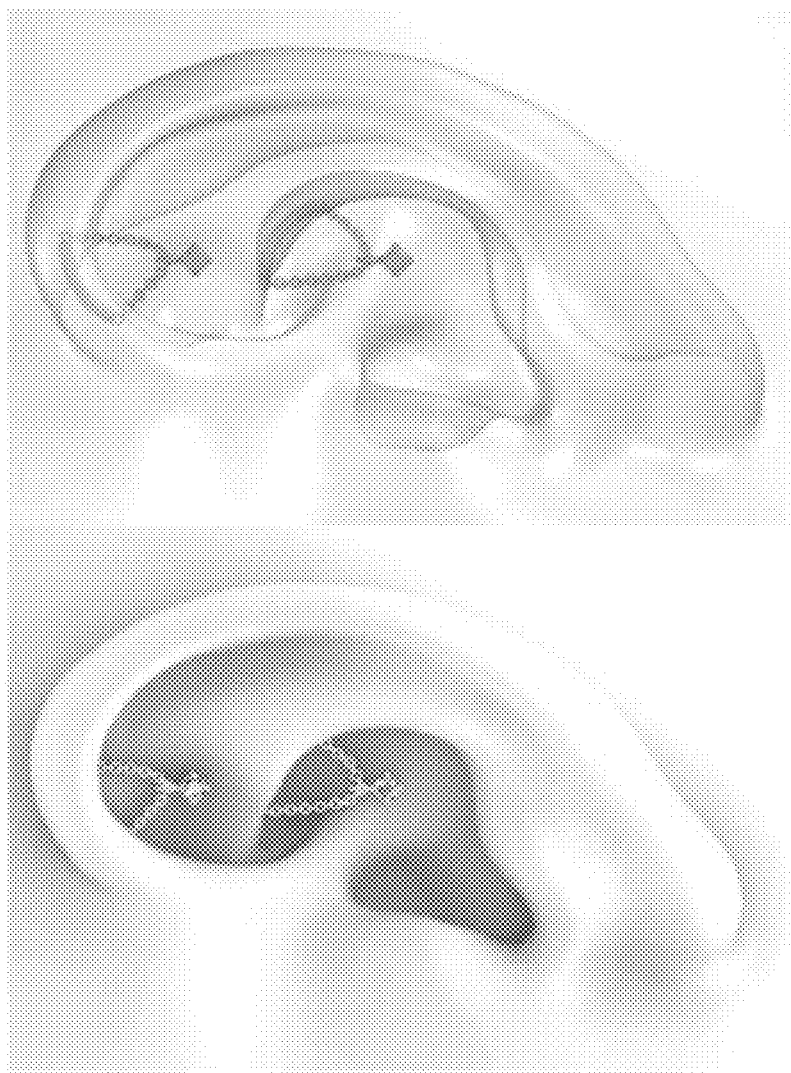
Figure 66:
FIG. 66 shows an embodiment of a virtual ear with various anatomical regions where a virtual earring can default to a spin angle depending on a respective anatomical region selected according to various principles of this disclosure.
Figure 67:
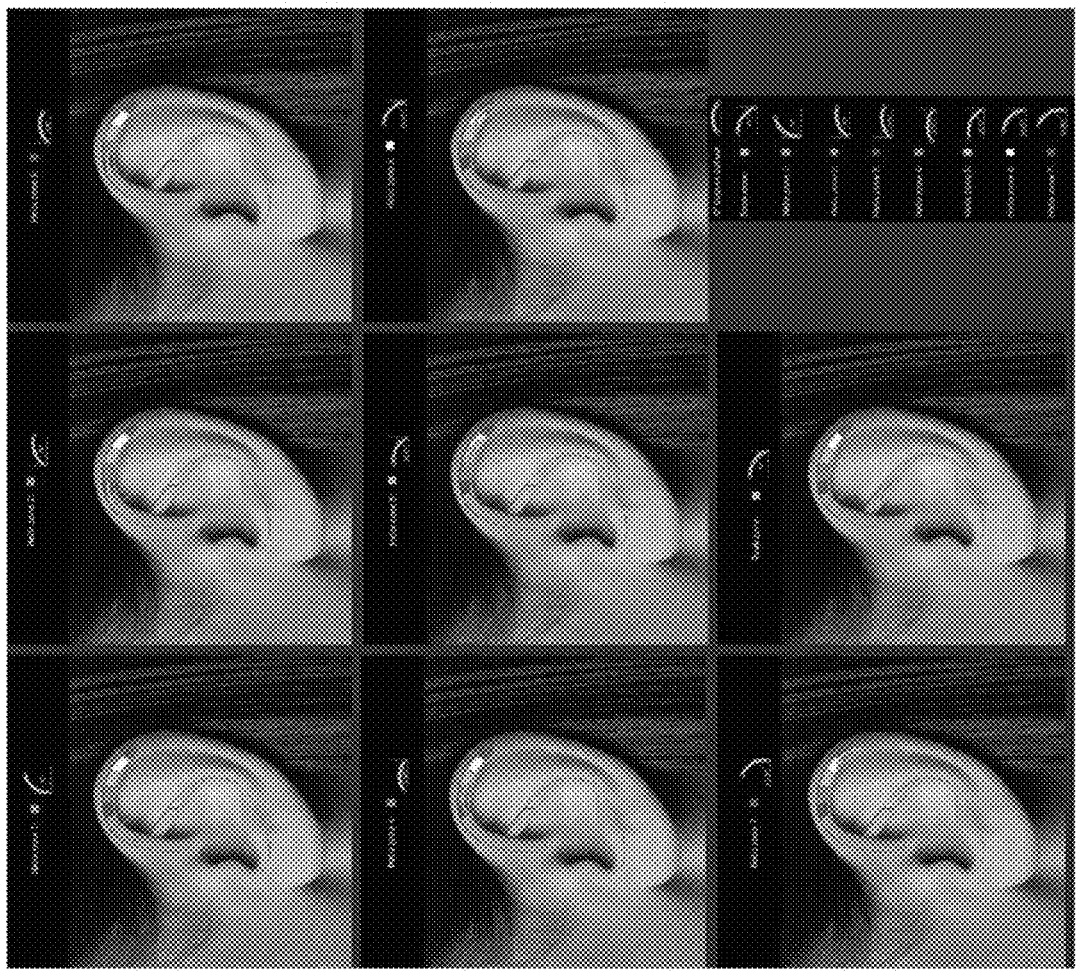
FIG. 67 shows an embodiment of the arcuate portion of FIGS. 64-65 being angled differently depending on which virtual zone within which virtual anatomical region of a virtual ear the arcuate portion is being virtually tried-on according to various principles of this disclosure.

FIGS. 64-65 show an embodiment of a virtual earring with an arcuate portion being virtually tried-on with the arcuate portion being virtually hidden while the virtual earring is precluded from spinning according to various principles of this disclosure. FIG. 66 shows an embodiment of a virtual ear with various anatomical regions where a virtual earring can default to a spin angle depending on a respective anatomical region selected according to various principles of this disclosure. FIG. 67 shows an embodiment of the arcuate portion of FIGS. 64-65 being angled differently depending on which virtual zone within which virtual anatomical region of a virtual ear the arcuate portion is being virtually tried-on according to various principles of this disclosure. The virtual earring with the arcuate portion may have certain restrictions in the UI. For example, as shown in FIG. 66, the UI may enable such virtual earring to only be placed within certain anatomical regions that allow for such arcuate curvature (e.g., helix region, superior concha). Likewise, the UI may preclude such virtual earring from being virtually spun while being virtually tried-on the virtual ear. Similarly, the UI may enable such earring to default to a spin angle depending on the virtual zone such virtual earring is placed in.

Figure 70:
FIG. 70 shows an embodiment of a virtual earring with a moveable part being virtually tried-on according to various principles of this disclosure.

FIG. 70 shows an embodiment of a virtual earring with a moveable part being virtually tried-on according to various principles of this disclosure. Pictorially, when the virtual earring has a ring worn in a more horizontal angle, then the moveable part may virtually dangles down. For example, as shown in FIG. 70, the ring in the virtual helix region.

The UI may be programmed to show how the virtual or real left and right ear looks viewed together on one screen, as described above. For example, the virtual ear may be a model ear, as described above, and the real ear may be from a selfie uploaded or capture by the user (e.g., via a smartphone, a smart mirror, a laptop), as described above. The user can be able to view both their virtual or real right and left ears together in one screen as one would in the mirror (e.g., vertical side-by-side, horizontal side-by-side, diagonal side-by-side). For example, this may be useful to a jewelry vendor whose majority of jewelry sold can be sold singly and clients design asymmetric looks. This can occur in order to gauge how the diameters look not only on the same virtual or real ear, but how clutter a look or balanced when seen together. Since jewelry can amplify or detract from facial scars or eye so when the UI imports the end user's own face in addition or alternative to real ears, the UI may present the ear and jewelry looks relative to their full features, scars, and imperfections as curation takes in all of these aspects to create a good look while accounting for virtual gravity may affect placement for realism, as explained above.

The UI can be programmed for use in dedicated applications, mobile apps, web browsers, and other technologies. For example, there can be smart glass or smart mirrors—mirrors with cameras. In such situations, 3d experiences can be different than 2d so experience of such smart mirror and real-time UI may need .obj files (or other suitable format) sticking on the real-time video feed and sticking thereto. What can be achieved with 2d (e.g., extracted images from 3d .obj files) is to tap a video feed from the cameras of the smart mirror or a smartphone or another camera equipped device. For example, there can be a person recording a face rotation using the smartphone front (or back) camera. The smartphone then manipulates that video feed by placing or overlaying the jewelry thereon, which the user can play back on the smartphone. For example, similar technology can allow for uploading your own ear imagery. For example, the user may stand in front of a smart mirror (e.g., flat, cuboid, V-shape, C-shape, U-shape, bi-fold, tri-fold, arcuate), whether the smart mirror has a display (e.g., touchscreen, non-touchscreen) underneath or side-by-side with a reflective mirror or the display functions as a virtual mirror, and the smart mirror has at least one camera or a stereo camera (depth camera or a pair of cameras enabling a stereo vision), each of may be placed on a panel of the smart mirror has multiple cameras or stereo cameras (depth cameras or pairs of cameras enabling stereo vision). The smart mirror may include a microphone, a speaker, and a networking interface (e.g., a modem, a Wi-Fi card, a Bluetooth chip). The user can turn to the right and turn to the left and thereby cause the mirror to capture the right ear and left ear in order to have both real ears virtually presented on the display. The user can touch, drag-and-drop, or manipulate such virtual ears or virtual earrings shown on the display if the display is touch-enabled. If the display is not touch-enabled, then the user can use touchless hand gestures or touchless finger tracking (e.g., for hygiene purposes if the smart mirror is in a retail location) to do same. The smart mirror may also have form a heat map for such virtual try-ons, whether touch or non-touch, in order for the administrator to gather relevant data. Similarly, the smart mirror may image the user via the camera or the stereo camera (depth camera or a pair of cameras enabling a stereo vision) and, based on such imaging, prompt the user to (a) remove a headwear item (e.g., a hat) if such ear imaging is difficult, (b) move long hair if ear imaging is difficult, (c) tuck the hair on the head behind if such ear imaging is difficult, (d) keep current earrings on/worn if ear imaging is difficult, (e) take off at least one current earring from the ear if ear imaging is difficult, or (f) remove a specific earring if ear imaging is difficult, or others. For example, the smart mirror may identify the current earrings worn by the user and hide those current earrings or overlay over those current earrings when displaying the ear of the user on the display so that the user can virtually try-on the virtual earring, as desired, on those locations where the current earrings are worn, without removing those current earrings from those locations on the real ear. For example, the smart mirror may receive a user input (e.g., touch, voice) before, during, after, or based on the user virtually trying-on the virtual earring via the UI, while the user is standing before the smart mirror, and request, based on or responsive to the user input, another person (e.g., a sales person or stylist) to approach the smart mirror in order to bring out whatever a real item corresponding to the virtual earring the user selects to virtually try-on on the virtual ear via the UI. This request may be sent via the networking interface of the smart mirror communicating (e.g., wired, wireless) with an output device (e.g., a speaker, a wearable, a headset, an electronic display) operative in or proximity of that other person. For example, the smart mirror can be arcuate, bi-fold, trifold, or multi-panel and have one or multiple cameras tracking in real-time the user's head, eyes, nose, torso, ears, and forecast movement of earrings based on virtual gravity if the user's head is moved. For example, the smart mirror can employ a stereo camera (e.g., a depth camera or a pair of cameras enabling a stereo vision), while the user is standing before the smart mirror, to image the user's ears, obtain the corresponding ear measurements, estimate the sizes of the corresponding ear regions based on such measurements, and then recommend various virtual earrings or placements thereof. The smart mirror can be embodied in various ways, as explained above. For example, based on above, the smart mirror can include a housing, a processor, a camera, and a display, where the housing houses the processor, the camera, and the display. The processor can be in communication with the camera and the display, and be programmed to: (a) receive a left imagery and a right imagery from the camera, where the left imagery frontally presents the left ear of the user standing before the camera and the right imagery frontally presents the right ear of the user standing before the camera; (b) identify a virtual left ear from the left ear frontally presented in the left imagery and a virtual right ear from the right ear in the right imagery; set the virtual left ear to a left preset scale and the virtual right ear to a right preset scale; identify a set of left virtual anatomical regions in the virtual left ear as set in the left preset scale and a set of right virtual anatomical regions in the virtual right ear as set in the right preset scale; segment each set selected from the set of left virtual anatomical regions into a set of left virtual regions and each set selected from the set of right virtual anatomical regions into a set of right virtual regions; cause the virtual left ear, the right virtual ear, and a virtual earring scale to be simultaneously presented on the display; receive an input from the user while the virtual left ear, the virtual right ear, and the virtual earring are simultaneously presented on the display; and cause the virtual earring to be virtually tried-on the virtual left ear or the virtual right ear on the display responsive to the input. When the user desires to upload the user's own ear imagery, whether to or via the smart mirror or to the server from the smartphone or the smart mirror or another camera-equipped computing device, as described above, then user can take image/upload image (e.g., raster) or scan the ear on the computing device. The smart mirror or the server reads the morphology of the ear image and applies the virtual regions and the virtual zones thereto such that the image is ready use, as described above.

As explained above, the UI can work with varying virtual body parts or virtual objects (e.g., a human, a mannequin, a showcase model, a body part, a head, a nose, an ear, a neck, an arm, a forearm, an upper arm, a wrist, a torso, a navel, a toe, a finger, a garment, a shoe) and items (e.g., a jewelry item, an earring, a necklace, a garment, a hat, a ring, an anklet, a bracelet, a tattoo), whether for jewelry, tattoos, acupuncture, garments, or other uses. For example, these can include necklaces, bracelets, face jewelry (e.g., nose/septum/nostril, lip/tongue/mouth, eyebrow, accepts facial dermals, monroe piercing), arcuate earrings, finger rings, dermals, anklets, navel barbells/waist chains, mix and match navel pieces, acupuncture, belts, mapping tattoos on the body for previews—tattoos may curve with the virtual body or tattoos will be previewed on the virtual skin tone picked by the user.

As explained above, the UI may be configured for various virtual body parts or virtual objects. As such, in context of acupuncture, much of acupuncture defines the body whole represented in the ear. Needles of a given thickness are applied in a given angle to a zone in the ear. So these zones can be assigned virtual regions of the body instead of piercing names. For example, the daith virtual zone in the virtual ear can be the liver location in acupuncture. The photography or render angle of the needle would describe how "forward facing" the acupuncture needle should be when inserted in that zone. The UI can be used for the full torso and human body with acupuncture and the zones applied to the full human body. So the body and it's meridians would be defined as virtual regions or virtual zones and for the ear, the meridians and organs of the body in the ear zones. For example, there can be a specific angle for a specific function. Note that the UI can be expanded to include all acupuncture areas (e.g., neck, fingers, hands). For example, the needles can be photographic to teach or show how the needles can be applied to the ear (or another suitable body part imagery).

Figure 71:
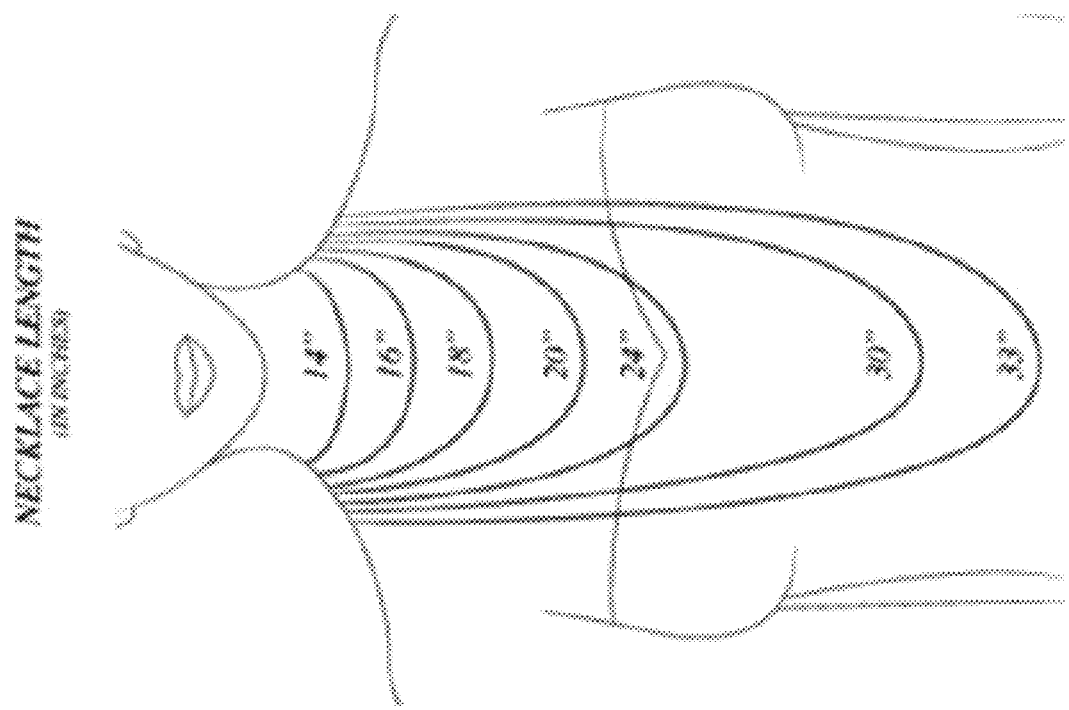
FIG. 71 shows an embodiment of various necklace length for virtually trying-on a virtual necklace according to various principles of this disclosure.
Figure 73:
FIGS. 73-78 show an embodiment of a virtual jewelry item being virtually tried-on on various virtual non-ear body areas according to this disclosure.
Figure 74:
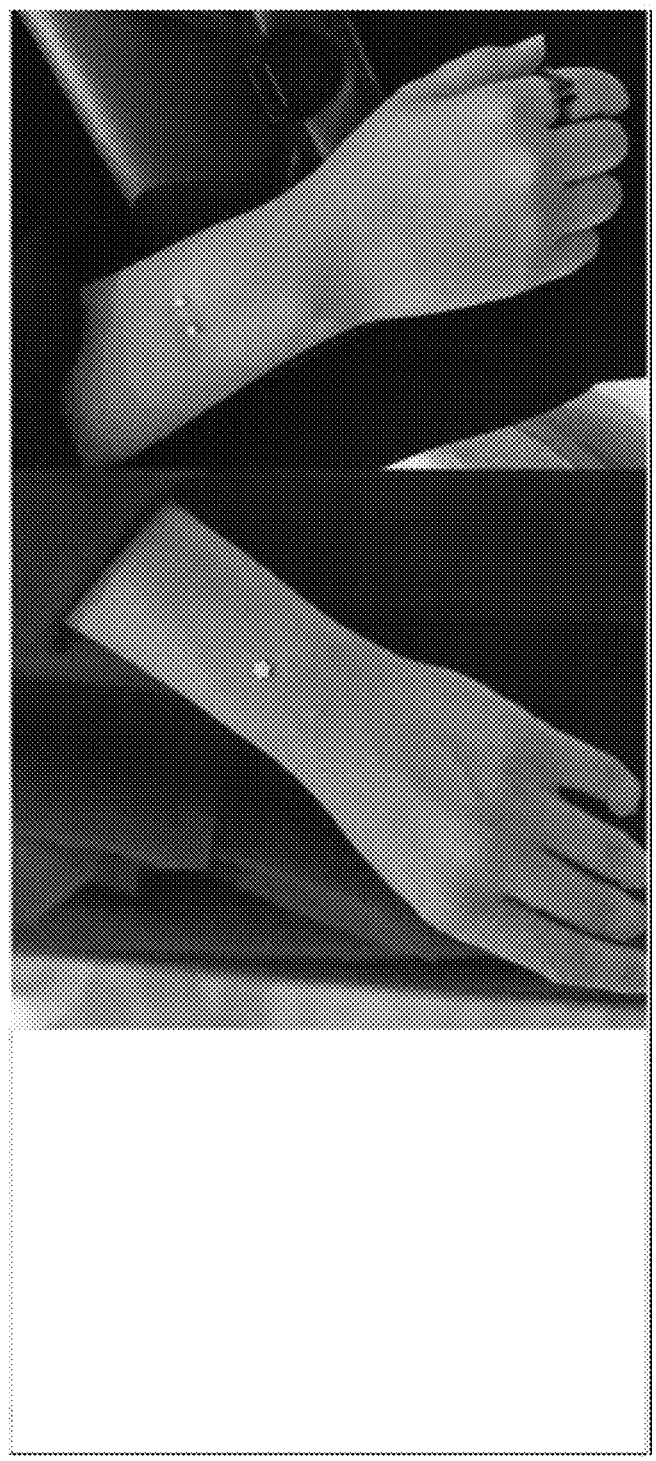
Figure 75:
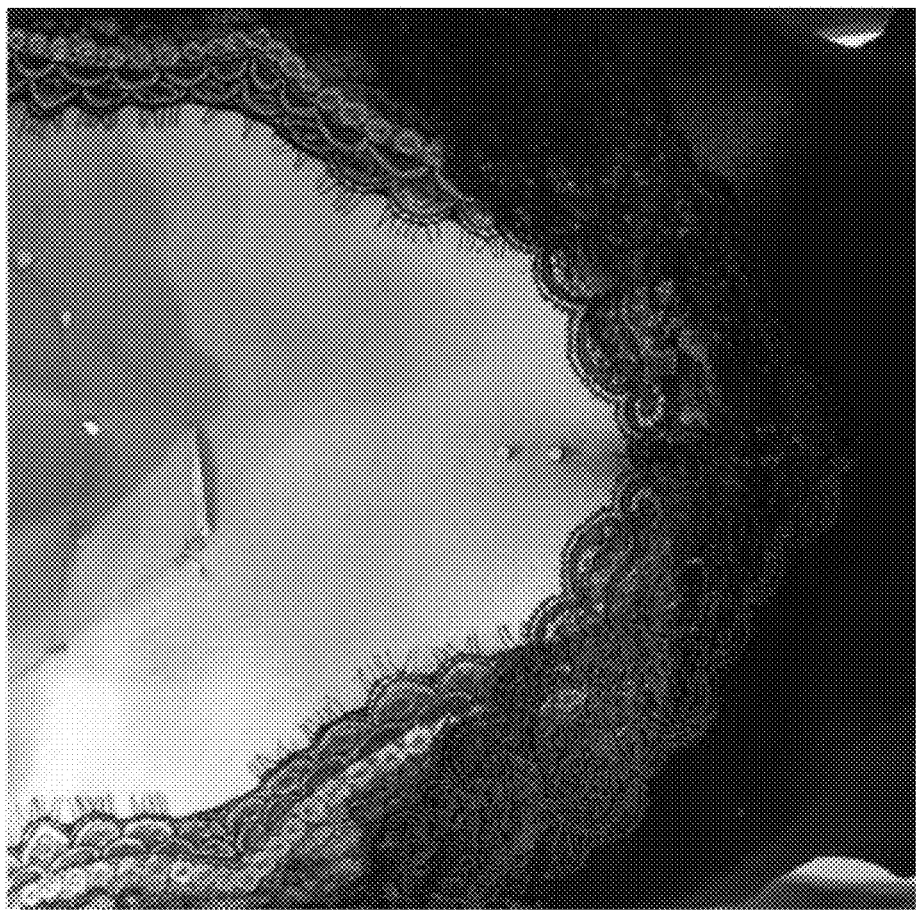
Figure 76:
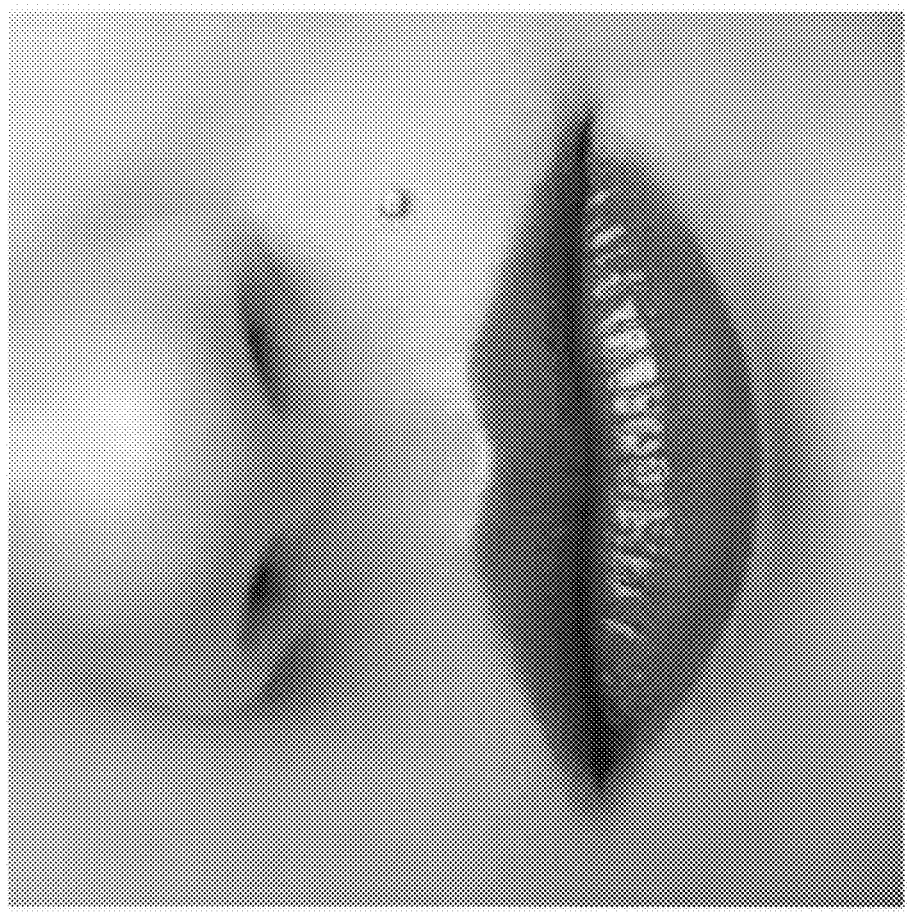
Figure 77:
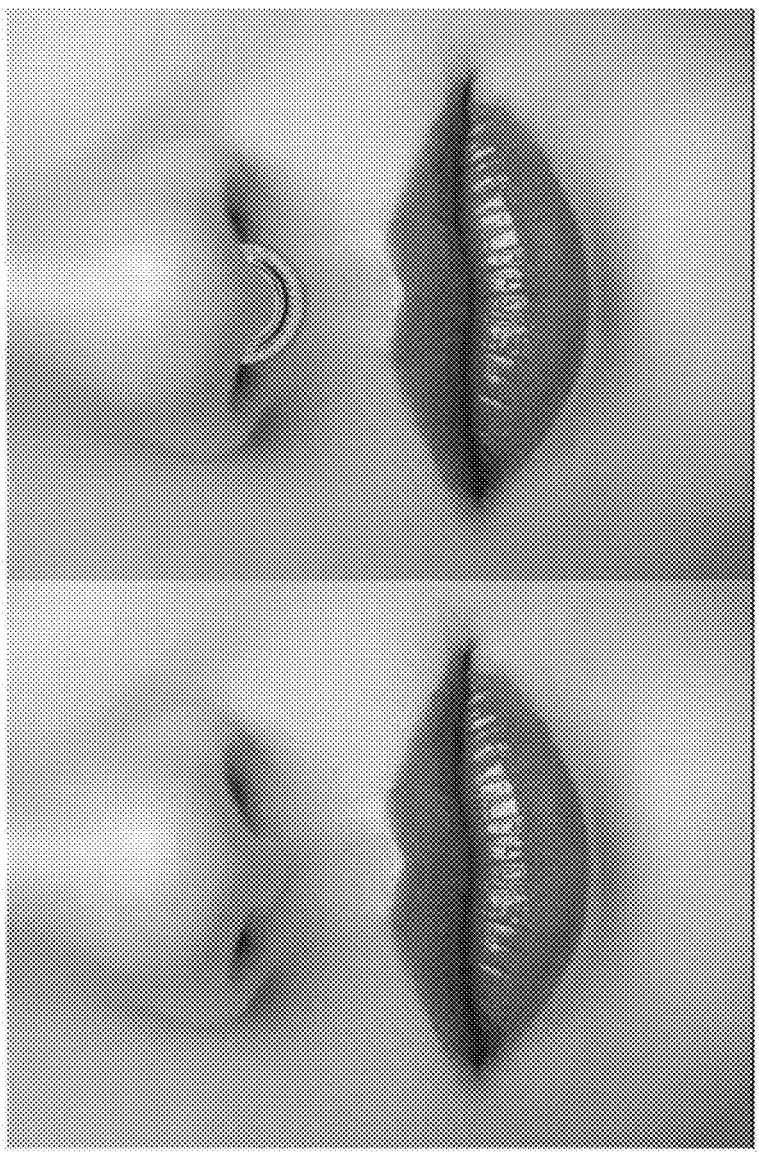
Figure 78:
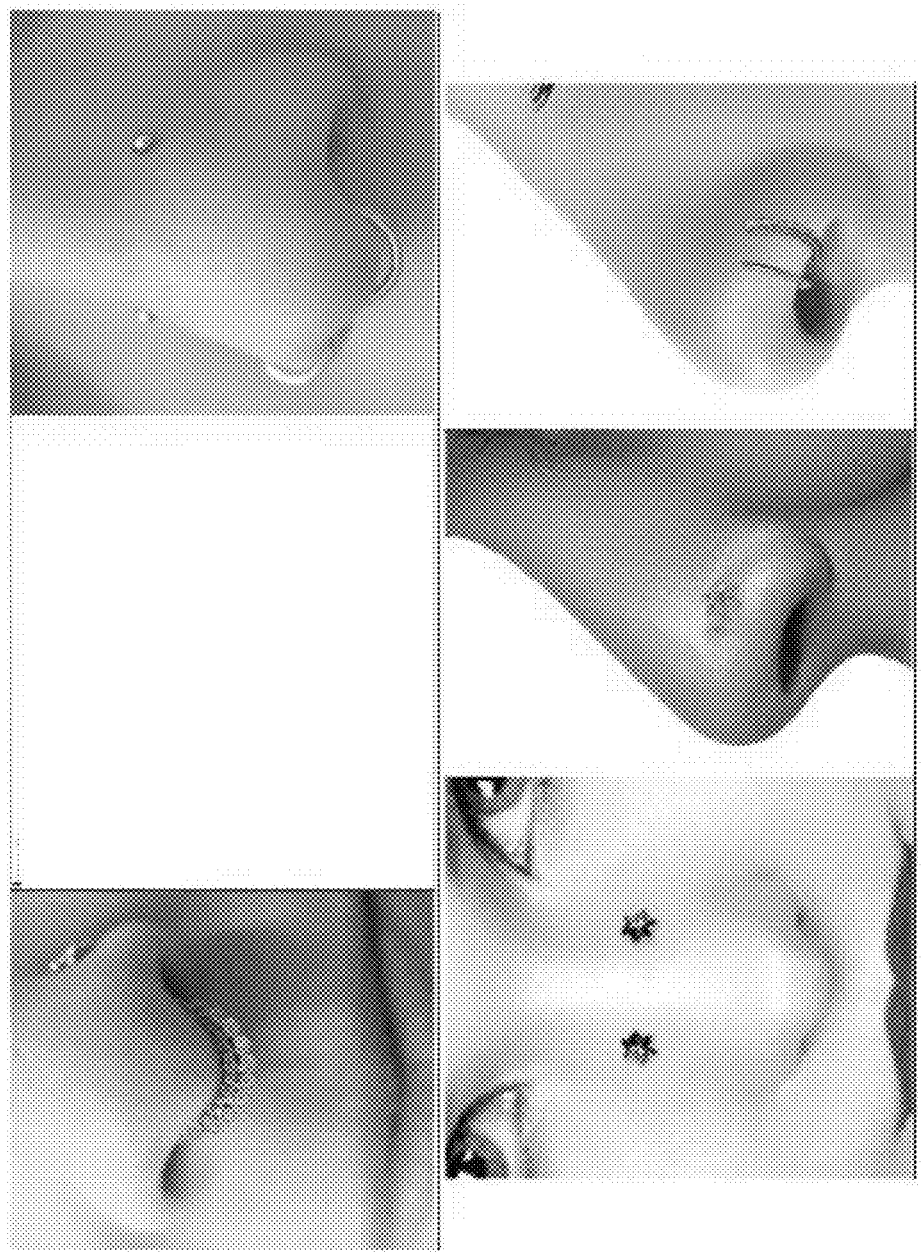

FIG. 71 shows an embodiment of various necklace length for virtually trying-on a virtual necklace according to various principles of this disclosure. The UI can be programmed regarding adjustability of such necklaces for virtual try-on thereof. For example, what is the min and max lengths (think about belts). For example, for some necklaces, the UI may need to know if that respective necklace is longitudinally adjustable or not and, if so, then adjustable from what length to max length (like a belt which has a minimum and maximum). The UI can be enabled to identify if the virtual necklace is pictorially adjustable. If no, then the UI can operates as a fixed "diameter". If yes, then the UI needs to either put the virtual necklace on the neck and then ask the user if the user wants the virtual necklace appear longer or shorter by citing its min or max and telling user what length the UI applied to the skin. For example, the neck size can be defined by clothing size. For example, the user can upload imagery of their own neck, as described above. For example, the UI can prompt the user to choose brands and sizes that are similar or similar item purchases of a different brand and then advises a size. For example, the UI can understand if the user drags (or otherwise positions or causes to be positioned) a virtual necklace over to their virtual neck, what is the best size for their desired look based on various criteria (e.g., user pro-file, image derived). For example, the nonadjustable handcuff necklaces have a choker option which can be relatively small. For a relatively thin woman, 14-15 inches may be a choker. For a man, if the UI knows their collar size, then the UI can recommend a necklace length. For a relatively heavier woman, since a 16" necklace could have a choker effect and fit tightly. The user can take a tape measure and measure around their neck and based on a size guide for a thin woman's neck that defines the amount of drop of a given necklace length. Therefore, the UI can mimic this functionality. Note that a virtually flexible chain may need to adhere to the virtual neck's collar bone and understand its topology. The UI can allows for this via a mesh feature.

There may be virtual layering principles for virtual necklaces. The UI can be programmed to use the length of the selected virtual necklace, as preset by the administrator via the administrator console or panel, to determine the amount of virtual drop of the virtual chain, relative to how virtually tight on the virtually neck (a choker style) based on various sizing charts. For example, this can be done similarly as described herein, but adjusted for necklace imagery and corresponding measurements. So initially, the UI can use an average (or predetermined) neck, face, and shoulders, and then the user can specify which design in which length neck-lace the user wants and see how the designs look relative to each other and if the virtual necklace chain lengths need to be adjusted to get the aesthetic clearance between the virtual chain lengths and any virtual pendants or charms hanging off the virtual chain. The virtual width of the neck can define the fit of the virtual necklace chain. For example, as described above, the user can import their own neck (e.g., images) to measure the circumference of the neck at its base, and take that measurement as the choker length.

FIG. 72 shows an embodiment of various ring sizes for virtually trying-on a virtual necklace according to various principles of this disclosure. There may be some virtual layering principles for virtual try-on of virtual finger rings. The UI can be programmed employ the average sizes of average US (or other country or region or global) fingers. For example, there can be a ring finger of US size 6, index finger of China size X. Therefore, when the user wants to see what two virtual rings look like next to each other or a finger apart from each other, then The UI can provide such virtual functionality (e.g., horizontally or vertically or diagonally side-by-side) and see if the look feels balanced or too heavy with the designs. Also midi or second knuckle rings are sold (usually they are a size 4) and The UI can enable the user to see how these virtual rings look like when coupling them with other virtual rings in standard locations on the rings finger, middle, or index finger and gauge the aesthetic balance of their virtual selections. The UI can also be programmed enable the virtual left and right hands be shown together (e.g., horizontally or vertically or diagonally side-by-side) so that the user can judge how the virtual rings look with their virtual fingers or relative to both virtual hands. The UI can be programmed to allow the user to import imagery of their own hands, as explained above, and if the user has any preexisting jewelry, like marriage rings, then UI can enable the user to see how the new designs the user wants to purchase look with these other rings selected (or be hidden when displaying in order not to remove the preexisting jewelry as described above). For example, this can be a horizontally or vertically or diagonally side-by-side presentation or concurrently presented (e.g., to have a both left and right hand viewing together). FIG. 72 shows some US sizing for finger rings, as differentiated from ear hoops/rings/clickers.

The UI may layer virtual finger rings above each other and on separate virtual knuckles, similar to other embodiments described herein. Note that TryOn software can be adapted similar to other embodiments described herein in order to: provide similar layering principles for virtual bracelets, provide similar layering principles for virtual body chains; provide similar layering principles for virtual navel chains; provide similar layering principles for virtual anklets; provide similar layering principles for virtual navel jewelry; provide similar layering principles for virtual nostril jewelry or virtual septum jewelry; provide similar layering principles for virtual dermal jewelry, or other virtual items. The UI can show a waist-up self-imagery or fictional imagery (e.g., an avatar, a pictogram) to illustrate a totality of a created virtual look—navel, nostril, septum, left and right ear, necklaces, body chains, waist chains and others all together, as described above.

Figure 79:
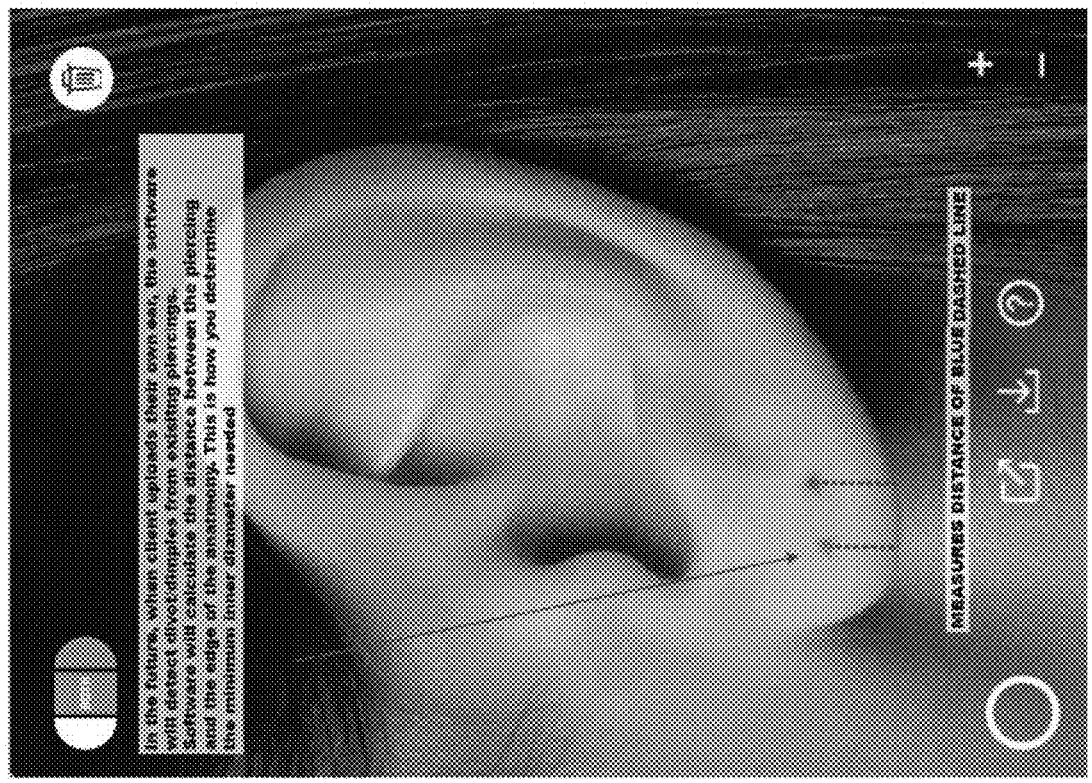
FIG. 79 shows an embodiment of a self-image being processed to detect a virtual divot or a virtual dimple from an existing real piercing and then take an action according to various principles of this disclosure.
Figure 80:
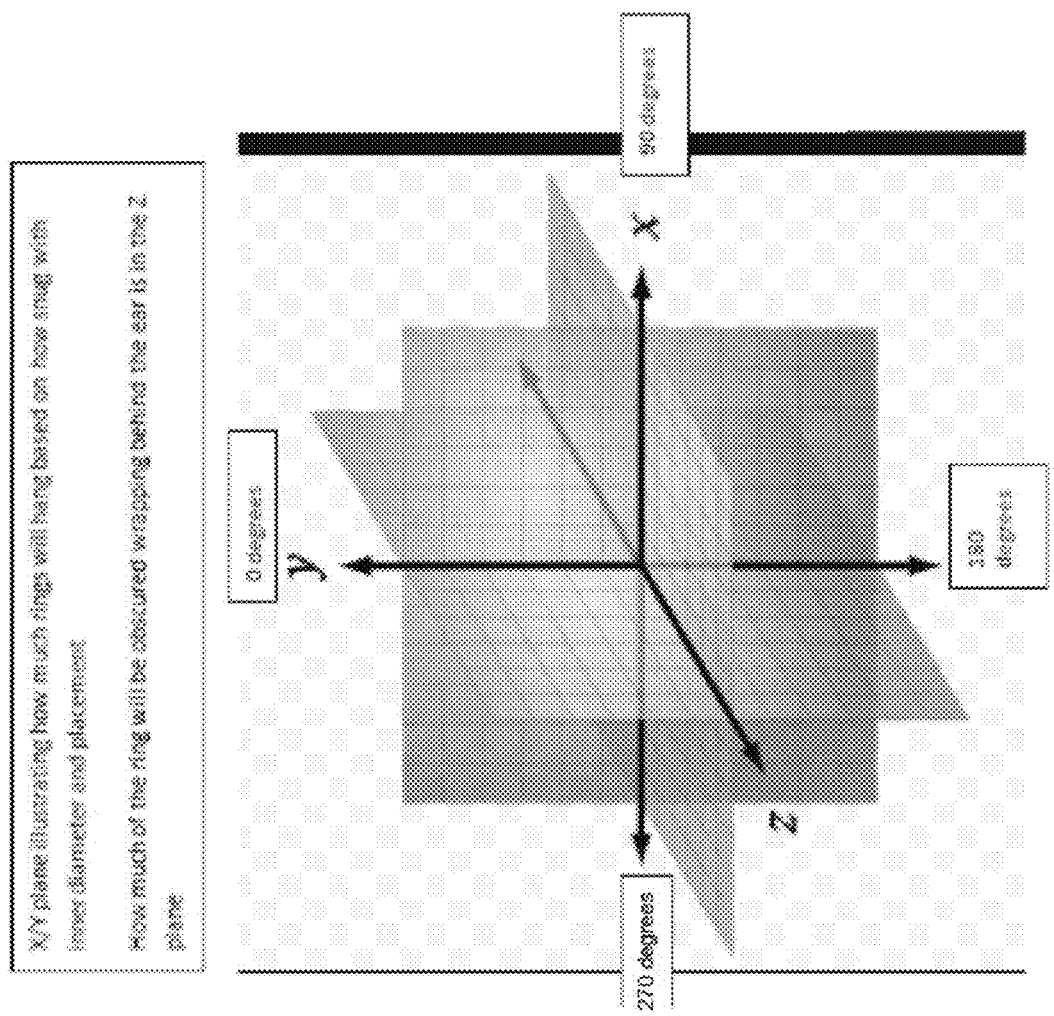
FIG. 80 shows an embodiment of an X/Y plane illustrating how much a virtual earring with a ring will hang based on snugness according to various principles of this disclosure.
Figure 82:
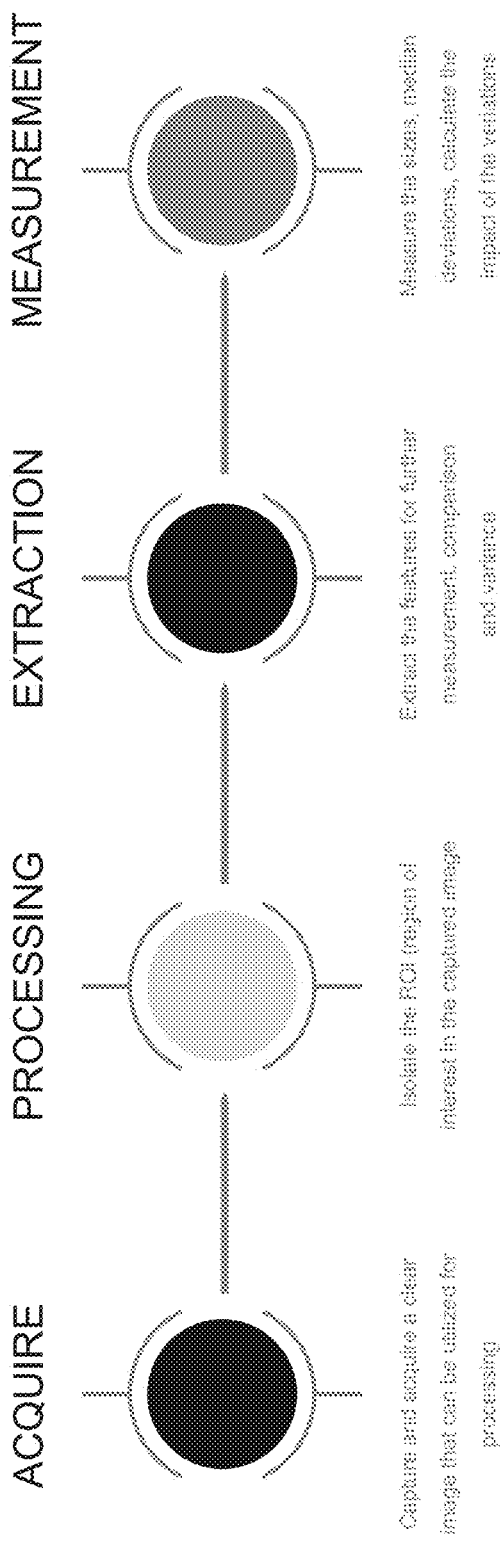
Figure 85:
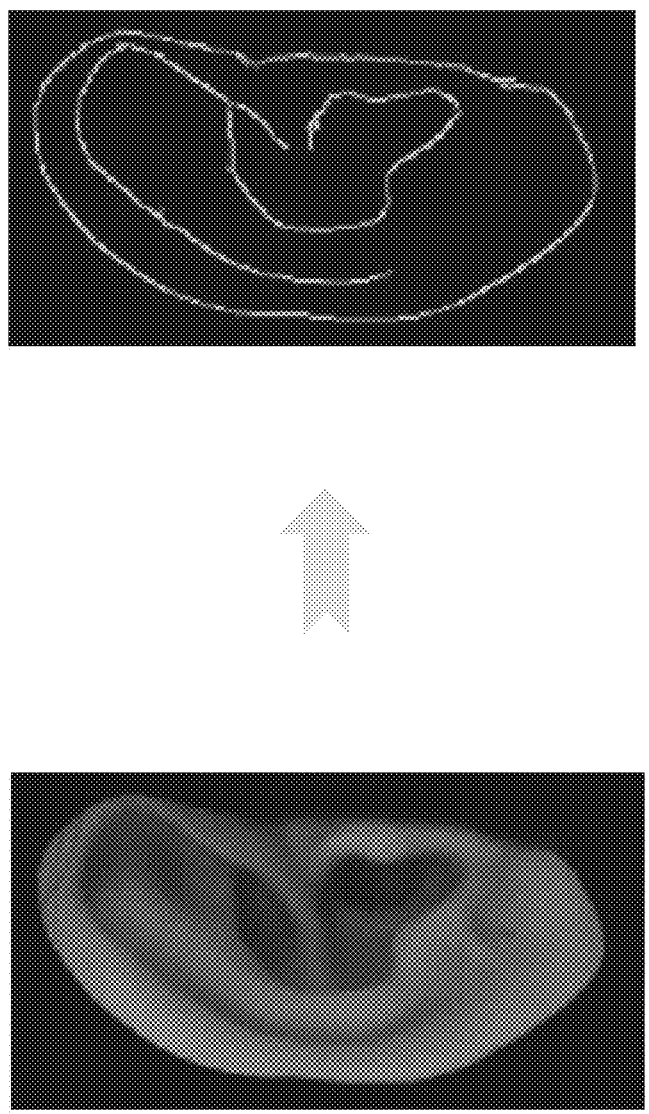
Figure 87:
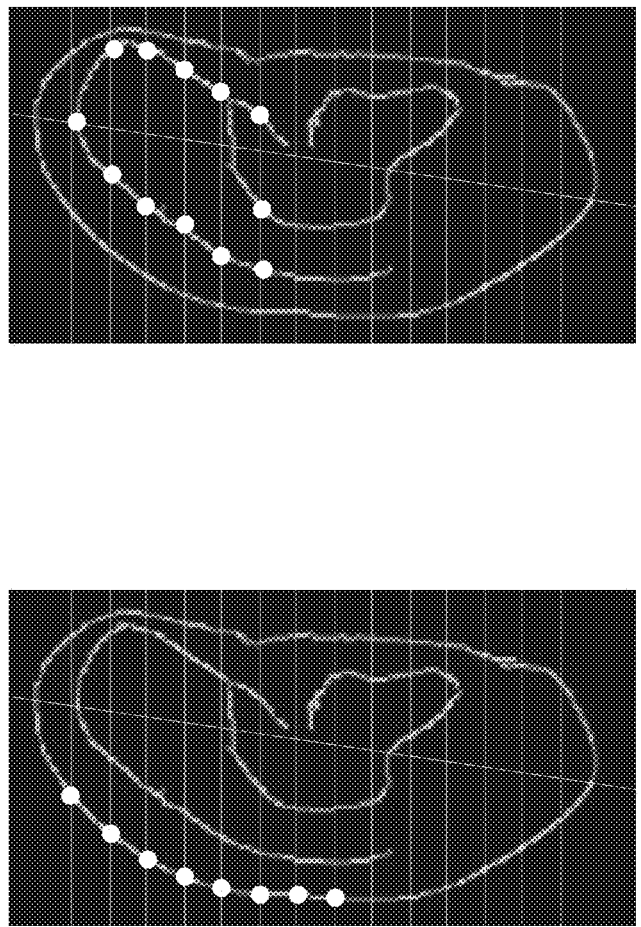
Figure 88:
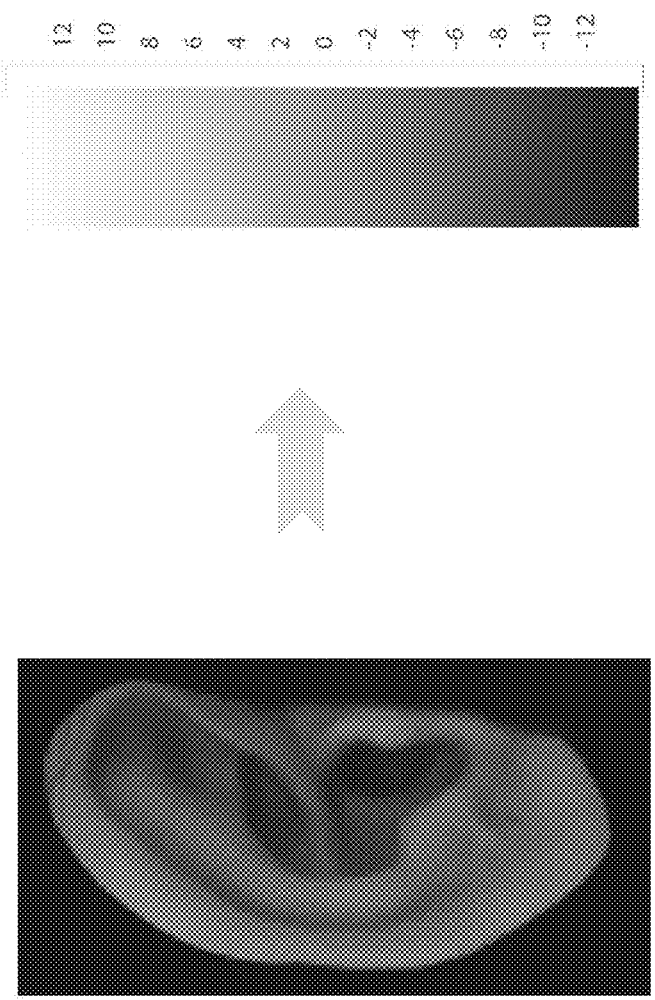

FIGS. 73-78 show an embodiment of a virtual jewelry item being virtually tried-on on various virtual non-ear body areas according to this disclosure. FIG. 79 shows an embodiment of a self-image being processed to detect a virtual divot or a virtual dimple from an existing real piercing and then take an action according to various principles of this disclosure. FIG. 80 shows an embodiment of an X/Y plane illustrating how much a virtual earring with a ring will hang based on snugness according to various principles of this disclosure. FIGS. 81-90 show an embodiment of an method for machine learning for creating a canvas or a map for an object according to this disclosure.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or pro-gram statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as dis-closed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although various embodiments have been depicted and described in detail herein, skilled artisans know that various modifications, additions, substitutions and the like can be made without departing from this disclosure. As such, these modifications, additions, substitutions and the like are considered to be within this disclosure.

What is claimed is:

1. A system comprising:
a processor programmed to:
cause a user interface (UI) to be presented, wherein the UI is programmed to:
frontally present a virtual ear within the UI;
receive a first user selection while the virtual ear is frontally presented within the UI and a second user selection while the virtual ear is frontally presented within the UI, wherein the first user selection selects a virtual earring presented within the UI while the virtual ear is frontally presented within the UI, wherein the second user selection selects a virtual location on the virtual ear frontally presented within the UI; and
virtually try-on the virtual earring at the virtual location within the UI responsive to the first user selection being received via the UI and the second user selection being received via the UI such that the virtual earring appears to change in rotational angle within the UI depending on where the virtual location is located on the virtual ear within the UI, wherein at least one of
(i) wherein the virtual ear includes a set of virtual anatomic regions in the UI, wherein the UI is further programmed to highlight at least one virtual anatomic region selected from the set of virtual anatomic regions on which the virtual earring can be virtually tried-on responsive to the first user selection being received via the UI and the second user selection being received via the UI;
(ii) wherein the virtual ear includes a virtual skin tone, wherein the UI is further programmed to virtually try-on the virtual earring at the virtual location within the UI responsive to the first user selection being received via the UI and the second user selection being received via the UI such that at least one of: (a) there is an appearance of a virtual reflection of the virtual skin tone on the virtual earring within the UI, wherein the virtual reflection varies based on the virtual skin tone, or (b) there is an appearance of a virtual shadow of the virtual earring on the virtual ear within the UI, wherein the virtual shadow varies based on the virtual skin tone; or
(iii) wherein the UI is further programmed to: have access to (a) a set of images depicting the virtual earring from a set of rotational angles that are different from each other and (b) an ear map including a set of virtual anatomical regions each further segmented into a set of virtual zones that are polygonal and bordering each other; and virtually try-on the virtual earring at the virtual location within the UI responsive to the first user selection being received via the UI and the second user selection being received via the UI such that the virtual earring appears to change in rotational angle within the UI depending on where the virtual location is located on the virtual ear within the UI based on each virtual zone selected from the set of virtual zones being associated with an image selected from the set of images and the virtual location being at least one of the virtual zones.

2. The system of claim 1, wherein the first user selection being received via the UI and the second user selection being received via the UI are collectively a single drag-and-drop input within the UI dragging the virtual earring over the virtual ear within the UI.

3. The system of claim 1, wherein the first user selection being received via the UI and the second user selection being received via the UI are collectively a single user input other than a drag-and-drop input.

4. The system of claim 1, wherein the UI is further programmed to virtually try-on the virtual earring at the virtual location within the UI responsive to the first user selection being received via the UI and the second user selection being received via the UI based on determining what type of the virtual earring corresponds to the first user selection.

5. The system of claim 1, wherein the UI is further programmed to virtually try-on the virtual earring at the virtual location within the UI responsive to the first user selection being received via the UI and the second user selection being received via the UI based on accessing a set of images depicting the virtual earring at a set of rotational angles that are different from each other and selecting an image from the set of images, wherein the image is associated with the virtual location.

6. The system of claim 5, wherein the UI is further programmed to locally store the set of images.

7. The system of claim 1, wherein the UI is further programmed to locally execute.

8. The system of claim 1, wherein the virtual ear includes the set of virtual anatomic regions in the UI, wherein the UI is further programmed to highlight the at least one virtual anatomic region selected from the set of virtual anatomic regions on which the virtual earring can be virtually tried-on responsive to the first user selection being received via the UI and the second user selection being received via the UI.

9. The system of claim 8, wherein the UI is further programmed to appear to attract the virtual earring to a nearest virtual anatomic region selected from the set of virtual anatomic regions on which the virtual earring can be virtually tried-on responsive to the first user selection being received via the UI and the second user selection being received via the UI and the virtual location being outside the at least one virtual anatomic region from the set of virtual anatomic regions.

10. The system of claim 1, wherein the virtual ear includes a set of virtual anatomic regions in the UI, wherein the UI is further programmed to virtually try-on the virtual earring at the virtual location within the UI responsive to the first user selection being received via the UI and the second user selection being received via the UI such that the virtual earring appears to change in the rotational angle within the UI depending on where the virtual location is located within each virtual anatomic region selected from the set of virtual anatomic regions on the virtual ear within the UI.

11. The system of claim 1, wherein the UI is further programmed to virtually try-on the virtual earring at the virtual location within the UI responsive to the first user selection being received via the UI and the second user selection being received via the UI such that the virtual earring appears to change in the rotational angle within the UI depending on (a) where the virtual location is located on the virtual ear within the UI and (b) whether the virtual earring includes a virtual stud or a virtual ring.

12. The system of claim 1, wherein the first user selection and the second user selection are collectively a single user selection.

13. The system of claim 1, wherein the first user selection is distinct from the second user selection.

14. The system of claim 1, wherein the virtual earring includes a set of virtual depth areas, wherein the virtual earring includes a set of virtual portions, wherein the UI is further programmed to virtually try-on the virtual earring at the virtual location within the UI responsive to the first user selection being received via the UI and the second user selection being received via the UI such that at least one virtual portion selected from the set of virtual portions appears dynamically hidden under at least one virtual depth area selected from the set of virtual depth areas when the virtual location is the at least one depth area selected from the set of virtual depth areas and dynamically unhidden when the virtual location is not the at least one virtual depth area selected from the set of virtual depth areas.

15. The system of claim 1, wherein the virtual earring includes a virtual portion, wherein the UI is further programmed to cause the virtual portion to appear to virtually fall relative to the virtual ear to enable a virtual gravitational effect for the virtual portion.

16. The system of claim 15, wherein the virtual ear includes a first virtual edge, wherein the virtual portion includes a second virtual edge, wherein the UI is further programmed to cause the virtual portion to appear to virtually fall relative to the virtual ear to enable the virtual gravitational effect for the virtual portion based on a virtual space being available between the first virtual edge and the second virtual edge.

17. The system of claim 15, wherein the virtual ear includes a virtual skin, wherein the UI is further programmed to cause the virtual portion to appear to virtually fall relative to the virtual ear to enable the virtual gravitational effect for the virtual portion until the virtual portion appears to be in virtual contact with the virtual skin.

18. The system of claim 15, wherein the virtual portion includes a virtually arcuate portion.

19. The system of claim 15, wherein the virtual portion includes a virtual ring.

20. The system of claim 19, wherein the virtual ring includes a virtually arcuate portion.

21. The system of claim 1, wherein the virtual earring includes a virtual stud.

22. The system of claim 1, wherein the virtual ear includes the virtual skin tone, wherein the UI is further programmed to virtually try-on the virtual earring at the virtual location within the UI responsive to the first user selection being received via the UI and the second user selection being received via the UI such that at least one of:
(a) there is the appearance of the virtual reflection of the virtual skin tone on the virtual earring within the UI, wherein the virtual reflection varies based on the virtual skin tone,
or
(b) there is the appearance of the virtual shadow of the virtual earring on the virtual ear within the UI, wherein the virtual shadow varies based on the virtual skin tone.

23. The system of claim 1, wherein the virtual ear includes a virtual skin area, wherein the virtual location is spaced apart from the virtual skin area, wherein the UI is further programmed to present a user input element within the UI programmed to receive a user input such that (a) the virtual earring appears to spin responsive to the user input while virtually tried-on at the virtual location and (b) the virtual earring appears to be at least partially dynamically hidden and dynamically unhidden responsive to the user input when the virtual earring respectively appears to be virtually anatomically tucked and virtually anatomically untucked within the virtual ear.

24. The system of claim 1, further comprising a smart mirror including the processor.

25. The system of claim 1, further comprising a server including the processor, wherein the UI is remote from the server.

26. The system of claim 1, wherein the UI is further programmed to enable the virtual ear to be switched between a left virtual ear and a right virtual ear such that the virtual earring being virtually tried-on in the virtual location correspondingly switches accordingly while respectively remaining in the virtual location.

27. The system of claim 1, wherein the UI is further programmed to:
have access to (a) the set of images depicting the virtual earring from the set of rotational angles that are different from each other and (b) the ear map including the set of virtual anatomical regions each further segmented into the set of virtual zones that are polygonal and bordering each other; and
virtually try-on the virtual earring at the virtual location within the UI responsive to the first user selection being received via the UI and the second user selection being received via the UI such that the virtual earring appears to change in rotational angle within the UI depending on where the virtual location is located on the virtual ear within the UI based on each virtual zone selected from the set of virtual zones being associated with the image selected from the set of images and the virtual location being at least one of the virtual zones.

28. The system of claim 27, wherein the ear map is not visible within the UI when the first user selection is received via the UI and the second user selection is received via the UI.

29. The system of claim 27, wherein the set of images is not visible within the UI when the first user selection is received via the UI and the second user selection is received via the UI.

30. A system comprising:
a processor programmed to:
cause a user interface (UI) to be presented, wherein the UI is programmed to:
frontally present a virtual ear within the UI;
present a virtual earring within the UI while the virtual ear is frontally presented within the UI; and
receive a drag-and-drop input within the UI while the virtual ear is frontally presented within the UI and the virtual earring is presented within the UI such that (a) the drag-and-drop input drags the virtual earring over the virtual ear and thereby enables the virtual earring to be virtually tried-on the virtual ear within the UI responsive to the drag-and-drop input, (b) the virtual earring appears to change in rotational angle within the UI depending on where the virtual earring is virtually tried-on the virtual ear within the UI responsive to the drag-and-drop input, and (c) the virtual earring appears to at least partially dynamically hide and at least partially dynamically unhide depending on where the virtual earring is virtually tried-on the virtual ear within the UI responsive to the drag-and-drop input, wherein at least one of
(i) wherein the virtual ear includes a set of virtual anatomic regions in the UI, wherein the UI is further programmed to highlight at least one virtual anatomic region selected from the set of virtual anatomic regions on which the virtual earring can be virtually tried-on responsive to the drag-and-drop input being received via the UI;

(ii) wherein the virtual ear includes a virtual skin tone, wherein the UI is further programmed to virtually try-on the virtual earring at a virtual location on the virtual ear within the UI responsive to the drag-and-drop input being received via the UI such that at least one of: (a) there is an appearance of a virtual reflection of the virtual skin tone on the virtual earring within the UI, wherein the virtual reflection varies based on the virtual skin tone, or (b) there is an appearance of a virtual shadow of the virtual earring on the virtual ear within the UI, wherein the virtual shadow varies based on the virtual skin tone; or (iii) wherein the UI is further programmed to: have access to (a) a set of images depicting the virtual earring from a set of rotational angles that are different from each other and (b) an ear map including a set of virtual anatomical regions each further segmented into a set of virtual zones that are polygonal and bordering each other; and virtually try-on the virtual earring at the virtual location within the UI responsive to the drag-and-drop input being received via the UI such that the virtual earring appears to change in rotational angle within the UI depending on where the virtual location is located on the virtual ear within the UI based on each virtual zone selected from the set of virtual zones being associated with an image selected from the set of images and the virtual location being at least one of the virtual zones.

\* \* \* \* \*